(12) United States Patent
Leight et al.

(10) Patent No.: US 6,669,483 B1
(45) Date of Patent: Dec. 30, 2003

(54) INSTRUMENTED BREAST MODEL

(75) Inventors: Victor W. Leight, Bridgeport, WV (US); Susan B. Leight, Bridgeport, WV (US); Roy S. Nutter, Jr., Morgantown, WV (US); Christy B. Schmidt, Kingwood, WV (US); Douglas J. Miller, N. Olmsted, OH (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 09/788,000

(22) PCT Filed: Sep. 24, 1998

(86) PCT No.: PCT/US99/22201

§ 371 (c)(1),
(2), (4) Date: Mar. 23, 2001

(87) PCT Pub. No.: WO00/17838

PCT Pub. Date: Mar. 30, 2000

Related U.S. Application Data

(60) Provisional application No. 60/101,595, filed on Sep. 24, 1998.

(51) Int. Cl.[7] ............................................. G09B 23/28
(52) U.S. Cl. ....................... 434/262; 262/267; 262/273; 262/275
(58) Field of Search ................................ 434/262, 267, 434/272–273, 275; 623/7, 8

(56) References Cited

U.S. PATENT DOCUMENTS 3,742,935 A * 7/1973 Baessler et al. ............. 600/500
4,134,218 A * 1/1979 Adams et al. ............... 434/267
4,867,686 A * 9/1989 Goldstein .................... 434/267
5,479,661 A * 1/1996 Fingleson et al. ............... 2/69
5,642,936 A * 7/1997 Evans ......................... 600/300
5,913,686 A * 6/1999 VanWinkle .................. 434/267
6,336,812 B1 * 1/2002 Cooper et al. .............. 434/267

FOREIGN PATENT DOCUMENTS

WO         WO 00/13591    *  6/2000  ............ A61B/8/08

OTHER PUBLICATIONS

Stoppard, Dr. Miriam. Keeping abreast of body changes, Sep. 24, 1998, start p. 35.*

* cited by examiner

Primary Examiner—Teresa Walberg
Assistant Examiner—Cameron Saadat
(74) Attorney, Agent, or Firm—Steptoe & Johnson PLLC

(57) ABSTRACT

An interactive breast model (100) is disclosed for training lay persons and health care providers to perform effective breast examinations and to locate and identify masses in a breast. The model of the invention comprises a silicone breast model (102) equipped with a data acquisition unit (106) having a plurality of sensors (1002) for detecting displacement in the surface (202) of the breast model during an examination and data acquisition modules (1004) for receiving the sensor output data. The data acquisition unit (106) sends the sensor output to a personal computer (108) for analysis and display to the user (1018). Software (1006) executing on the personal computer performs fuzzy logic algorithms to correlate the sensor output data to usable information regarding the time duration of the examination, finger placement of the user, and the level of displacement throughout the examination. This performance data (1030) is displayed to the user.

42 Claims, 19 Drawing Sheets

LARGE INPUT FUZZY MEMBERSHIP FUNCTION

INSTRUMENTED BREAST MODEL

CROSS-REFERENCE TO RELATED APPLICATIONS

This application claims the benefit of Application No. 60/101,595, filed Sep. 24, 1998.

BACKGROUND OF THE INVENTION

INCLUSION OF COPYRIGHT NOTICE

A portion of the disclosure of this patent document contains material which is subject to copyright protection. The owner has no objection to the facsimile reproduction by any-one of the patent document or the patent disclosure, as it appears in the Patent and Trademark Office patent file or records, but otherwise reserves all copyright rights whatsoever.

FIELD OF TECHNOLOGY

The present invention relates to interactive instrumented models for teaching patient and self care, and more specifically, to an interactive instrumented breast model for training persons to perform a competent and thorough breast examination.

RELATED ART

Due to the high incidence of breast cancer and generally poor proficiency of American women in breast self-examination (BSE), there is a need to train lay women to do thorough breast examination procedures. The broad objectives of the system are to educate users on breast cancer and breast care and to train breast examination techniques.

An American woman has a 1 in 8 chance of developing breast cancer in her lifetime. Among American women in 1998, more than 178,000 new cases of breast cancer were diagnosed and more than 43,000 persons died from the disease. These statistics make evident the significance of breast cancer. Because breast cancer is not curable, the key to survival is early detection and treatment.

There are three primary stages of breast cancer: localized, regional and distant. In the localized stage, lumps are small (less than 2 cm), and the cancer has not spread outside the breast. In the regional stage, lumps are medium sized (2 cm to 5 cm), and the cancer has spread to the lymph nodes in the armpit area. In the distant stage, lumps are large (greater than 5 cm), and the cancer has spread to other parts of the body. The five-year relative survival rate from cancer is highly dependent on the stage in which it is detected. For detection in the distant stage, survival rate is as low as 17%. The regional stage survival rate is around 61%. Finally, survival from breast cancer can be as high as 97% for detection in the localized stage. This leaves the important question of how breast cancer can be detected in the earliest stage.

Methods used for detection of breast cancer are breast self-examination (BSE), clinical breast examination (CBE) and mammography. BSE should be performed monthly by the woman herself. CBE should be performed yearly by a trained health care provider. There is no universal agreement on mammography screening intervals, and they vary with age. According to The American Cancer Society, women age 40–49 are recommended to have a routine screening mammogram every 1–2 years, and those over the age of 50 have an annual screening mammogram. Each method has benefits and deterrents; still, if all three are practiced according to guidelines, the optimum plan for earliest detection is in effect.

BSE is an attractive method for early detection of breast cancer for several reasons. It is performed at home by the woman; consequently, there is no cost associated with the exam. Second, there is only a one month time interval between screenings. It is also theorized that a woman would be highly sensitive to subtle changes in her own breast tissue. The combination of frequency of performance and familiarity of her own breast tissue suggests that breast cancer could be detected in the earliest stage.

CBE is also an important part of breast cancer detection and serves as an important complement to mammography. The cost of CBE is inexpensive relative to mammography. CBE may also be more sensitive than a mammogram in younger women because mammography is hindered in the presence of very dense breast tissue common in younger women.

Studies have shown that a major shortcoming of BSE and CBE is that exams are not performed optimally. In one study, two groups of lay women were tested on breast examination skills. The mean correct lump detection was only 25%. Another study on how well physicians could detect lumps with CBE showed only a 44% mean number of lumps detected. However, research has shown that training of examination techniques improves performance. Numerous studies have noted that a major determinant of the ability to detect masses lies not in the characteristics of the masses themselves, but in the thoroughness of the procedure undertaken to examine the breast tissue.

Usual training procedures for BSE include instructional videos, literature (books, magazine articles, pamphlets, shower cards, etc.) and one-on-one instruction. Of these methods, only the last involves providing feedback to the trainee on exam performance. Following training on silicone breast models, studies indicate that the women showed an increase in mean correct lump detection from 25% to approximately 50%. In addition, the mean time of examination increased. This illustrates the importance of training breast examination techniques to lay women and health care providers for effective breast examinations.

To be maximally effective, an examiner must be able to differentiate masses from surrounding tissue while using a pattern of search that ensures contact by the fingers with all portions of the breast tissue. In addition, this pattern of search should preferably minimize undue redundancy. Detailed training sequences have been developed for the various sensory-motor skills involved in breast examinations. The flats (from fingertips to first joint) of the three middle fingers should be used for the examination. The breast examination needs to cover the entire breast tissue: top to bottom from the collarbone to the bra line; side to side from center of chest area to armpit area; and from the surface of the breast tissue to deep along the chest wall. The examiner should use the flats of the fingers to perform palpations in dime-sized circles while applying three pressure levels: light, medium and deep. A light palpation disturbs only the skin surface and not the underlying breast tissue. A medium palpation examines the middle breast tissue. Finally, a deep palpation requires enough pressure to reach the breast tissue along the rib cage. The three pressure levels are necessary because lumps can be located at any level in the breast tissue. An expert examination covers the entire breast area using a non-redundant pattern of search while incorporating three levels of palpation pressure at each site.

There have been many breast examination patterns developed in order to achieve total coverage of the breast area.

These include concentric circle, spoke and wedge, and vertical strip. The concentric circle pattern is the one most frequently taught in the United States. It consists of a series of concentric circles that begin in the upper outer quadrant of the breast and terminate at the nipple. The spoke and wedge pattern consists of radial spokes that begin on the perimeter of the conical breast and converge at the nipple. With either of these two patterns, the arm pit area is auxiliary and is typically examined as an additional step. The vertical strip pattern recognizes that the area of breast tissue is a rectangular region bordered by the clavicle, the sternum, the fifth rib and the mid-axillary line. This rectangular region is then divided into a series of vertical strips that are examined in sequence. Studies have been conducted to determine the effectiveness of these patterns. One such study showed that the vertical strip pattern provided more thorough coverage of the total breast area: 64.4% vertical strip vs. 38.9% concentric circle and 67.9% vertical strip vs. 44.7% spoke.

Because BSE and CBE are not performed optimally without proper training, there is a need for a user-friendly model training tool. that comprehensively trains breast examination techniques to lay women and health care providers. There is a further need to provide such trainees with immediate feedback in an easily readable, graphic format as to their examination techniques and the thoroughness of their examinations. There is still a further need to test and evaluate trainees under different scenarios to locate different size masses.

SUMMARY OF THE INVENTION

The instrumented breast model (IBM) of the present invention was developed to provide the necessary training to lay women and health care providers for the early detection of breast cancer. The IBM uses a silicone breast model equipped with sensors and data acquisition modules to collect data on examination performance, e.g., finger placement and palpation level (none, light, medium, and deep). This data is evaluated with a fuzzy logic algorithm, and feedback regarding the user's performance is presented to the user in an easily readable graphical format. The IBM is user-friendly so that anyone who is literate and can use a computer mouse can operate the system easily.

Specifically, the IBM comprises a breast model in which a plurality of channels are drilled through the back such that the top of the channel comes within about ¼ of an inch of the top surface of the breast model. One end of a piece of Kevlar string, which is knotted on both sides of a piece of gabardine fabric, is inserted into each channel and secured to the end of the channel. The second end of each piece of string is then attached to a pressure and position sensitive sensor that is able to detect and measure the displacement of the silicone breast model 102 during a practice examination. This displacement data is then converted into a graphical representation that allows the user to view his/her performance over the entire examined area.

The IBM of the present invention also provides the ability of a user to view various educational materials, including, but not limited to, training videos, tutorials, reference materials, and a breast cancer risk estimator.

There are many advantages for a lay person or health care provider using the IBM of the present invention. Due to the high incidence of breast cancer, the IBM provides for improved breast examinations, resulting in the early detection and treatment of breast cancer. In addition, a user's examination methods are evaluated and displayed to the user in a very user-friendly graphical display, providing immediate feedback to the user on which portions of the examination need to be improved. The user interface for the IBM is windows based, thereby providing an easily accessible system that does not require any prior training.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION OF THE PREFERRED EMBODIMENTS

A. Instrumented Breast Model Hardware

Figure 1:
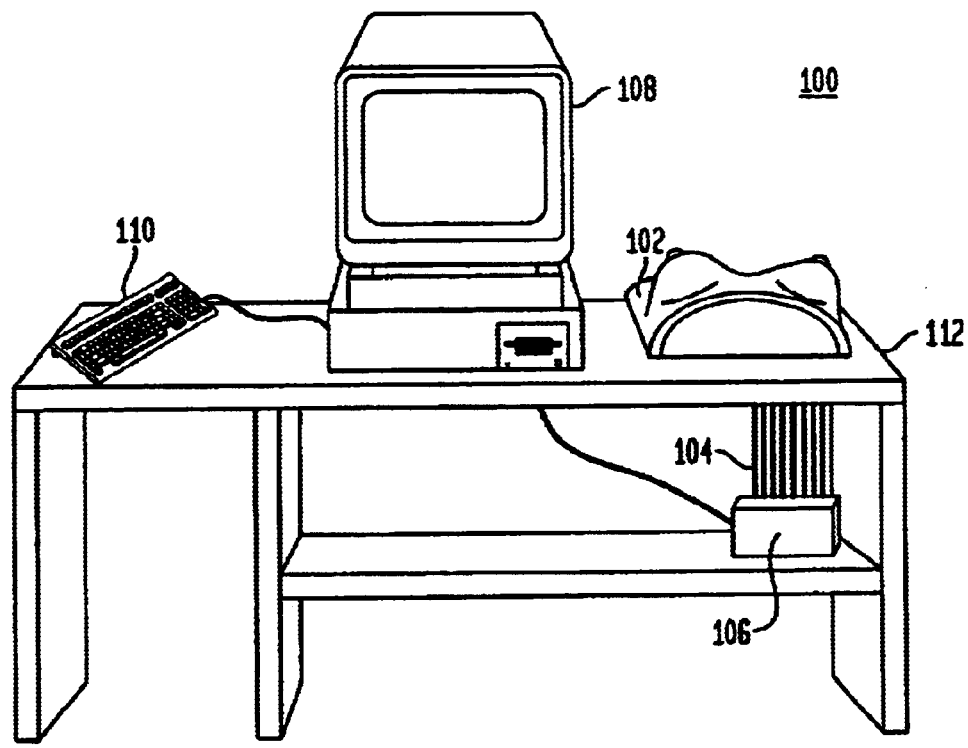
FIG. 1: A perspective diagram of an instrumented breast model (IBM) of the present invention.

FIG. 1 is a perspective diagram of an instrumented breast model (IBM) 100 of the present invention. The IBM 100 comprises a breast model 102 having an anatomically correct shape and life-like feel. In the preferred embodiment, the breast model 102 is a pre-fabricated silicone bilateral design having a base 206, a surface 202 and an inner core 204, e.g., a breast model 102 commercially available by Health Edco of Waco, Tex. The IBM 100 also incorporates a means for detecting displacement of the surface 202 of the breast model 102. Although the preferred embodiment is a breast model 102 made of silicone, this is for convenience purpose only. Any conventional breast model 102 can be used with the present invention.

Figure 2:
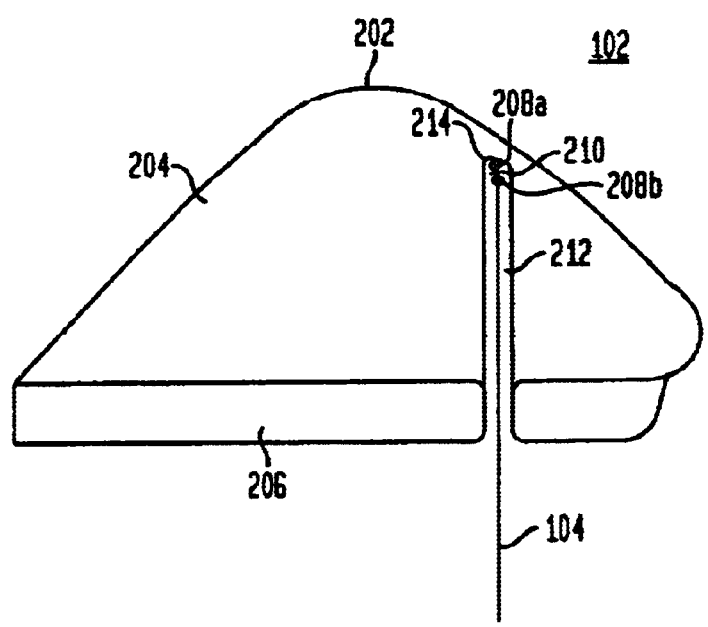
FIG. 2: A cross-sectional view of a breast of an IBM showing a sensor embedded therein.

In the preferred embodiment, the means for detecting displacement of the surface 202 includes eight (8) channels 212 cored from the underside of the breast model 102 such that the terminating end 214 of the channel 212 comes to within one quarter of an inch of the surface 202 of the breast model 102. By means of example, FIG. 2 illustrates one channel 212 drilled through the inner core 204 of the breast model 102 of the present invention. A cork boring tool (number 3) with a one-quarter inch diameter is used to create the channels 210. The IBM 100 of the present invention discloses a channel 212 being ¼ of an inch in diameter and the terminating end 214 of the channel 212 positioned within ¼ of an inch from the surface 202 of the breast model 102 for convenience purpose only. The channel 212 may have any diameter that provides for a string 104 to fall freely through the channel 212 (as described below), that allows for the desired number of channels 212 to be drilled into the inner core 204 of the breast model without the channels 212 interfering with each other, and that is stable such that the walls of the channel 212 do not collapse. Similarly, the terminating end 214 of a channel 212 must be a distance from the surface 202 of the breast model 102 such that the user 1018 cannot feel the terminating end 214 of the channel 212 yet the means for detecting displacement of the surface 202 is functional.

As shown in the figures, the right side of the breast model 102 is used for convenience purpose only. It would be readily apparent for one of ordinary skill in the relevant art to use either or both breasts of a breast model 102 as an IBM 100 of the present invention.

Figure 10A:
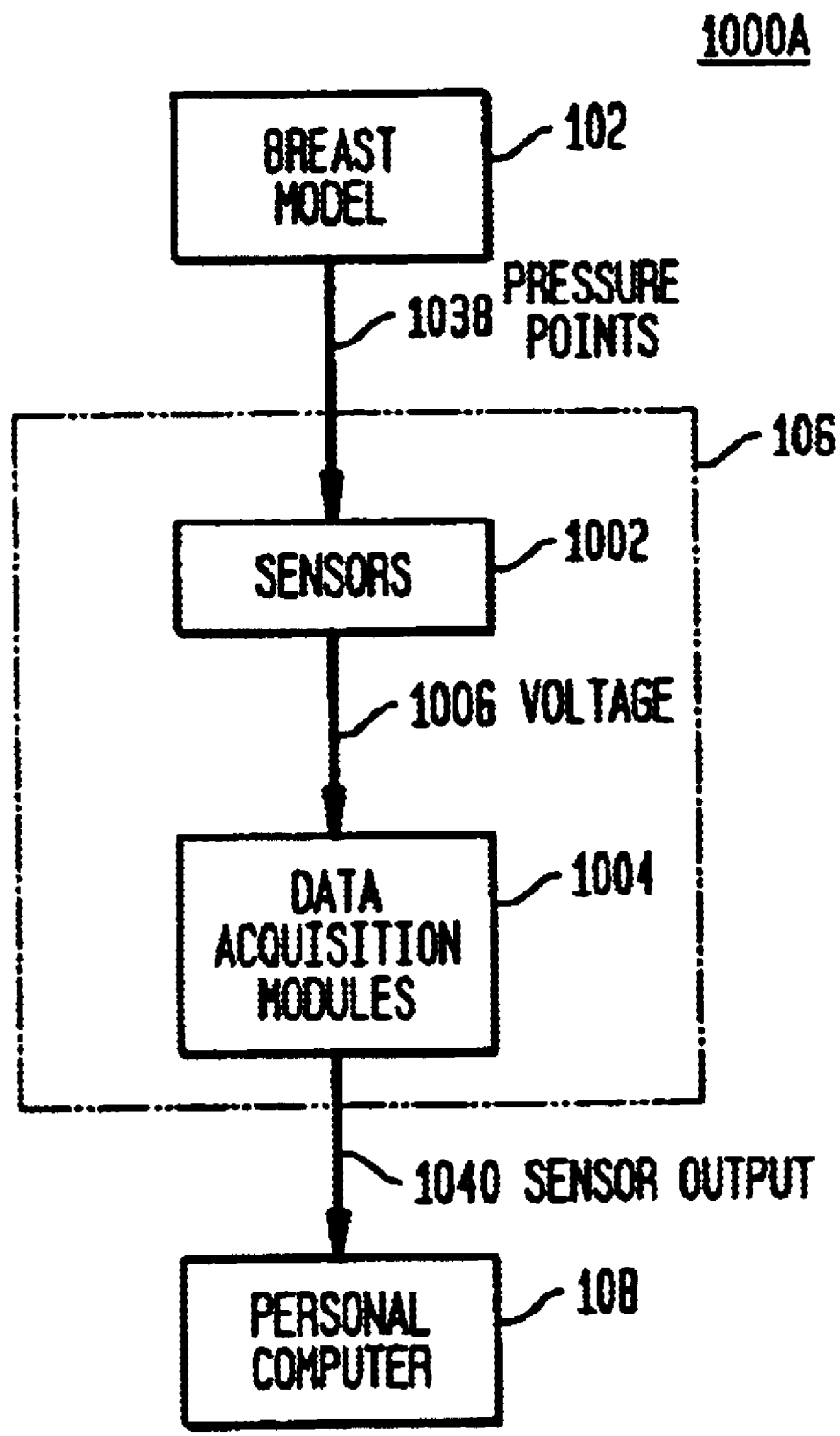
FIG. 10A: A block diagram showing the hardware components of the IBM.
Figure 10B:
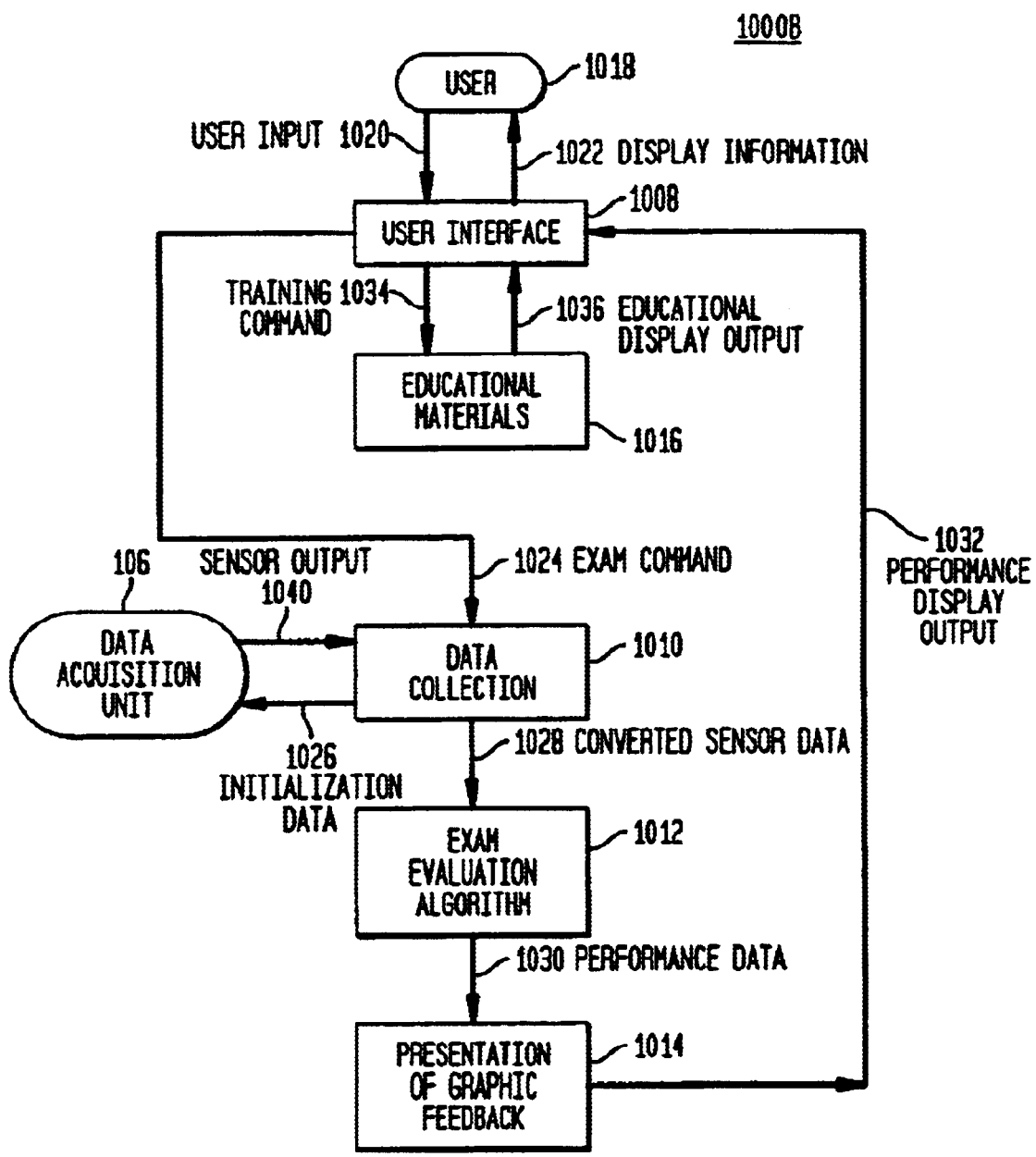
FIG. 10B: A block diagram showing the software components of the IBM and the data flow between the software components.

Also in the preferred embodiment, eight sensors 1002 are each attached to the breast model 102 by a piece Keviar string 104. See FIG. 10A. The sensors 1002 are housed in a data acquisition unit 106 which has a RS-232 serial port connection with a personal computer 108. In the preferred embodiment, the data acquisition unit 106 comprises a plurality of sensors 1002 and data acquisition modules 1004 which are all commercially available and discussed in greater detail below.

In the preferred embodiment, each piece of Kevlar string 104, measuring approximately ten (10) inches in length, is sewn through small circles, or swatches, of gabardine fabric 210. The string 104 is knotted tightly against both sides of the fabric 210, resulting in a top knot 208a and a bottom knot 208b. The use of a top knot 208a and bottom knot 208b is preferred in order to prevent the string 104 from being pulled out of the fabric 210. Each piece of string 104 is then inserted, top knot 208a first, through the back 206 of the breast model 102 into a pre-drilled channel 212 until the top knot 208s and fabric 210 contacts the terminating end 214 of the channel 212. A heated rod approximately ⅛ of an inch in diameter is then inserted into the channel 212 to "melt" the gabardine fabric 210 into the silicone 204 of the breast model 102. After applying this technique for securing each piece of string 104 to the terminating end 214 of a channel 212, each piece of string 104 is firmly adhered to the inside surface of the breast model 102, but falls freely along the length of the channel 212 and out the back 206 of the breast model 102.

The breast model 102 and the means for detecting displacement in the surface 202 of the breast model 102 is described in these terms for convenience only. It would be readily apparent for one of ordinary skill in the relevant art to drill a different number of channels 212, e.g., 16 channels 212, in the inner core 204 of a breast model 102 and thereby use a different number, e.g., of sensors 1002, e.g., 16 channels 212. Likewise, the use of ten inch pieces of string 104 is for convenience purposes only, any length of string 104 can be used provided the string 104 is long enough to fall through a channel 212 and the base 206 of the breast model 102 and attach to a sensor 1002. Also, the use of Kevlar string 104 is for convenience purpose, any comparable type of string can be used.

In addition, the use of a swatch of gabardine fabric 210 is also for convenience purpose only. It would be readily apparent for one of ordinary skill in the relevant art to use an alternative means for attaching a piece of string to the terminating end 214 of a channel 212. For example, any stiff or mesh fabric (such as embroidery cloth) is sufficient wherein the top knot 208a cannot be pulled through the fabric. Alternatively, the fabric or mesh used may be embedded within the silicone of the inner core 204 at the terminating end 214 of the channel 212, thereby securing the top of the string 104 to the terminating end 214. As yet another alternative, the top end of the string 104 may also be attached to the terminating end 214 of a channel 212 by means of caulking or a silicone adhesive.

For convenience to the user, the breast model 102, personal computer 102, and keyboard 110 are positioned on a desk 112. Eight holes are drilled into the top of the desk which correspond to the location of the eight channels 210 drilled into the back of the breast model 102. Therefore, when placed over the holes, the pieces of string 104 extending beyond the back 206 of the breast model 102 are aligned with the holes in the desk 112 such that the strings 104 pass through the holes in the desk 112. The bottom ends of the strings 104 are then attached to the sensors 1002 in the data acquisition unit 106 by conventional means, e.g., a crimping clamp.

The sensors 1002 are individually wired to one or more data acquisition modules 1004 that are connected to a serial port in the personal computer 108 all of which is described in greater detail below. Furthermore, the use of eight sensors 1002 is for convenience purpose only. It would be readily apparent for one of ordinary skill in the relevant arts to use a different number of sensors 1002, e.g., sixteen, and in a different configuration throughout the examination area.

It is believed that the IBM 100 of the present invention is described in sufficient detail that one of ordinary skill in the relevant arts would be able to design, manufacture and operate a IBM 100.

In operation, a user performs a breast examination on the breast model 102 wherein the displacement of the silicone, i.e., the degree of pressure at any given point exerted by the user during the examination, is captured by the sensors 1002. The analog output voltage 1006 of each sensor 1002 represents this pressure point 1038. The data acquisition modules 1004 convert the voltage 1006 to sensor output 1040 which are digital representations of the analog voltage 1006. The data acquisition modules 1004 then send the sensor output 1040 to the personal computer 108. IBM software executing on the personal computer 108 analyzes the sensor output 1040 and displays performance results to the user.

Figure 3:
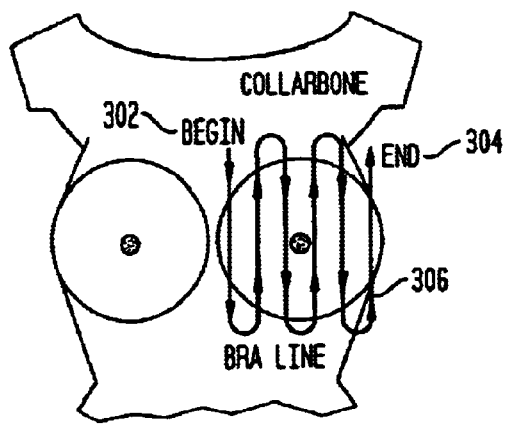
FIG. 3: A perspective diagram of a vertical strip breast examination pattern.
Figure 5:
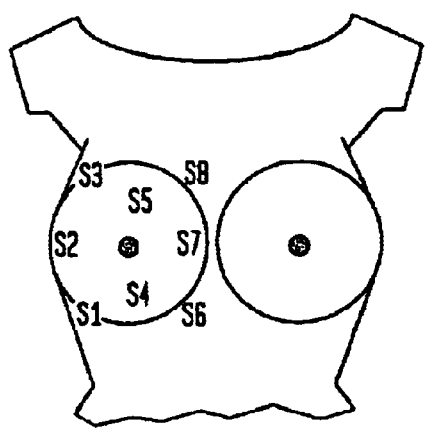
FIG. 5: A perspective diagram illustrating a preferred sensor placement of eight sensors within the IBM of the present invention.
Figure 7:
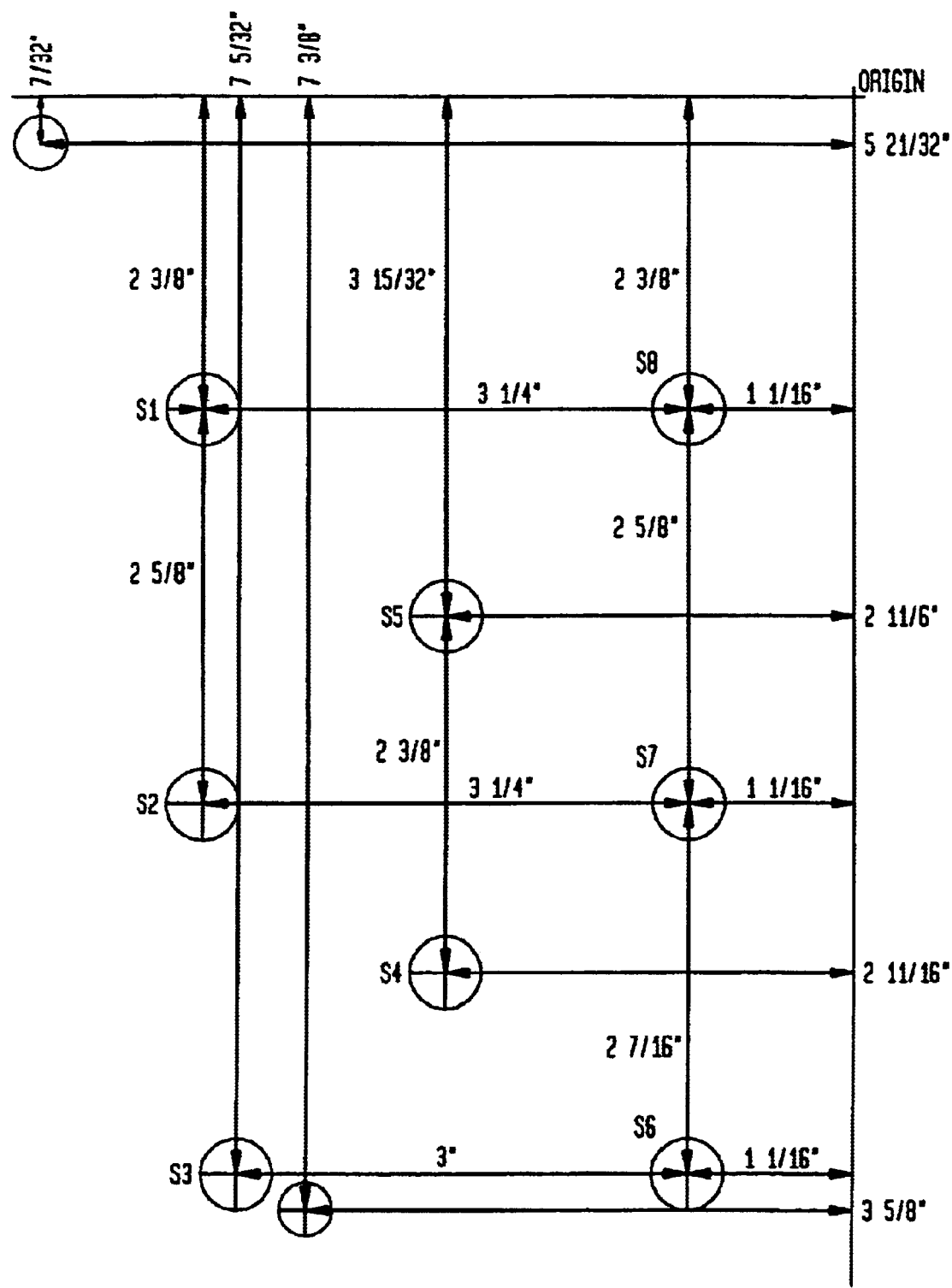
FIG. 7: An alternative sensor placement for eight sensors within the IBM.
Figure 8:
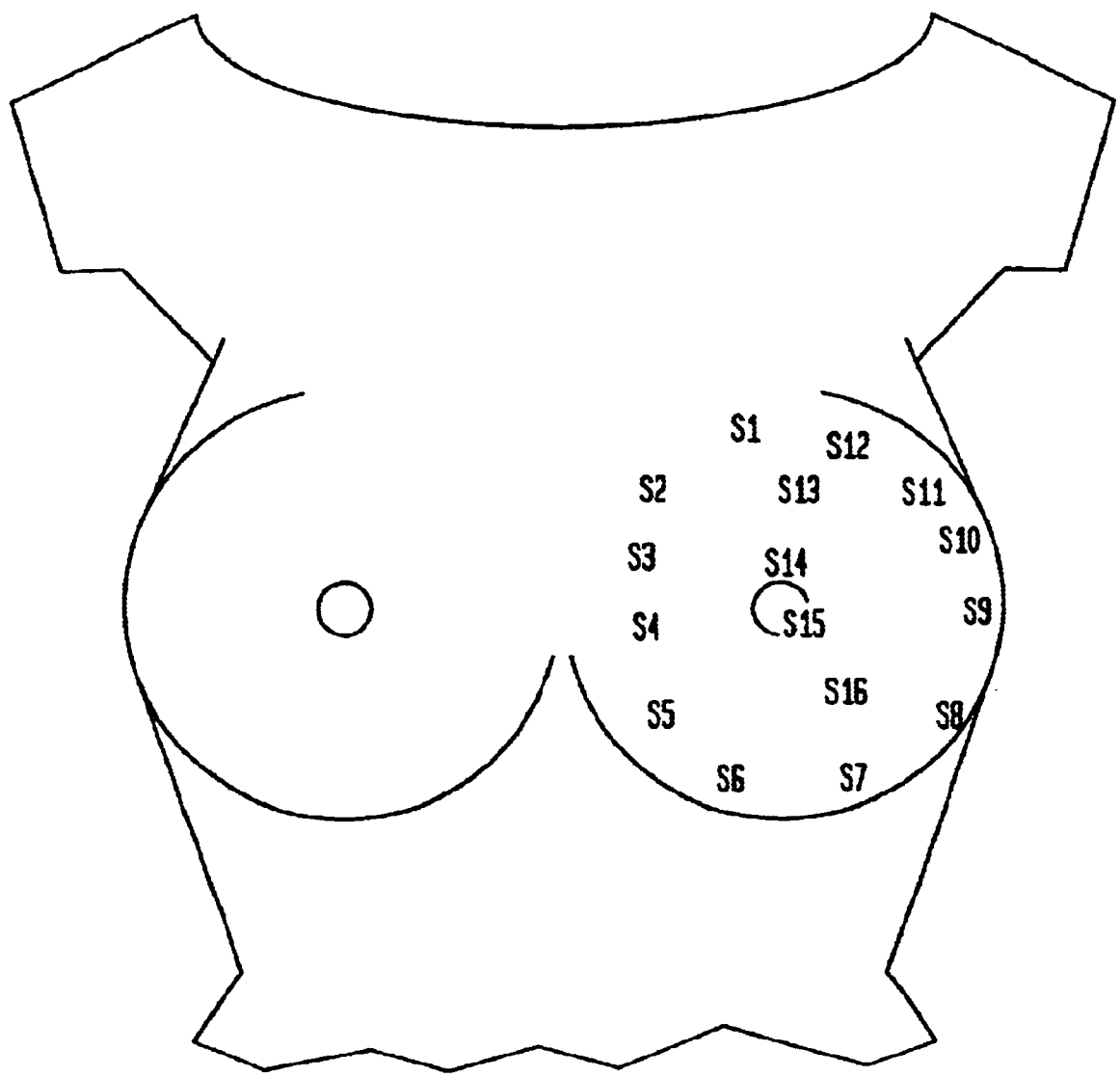
FIG. 8: A perspective diagram illustrating a preferred sensor placement of sixteen sensors within the IBM of the present invention.
Figure 9:
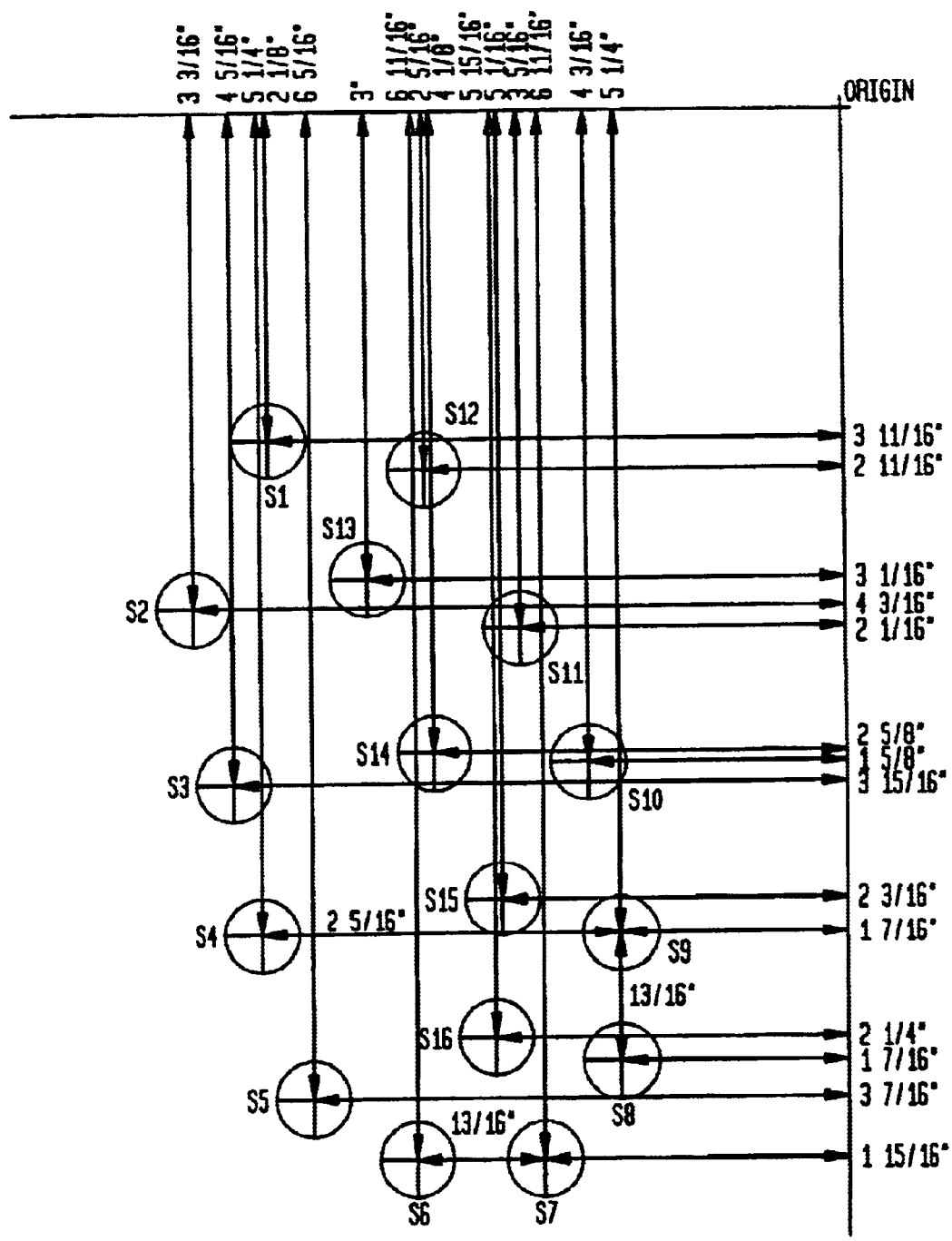
FIG. 9: A planar grid showing sensor placement for sixteen sensors within the IBM.

In the preferred embodiment, the sensors 1002 of the present invention are arranged in the breast model 102 to accommodate the vertical strip breast examination pattern. The vertical pattern is performed on the tested area in a path shown by the arrows in FIG. 3. A user begins the examination at a Begin Point 302, then traverses the area to be examined in an up-down, vertical pattern until an End Point 304 is reached. FIGS. 5 and 7 illustrate the preferred sensor 1002 placements within the breast model 102. The eight sensors 1002 are labeled S1–S8. Similarly, FIGS. 8 and 9 illustrate the preferred sensor 1002 placement within the breast model 102 when using sixteen sensors 1002. The sensor 1002 configuration and measurements used in these preferred embodiments are for convenience purpose only. It would be readily apparent for one of ordinary skill in the relevant art to position the sensor 1002 using a different configuration and different measurements.

In an alternative embodiment, an overlay containing different size and density lumps or masses may be placed over the breast model 102 to test the user in locating foreign masses in the breast model 102. Alternatively, different size and density lumps may be embedding within the inner core 204 of the breast model 102. Breast models 102 incorporating lumps of different size and density are well known in the prior art and are commercially available. Therefore, it would be readily apparent for one of ordinary skill in the relevant art to include such lumps in the IBM 100 of the present invention.

B. Instrumented Breast Model Software

The IBM software processes, analyzes and displays the sensor output 1040 from the data acquisition unit 106. There are five main components of the IBM software: user interface 1008, data collection 1010, exam evaluation algorithm 1012, presentation of graphic feedback 1014, and educational materials 1016. The preferred user interface 1008 is a graphical user interface (GUI) for input and output. For convenience purpose only, the user interface 1008 is based on the use of a mouse and "point and click" operations. It would be readily apparent for one of ordinary skill in the relevant art to use a different means of user input, e.g., pressure sensitive screen, light pen, keyboard, etc. The data collection 1010 component reads the sensor output 1040 from the data acquisition modules 1004, converts the sensor output 1040 into converted sensor data 1028, and stores the converted sensor data 1028 in a Microsoft Excel Worksheet for later evaluation. The exam evaluation algorithm 1012 incorporates well known techniques of fuzzy logic to determine the user's finger position and palpation level, collectively performance data 1030, from the converted sensor data 1028 generated in the data collection component 1010. This user performance data 1030 is sent to the presentation of graphic feedback 1014 component for a concise, intuitive presentation of exam performance results to the user. The preferred embodiment of the IBM software 1006 also incorporates educational materials 1016 comprising an interactive video on examination techniques, a breast cancer risk estimator, a tutorial dealing with breast cancer, breast examinations and how to operate the IBM 100 of the present invention.

1. User Interface 1008

The IBM 100 of the present invention uses a graphical user interface (GUI) to interact with users. In the preferred embodiment, the GUI was developed using Microsoft Visual Basic. The user-friendly GUI was designed so that the IBM 100 can be easily operated by lay women as well as health care providers. This was done by incorporating all software 1006 components into one Windows based software package and simplifying user input 1020.

The ability to combine system components into one package greatly simplified ease of operation. In an effort to improve user-friendliness, human factor issues were examined and applied to the IBM. The human factors objective was to develop a system that could be operated by any person who could read and operate a computer mouse. First, excess user inputs 1020, such as entering a data file name, were eliminated. Then, all user input 1020 was converted to "point and click" operation through command buttons and option buttons in the GUI. To limit the amount of information presented to the user via display information 1022 and to eliminate confusion, all windows are shown in full screen mode. For ease of use, command buttons are large, and textual display information 1022 was done with medium size fonts (Font: Comic Sans MS, Size: 14 to 16). For clarity, each option is briefly explained beside its respective command button. The GUI design allows users of any knowledge level to use the IBM 100 without difficulty.

The preferred software for the user interface 1008 is disclosed below.

2. Data Collection 1010

In the preferred embodiment, the IBM's 100 sensors 1002 are the commercially available Trans-Tek Linear Voltage Displacement Transducers (LVDTs) Model 0244. The LVDTs 1002 consist of an inner core and an outer coil assembly. As the core moves through the coil assembly, an excitation voltage 1006 is produced. This voltage 1006 is proportional to the displacement of the core from a known zero reference position. When the LVDT core is attached to the silicone breast model 102 of the present invention, via the strings 104, an increasing output voltage 1006 is produced as increasing downward displacement is applied to the surface 202 of the breast model 102. Each LVDT 1002 has four wires: two for DC power and two for output. The use of LVDTs as the sensor 1002 in the preferred embodiment of the present invention is for convenience purposes only. It would be readily apparent to one of ordinary skill in the relevant art to use a comparable type of sensor or means for detecting displacement with the IBM 100 of the present invention, e.g., a pressure sensitive composite material.

Figure 11:
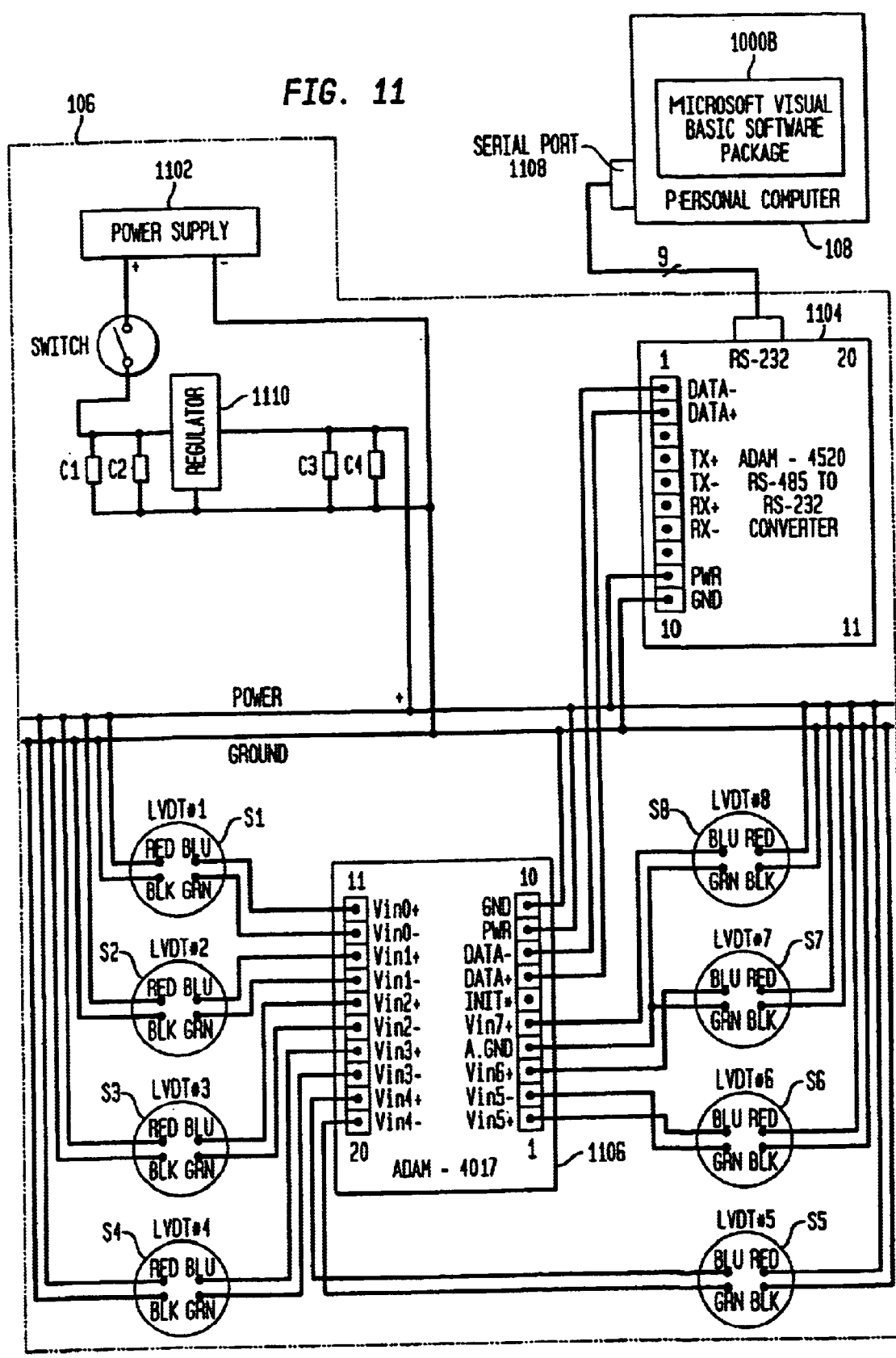
FIG. 11: An electrical schematic showing connections for the IBM having eight sensors.
Figure 12A:
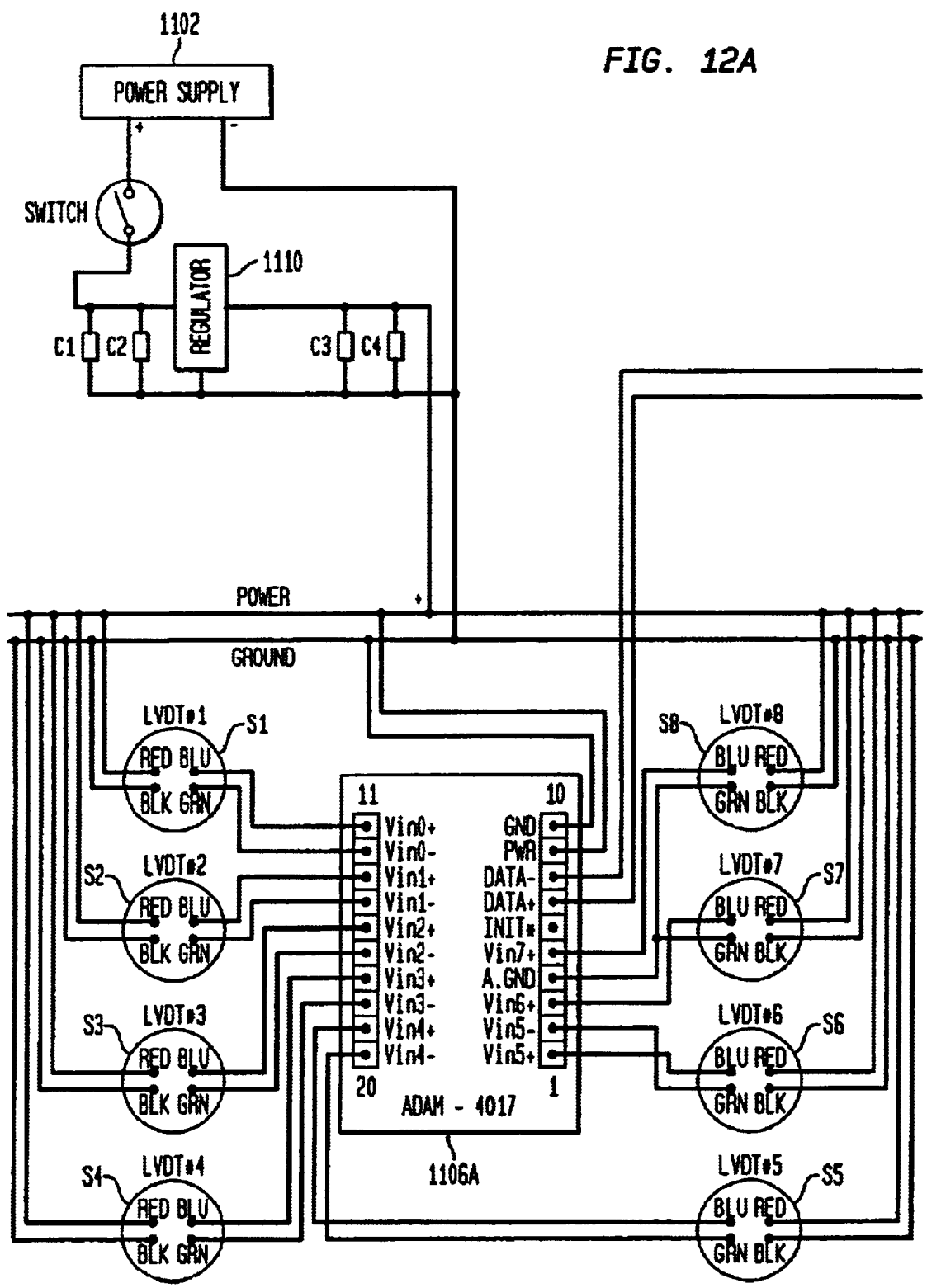
FIGS. 12A,B: An electrical schematic showing connections for the IBM having sixteen sensors.
Figure 12B:
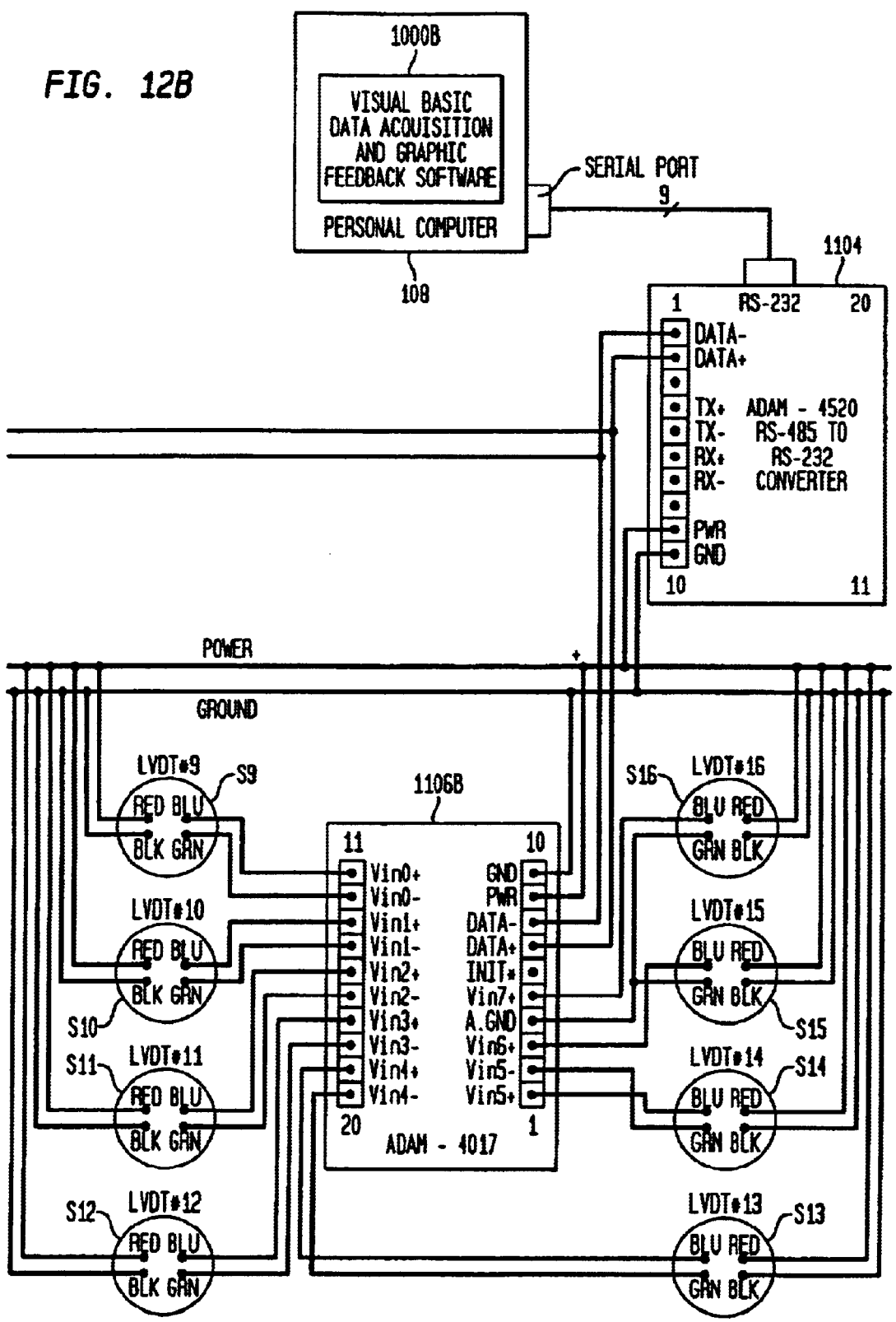

Also in the preferred embodiment, the data acquisition modules 1004 of the IBM 100 are commercially available ADAM 4000 Series data acquisition modules 1106. Specifically, the ADAM-4017 8-channel Analog Input Module 1106 is used to read the LVDT 1002 output voltages 1006. There is one LVDT 1002 connected per channel on the ADAM-4017 1106. The ADAM-4017 1106 sends its output through a standard, commerically available two wire RS-485 interface. Further, the ADAM-4520 Isolated RS-232 to RS422/RS-485 Converter 1104 is used to convert the ADAM-4017 RS-485 output to RS-232 output to send the sensor output 1040 to a personal computer 108 via a serial port 1108. An AC power adapter 1102, which in the preferred embodiment is 12V DC, 1000 mA, and voltage regulator (7412) 1110 are used to power the system. FIG. 11 illustrates the IBM 100 system wiring diagram wherein the eight LVDTs 1002 are indicated as S1–S8. Similarly, FIGS. 12A,B illustrate the preferred wiring diagram using sixteen LVDTs 1002 as shown as S1–S16. These wiring diagrams are the preferred configuration but are for convenience purpose only. It would be readily apparent to one of ordinary skill in the relevant art to use a comparable wiring configuration of the shown components.

The data collection 1010 software component sends initialization data 1026 to the data acquisition unit 106. Specifically, the data collection 1010 initializes the following variables relating to the serial communications port settings: port being used, baud rate, parity, number of data bits and number of stop bits. Next, the data collection 1010 calibrates each LVDT 1002 to determine an offset for zero reference. The data acquisition modules 1004, ADAM-4017's 1106, built in A/D converter converts the analog sensor voltage 1006 to digital data, called sensor output 1040. For each of the eight channels on the ADAM-4017 1106, the data collection 1010 sends a command to read the sensor 1002 voltage 1006 from a given channel of the data acquisition module 1004 at a given address, e.g., "#015" means read channel 5 of module at address 01h.

For each sensor 1002 reading, the respective calibrated offset voltage is subtracted from the given value. This voltage is converted to inches using the sensitivity rating given on the sensor 1002 calibration record as provided by the manufacturer. Negative values are set to zero. The resultant value, converted sensor data 1028, is stored in the previously opened Excel Worksheet. One data record in the worksheet consists of the elapsed time (in seconds) and each of the eight sensor 1002 data (in inches) for the given time instant. In the preferred embodiment, data is read approximately three times per second but this is for convenience only. It would be readily apparent to one of ordinary skill in the relevant arts to read the voltage 1006 data at a different rate, e.g., two times per second. Table 1 gives an excerpt from a data file. When the examination is complete, this file is automatically saved with the personal computer's 108 current date and time as the filename. This insures a unique name for each data set.

is given by the maximum sensor 1002 displacement, one inch for the sensor 1002 used. The result is one fuzzy grade, zero to one, for each sensor 1002.

The crisp output necessary for the finger position fuzzy engine is an x-coordinate and a y-coordinate, which represents the user's hand position on the silicone breast model 102. Hence, there is an output fuzzy membership function for the x position and one for the y position. These membership functions are derived from a grid setup around the sensor 1002 layout pattern.

Figure 6:
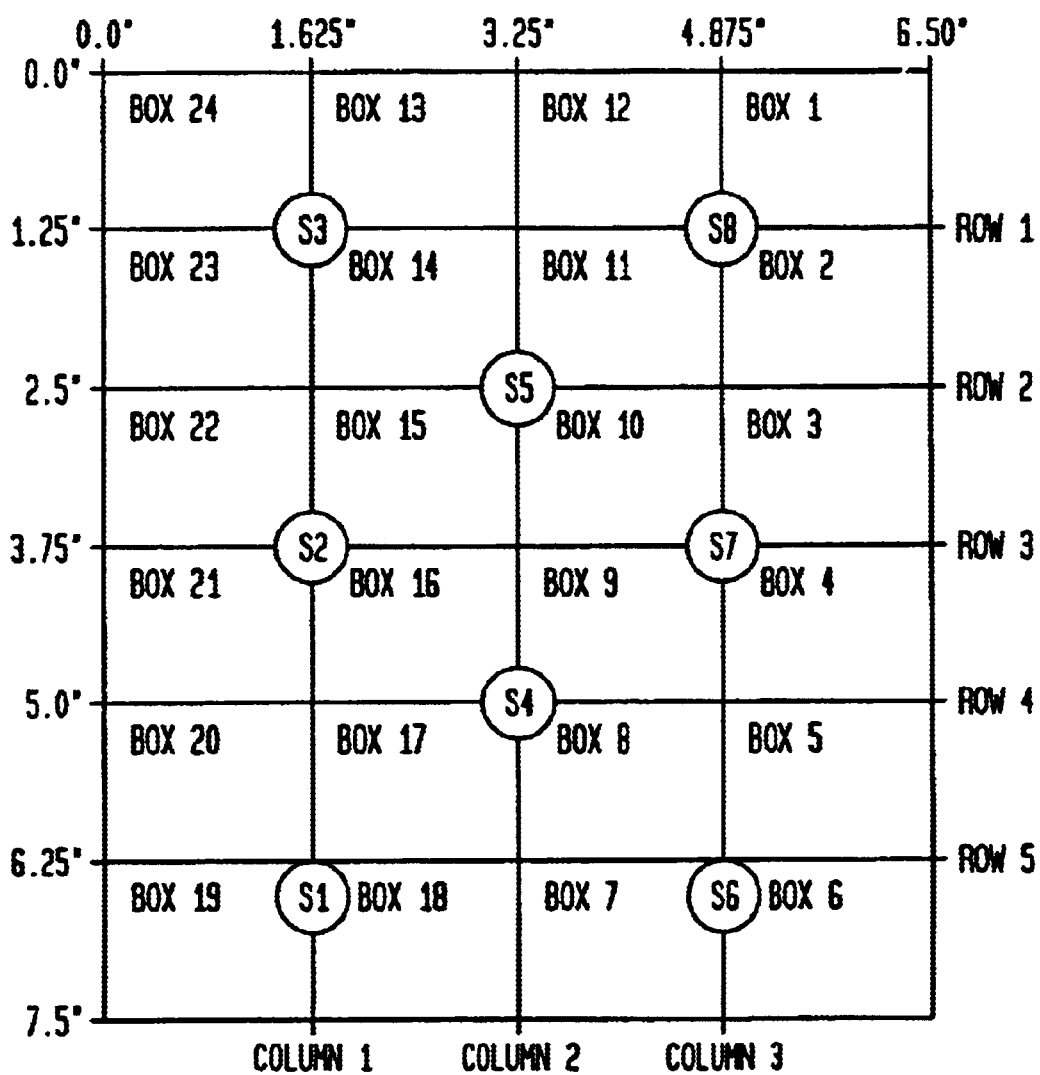
FIG. 6: A planar grid showing membership function development for eight sensors.
Figure 13:
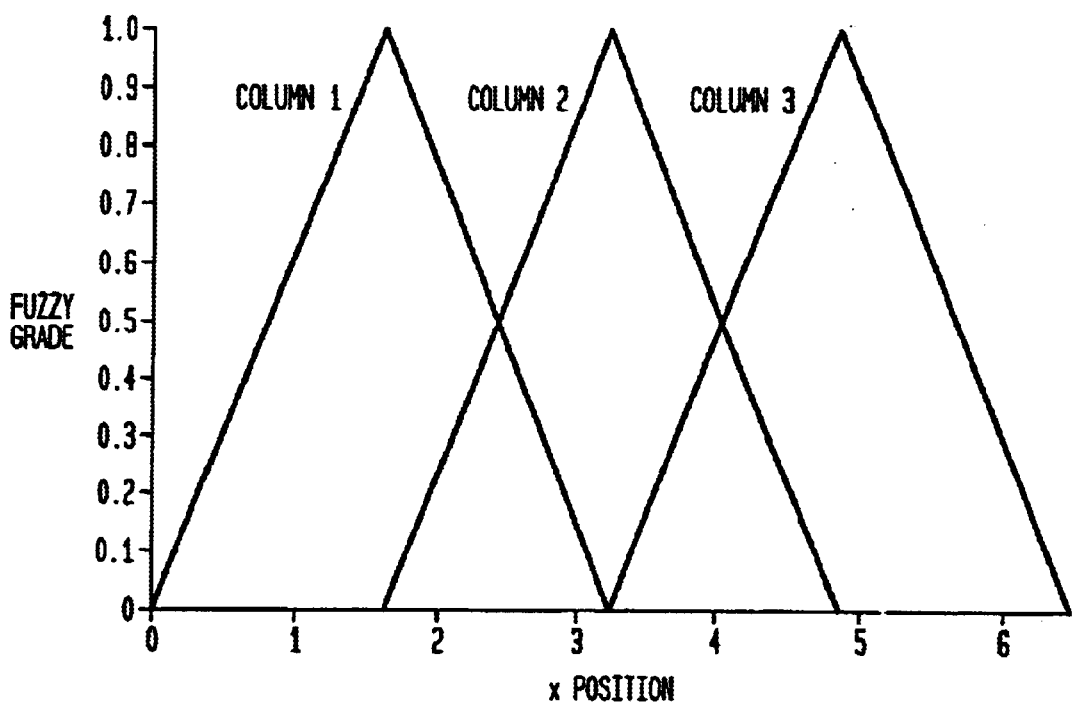
FIG. 13: A planar graph showing the x-position fuzzy membership function.
Figure 14:
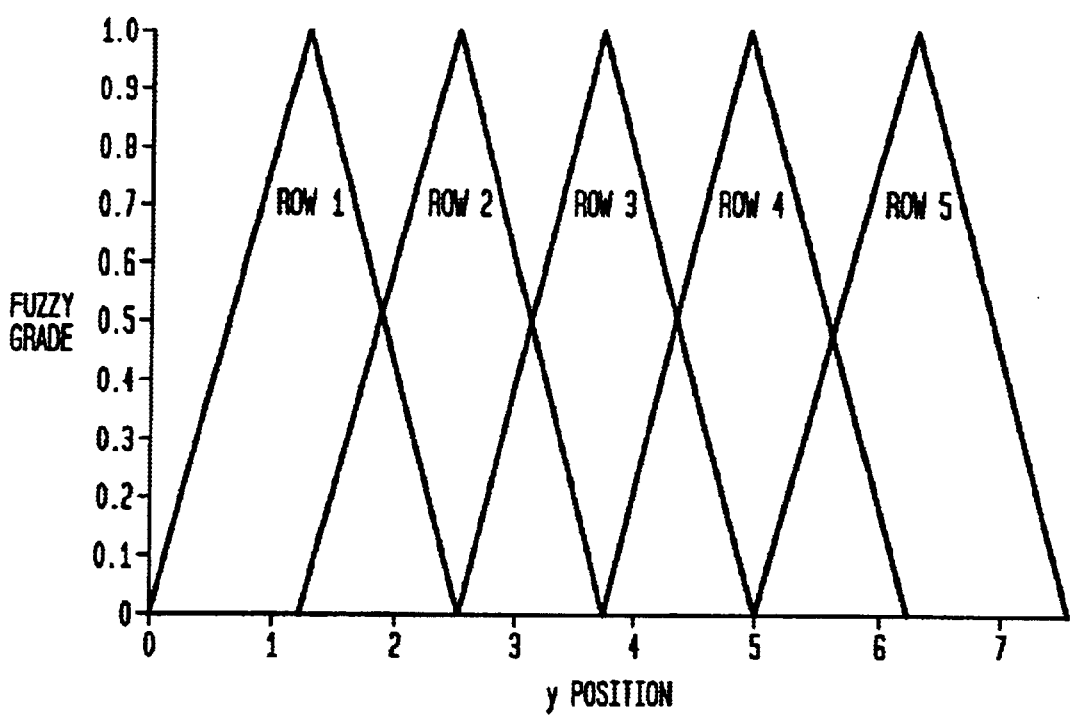
FIG. 14: A planar graph showing the y-position fuzzy membership function

The preferred embodiment of the grid 600 is shown in FIG. 6 and represents the examined area of the breast. The grid 600 consists of three columns (x position) and five rows (y position). The membership functions are triangles centered on the column or row location within the grid 600. Consequently, the x position has three triangles, as shown in FIG. 13, and the y position has five triangles, as shown in FIG. 14.

The fuzzy rules are based on sensor 1002 locations within the rows and columns: Column 1, sensor 1, 2 and 3; Column

TABLE 1

Sample Data File

| Elap. Time (sec) | LVDT #1 (Inches) | LVDT #2 (Inches) | LVDT #3 (Inches) | LVDT #4 (Inches) | LVDT #5 (Inches) | LVDT #6 (Inches) | LVDT #7 (Inches) | LVDT #8 (Inches) |
|---|---|---|---|---|---|---|---|---|
| 0 | 6.56E−18 | 0 | 0 | 0.001009 | 0.000642 | 0 | 0 | 0 |
| 0.328125 | 6.56E−18 | 0 | 0 | 0.001.009 | 0.000642 | 0 | 0 | 0 |
| 0.65625 | 6.56E−18 | 0 | 0 | 0.0011 | 0.000183 | 0 | 0 | 0 |
| 0.9375 | 6.56E−18 | 0 | 0 | 0.0011 | 0.000183 | 0 | 0 | 0 |
| 1.207031 | 6.56E−18 | 0 | 0 | 0.0011 | 0.000183 | 0 | 0 | 0 |
| 1.539063 | 6.56E−18 | 0 | 0 | 9.17E−05 | 1.76E−19 | 0 | 0 | 9.17E−05 |

The preferred software for the data collection 1010 is disclosed below.

3. Exam Evaluation Algorithm 1012

Once the converted sensor data 1028 is collected, it is sent to the exam evaluation algorithm 1012 in order to provide the user 1018 with user-friendly, graphical feedback in terms of examination performance display output 1032. The evaluation of the examination involves determining the user's 1018 finger position and the palpation level performed for each data record, i.e., for each sensor 1002 area, (collectively, the performance data 1030). In the preferred embodiment, the exam evaluation algorithm 1012 uses a fuzzy logic evaluation algorithm written in Microsoft Visual Basic software. This algorithm 1012 is broken into two fuzzy engines: the finger position fuzzy engine and the palpation level fuzzy engine.

There are six components which have to be developed for each fuzzy engine: crisp input, input membership functions, fuzzy rules, output membership functions, crisp output and evaluation method. The following two sections discuss the development of these components for each of the fuzzy engines mentioned above. Fuzzy logic is well know in the relevant arts. It would be readily apparent to one of ordinary skill in the relevant arts to implement the fuzzy logic algorithms described herein.

a. Finger Position Fuzzy Engine

Figure 4:
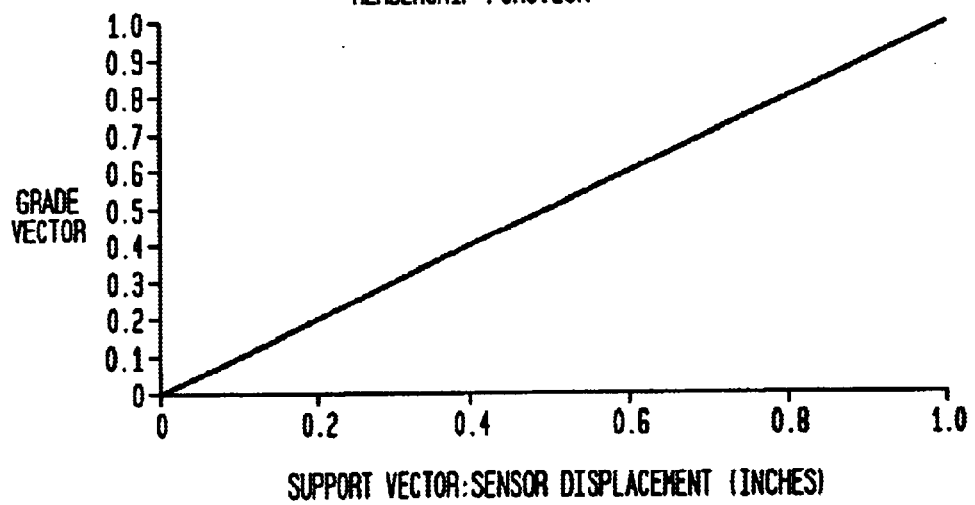
FIG. 4: A graph showing the sensor displacement input fuzzy membership function.

The crisp inputs to the finger position fuzzy engine are the eight sensor 1002 data values. Finger position can be derived from the sensor 1002 readings in relation to the sensor 1002 layout, wherein the sensor 1002 with the maximum reading is closest to the user's 1018 hand, and the sensor 1002 with the minimum reading is furthest from the user's 1018 hand. The input fuzzy membership function represents this relationship; therefore, a large membership function was selected as shown in FIG. 4. The length of the support vector 2, sensor 4 and 5; Column 3, sensor 6, 7 and 8; Row 1, sensor 3 and 8; Row 2, sensor 5; Row 3, sensor 2 and 7; Row 4, sensor 4; and Row 5, sensor 1 and 6. Based on this configuration, Table 2 below shows the fuzzy rules, which were developed:

TABLE 2

Fuzzy Rules for Finger Position Fuzzy Engine x-coordinate

| IF | THEN |
|---|---|
| sensor 1 or sensor 2 or sensor 3 | Column 1 |
| sensor 4 or sensor 5 | Column 2 |
| sensor 6 or sensor 7 or sensor 8 | Column 3 | y-coordinate

| IF | THEN |
|---|---|
| sensor 3 or sensor 8 | Row 1 |
| sensor 5 | Row 2 |
| sensor 2 or sensor 7 | Row 3 |
| sensor 4 | Row 4 |
| sensor 1 or sensor 6 | Row 5 |

The two sets of fuzzy rules were evaluated with the "if-then product" function. This function scales down the output membership function by the corresponding input fuzzy grade. The maximums of each of these results were then sent to centroid functions. The output from each centroid function gives the hand position: one x-coordinate and one y-coordinate. This coordinate pair provides the first essential information for exam performance evaluation 1012.

b. Palpation Level Fuzzy Engine

The second part of evaluating the exam performance data 1030 is determining the palpation level performed at the given location. The palpation level evaluation involves comparing the user's performance data to an expert data set. The crisp inputs to this fuzzy engine are an average of each sensor's 1002 voltage 1006 data for the given time instant, one previous time instant and one next time instant.

Input fuzy membership functions are needed for the palpation level fuzzy engine. There were several issues involved with developing these functions. Sensor 1002 displacement values vary based on string 104 location within the breast model 102. The closer the strings 104 are to the surface 202 of the breast model 102, the greater the displacement of the sensor core for a given pressure level. In addition, because the central portion 204 of the breast model 102 is thicker, greater displacements can occur. Therefore, each sensor 1002 requires different membership functions.

Figure 15:
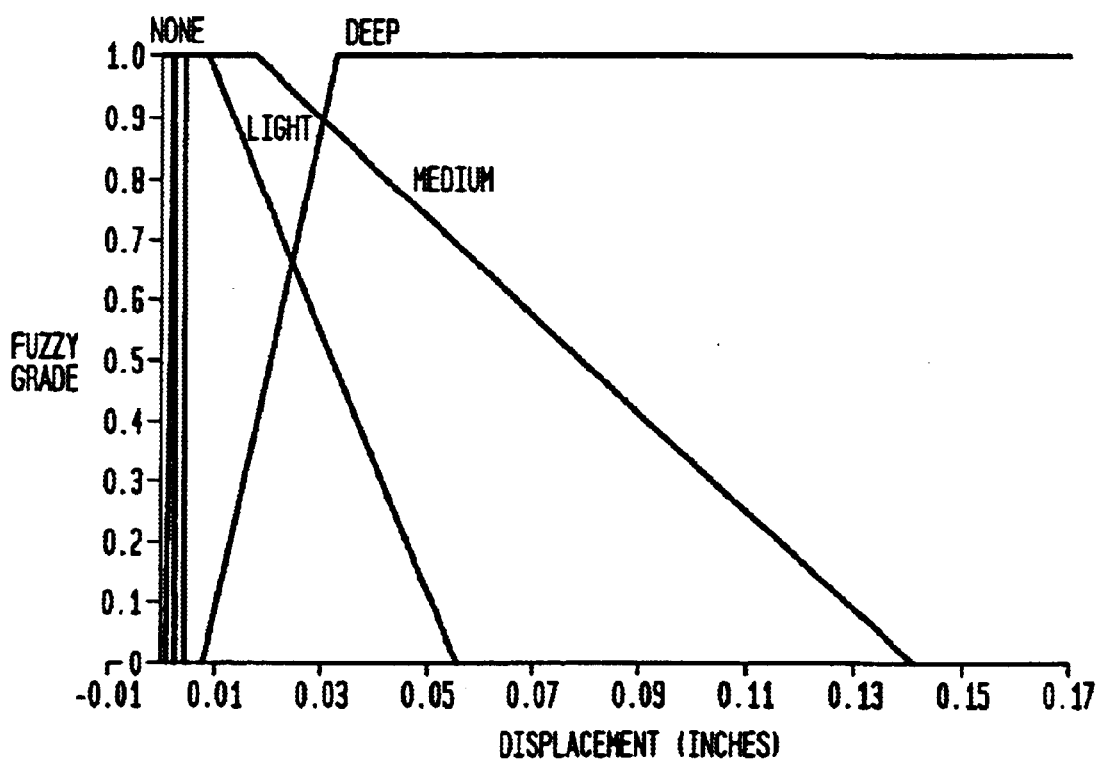
FIG. 15: A planar graph showing palpation level membership functions for sensor 1.
Figure 16:
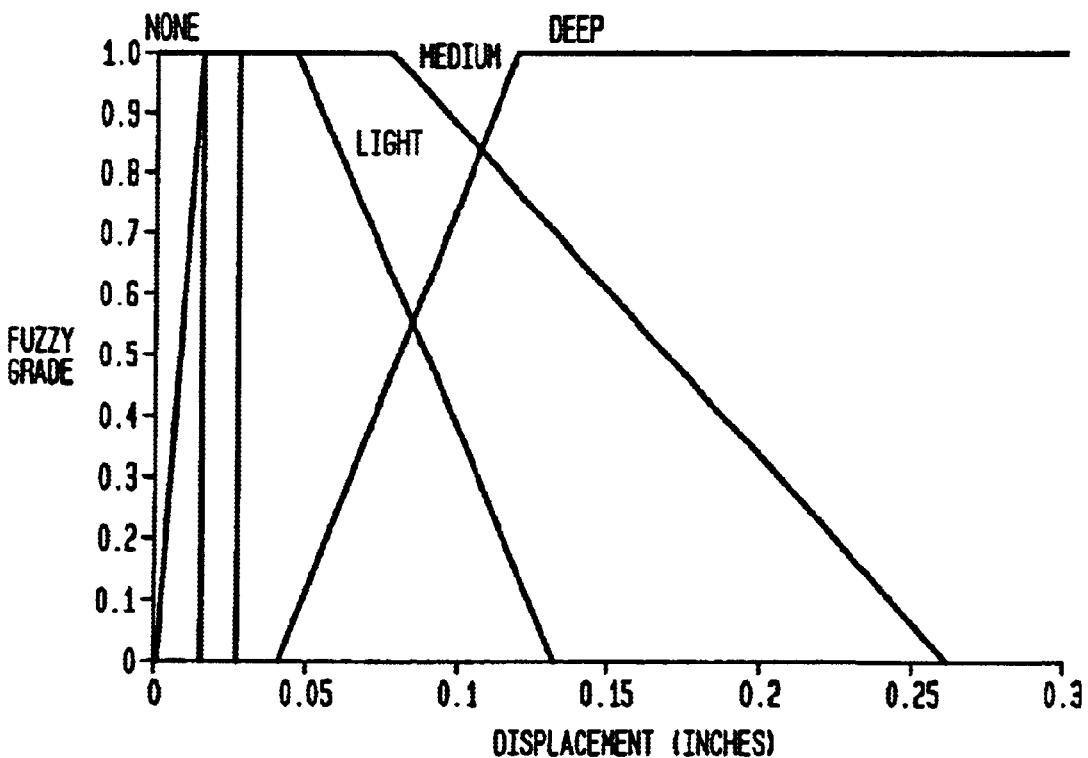
FIG. 16: A planar graph showing palpation level membership functions for sensor 2.
Figure 17:
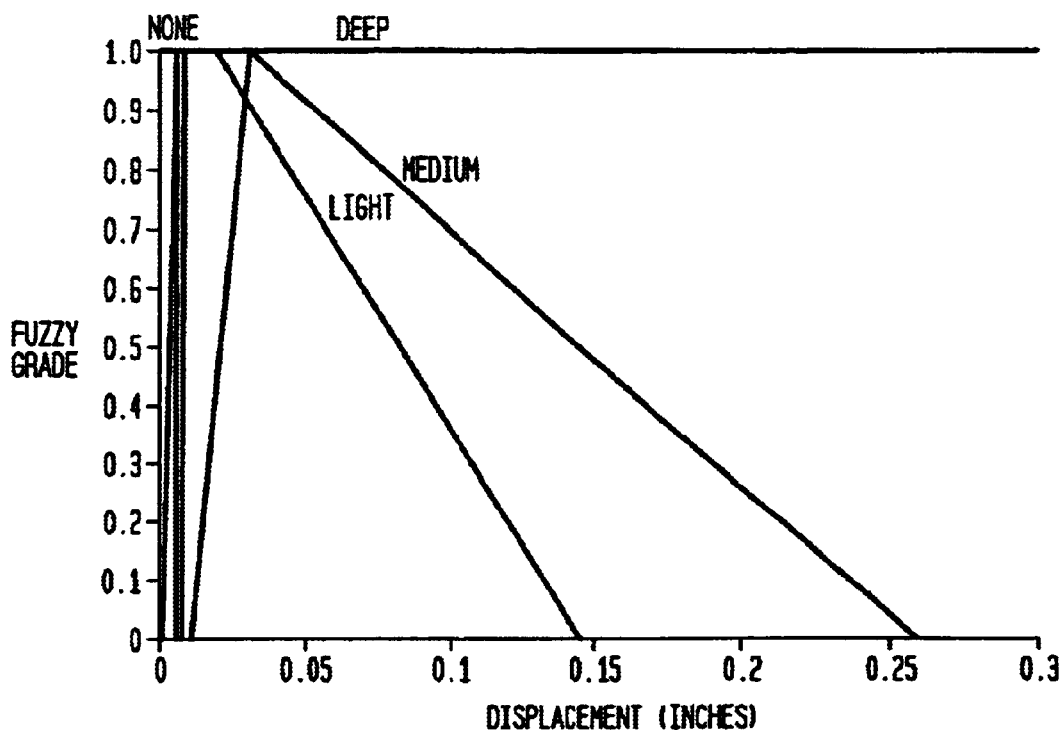
FIG. 17: A planar graph showing palpation level membership functions for sensor 3.
Figure 18:
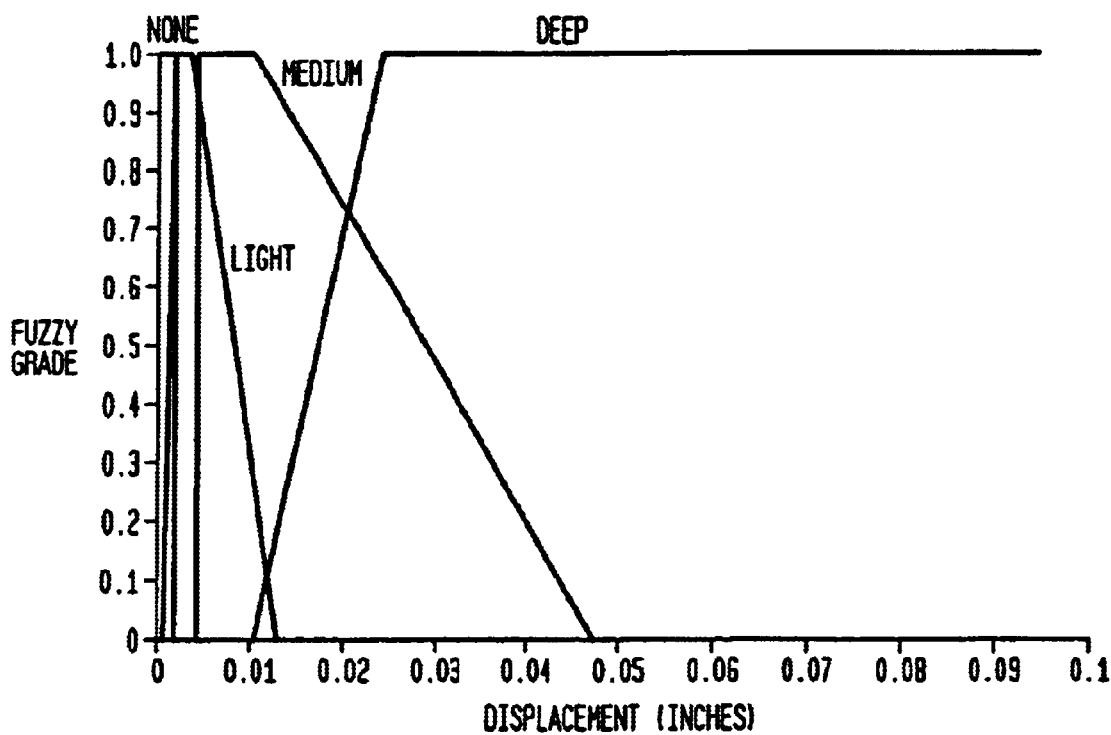
FIG. 18: A planar graph showing palpation level membership functions for sensor 4.
Figure 19:
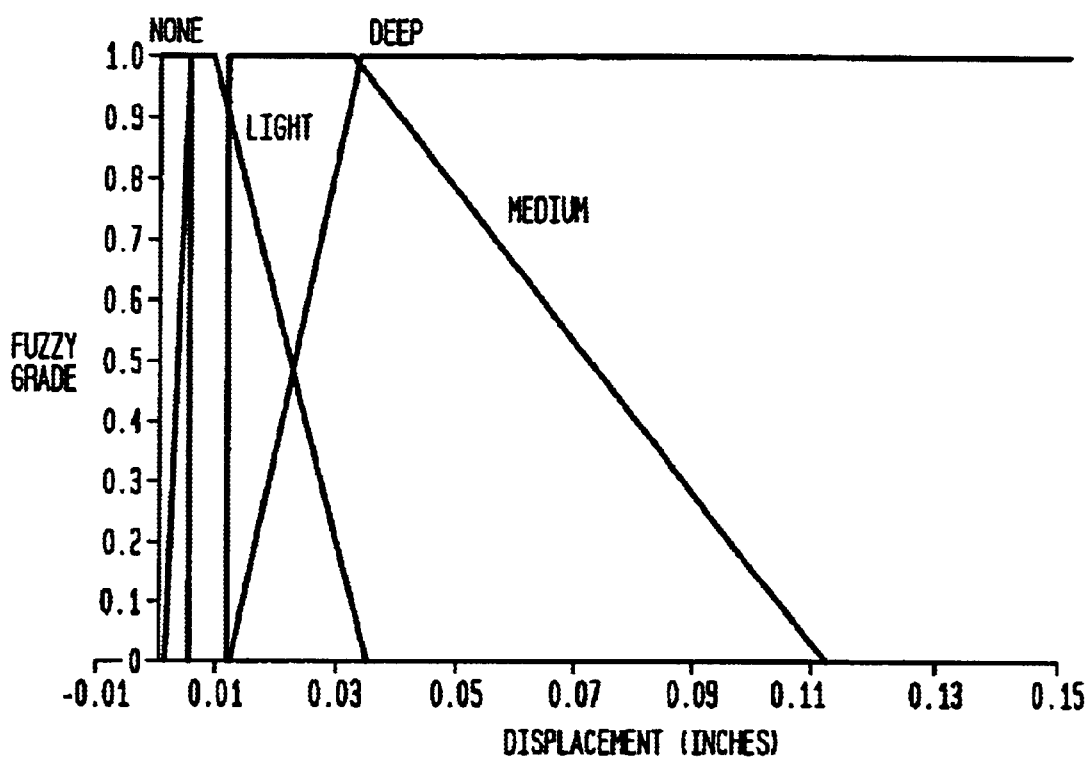
FIG. 19: A planar graph showing palpation level membership functions for sensor 5.
Figure 20:
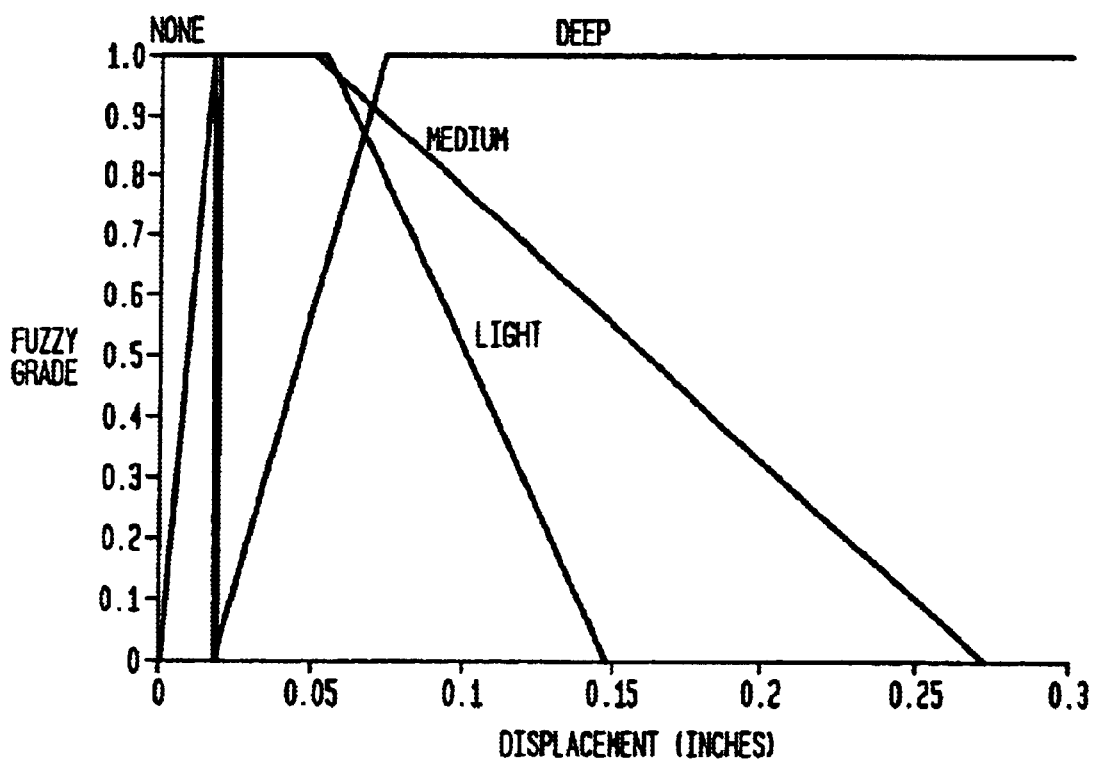
FIG. 20: A planar graph showing palpation level membership functions for sensor 6.
Figure 21:
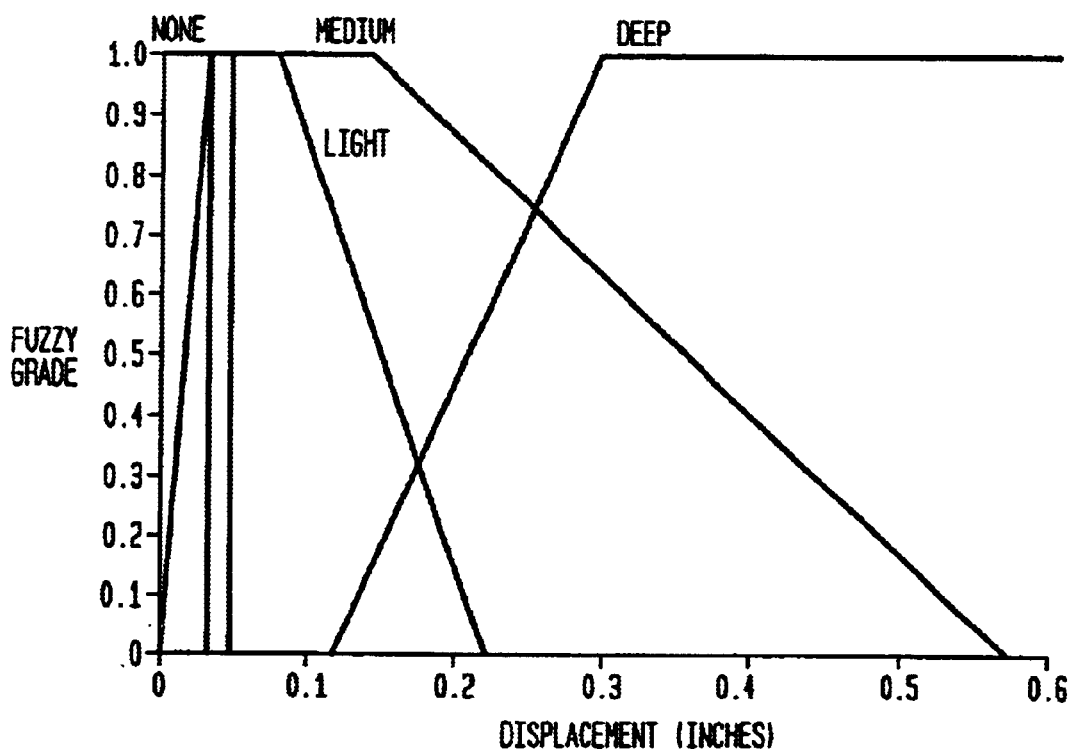
FIG. 21: A planar graph showing palpation level membership functions for sensor 7.
Figure 22:
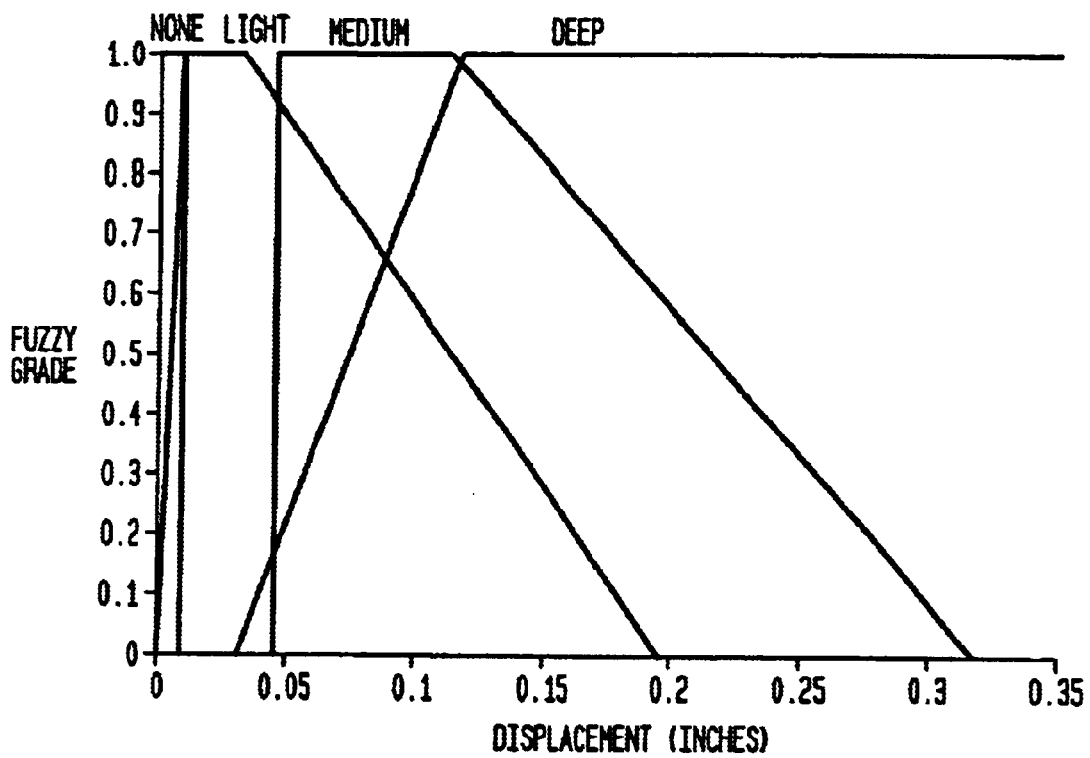
FIG. 22: A planar graph showing palpation level membership functions for sensor 8.

In the preferred embodiment, there are four fuzzy sets necessary for each sensor 1002 membership function: no palpation set, light palpation set, medium palpation set and deep palpation set. Trapezoidal membership functions are used to represent each fuzzy set. These functions represent the expert data set. In the preferred embodiment, the determination of the four corner points of the trapezoid is accomplished by using a statistical analysis of complete exams performed at one palpation level, i.e. complete exam done with all light palpations, one done with all medium palpations and one done with all deep palpations. In generating the statistical analysis is was further determined that when the user's hand is not near one specific sensor 1002, that sensor 1002 registers very low noise readings. As a result, the statistics are skewed from optimum, but are accurate enough to provide the benchmark expert data set. FIGS. 15 to 22 show the sensor 1002 membership functions which were developed for the present invention: FIG. 15 represents sensor #1, FIG. 16 represents Sensor #2, FIG. 17 represents Sensor #3, FIG. 18 represents Sensor #4, FIG. 19 represents Sensor #5, FIG. 20 represents Sensor #6, FIG. 21 represents Sensor #7, and FIG. 22 represents Sensor #8. For a given sensor 1002 displacement value, there will be four fuzzy grades: degree of membership to no palpation, degree of membership to light palpation, degree of membership to medium palpation and degree of membership to deep palpation.

The crisp output for this fuzzy engine is the palpation level: none, light medium or deep. The fuzzy rules are very basic: if none, then no palpation; if light, then light palpation; if medium, then medium palpation; and if deep, then deep palpation.

In the preferred embodiment, the sensor 1002 that is closest to the user's 1018 hand and the two neighboring sensors 1002 are selected for evaluation. The assumption is that the sensor 1002 with the maximum displacement is the sensor 1002 closest to the user's 1018 hand. The sets of three sensors 1002 were selected as corners of a triangle so that the combination of all these triangles covered the entire breast area. Table 3 shows the sets that were developed for each sensor 1002.

TABLE 3

Sensor Evaluation Table

| Sensor | Neighbor 1 | Neighbor 2 |
|---|---|---|
| Sensor 1 | Sensor 2 | Sensor 4 |
| Sensor 2 | Sensor 4 | Sensor 5 |
| Sensor 3 | Sensor 2 | Sensor 5 |
| Sensor 4 | Sensor 1 | Sensor 6 |
| Sensor 5 | Sensor 3 | Sensor 8 |
| Sensor 6 | Sensor 4 | Sensor 7 |
| Sensor 7 | Sensor 4 | Sensor 5 |
| Sensor 8 | Sensor 5 | Sensor 7 |

Each sensor 1002 in the set of three will have four output grades, one per palpation level. For each set of three sensors 1002, the sensor 1002 having the maximum value per palpation level was then found. In the preferred embodiment, the palpation levels were evaluated in reverse order (deep to none), but this was for convenience only. The palpation levels can be evaluated in any order. When determining which sensor 1002 of a set of three has the maximum value for a given palpation level, if the converted sensor data 1028 for a sensor 1002 was greater than 75% of the maximum possible value for that given palpation level, then the user examined that area using the given palpation level. In determining the final output as displayed to the user, an if-then evaluation was setup. This is described in greater detail below.

In the preferred embodiment, the performance data 1030 is saved to a Microsoft Excel Worksheet for later graphic presentation. Each pair of x and y coordinates belongs to a box on the developed grid 600. Two if-then evaluations and a lookup table were established in order to assign a coordinate pair to the correct box. This conversion is done because the graphic feedback to be presented to the user 1018 (the performance display output 1032) is based on a box representation of total breast area covered during the examination. Consequently, the output worksheet contains a box that represents finger position and the corresponding palpation level.

The preferred software for the exam evaluation algorithm 1012 software is disclosed below.

4. Presentation of Graphic Feedback 1014

Once exam performance has been evaluated, it has to be presented to the user 1018. In the preferred embodiment, the presentation of graphic feedback 1014 software component provides the user 1018 with the following information: a precise, easy to understand graphic representing exam performance; a percentage of expert performance score; presentation of personal information and corresponding risk category; and an explanation of all results and tips on performing breast examinations (collectively, performance display output 1032).

Figure 23:
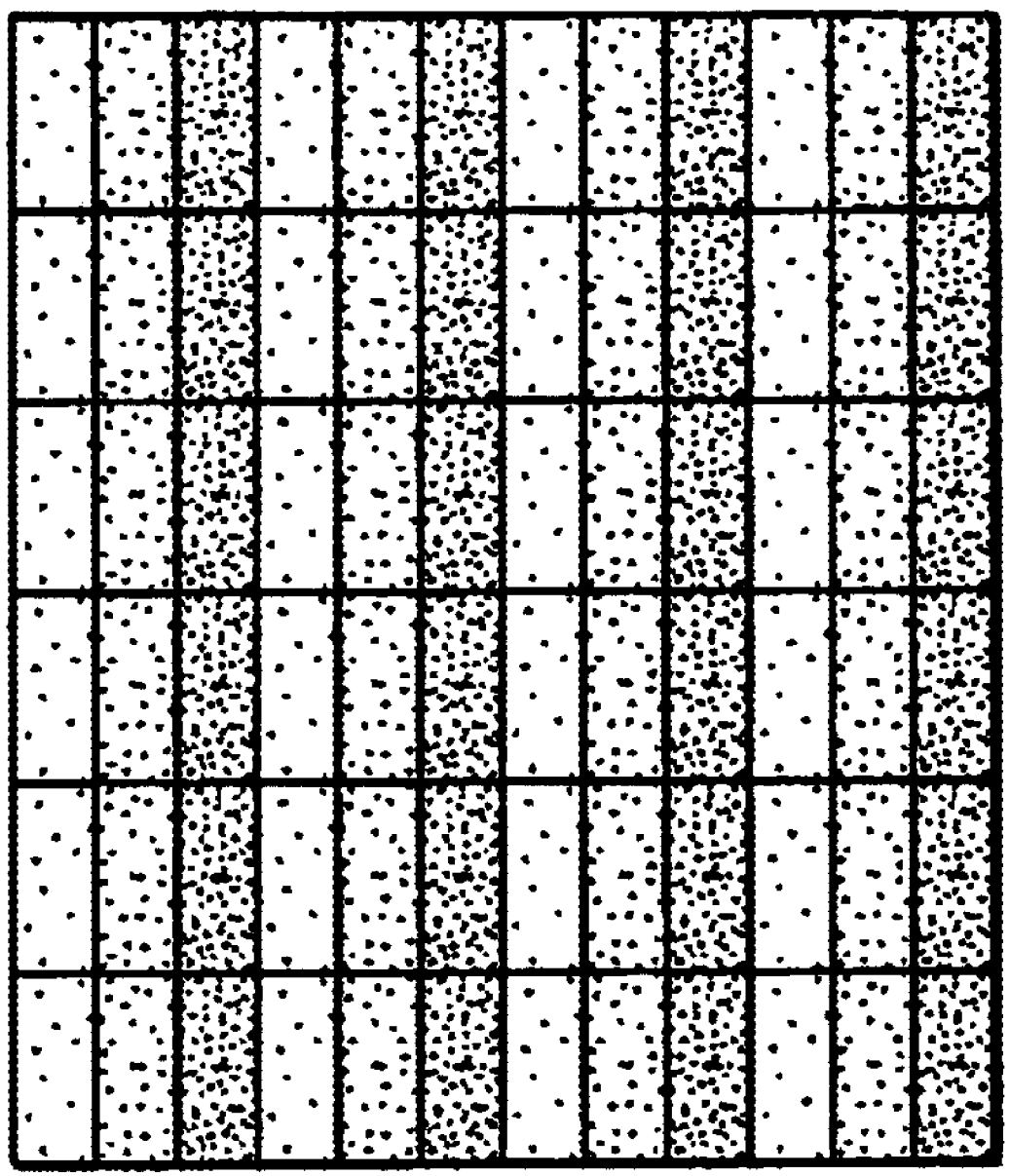
FIG. 23: An example graphical user interface (GUI) output display of expert performance.

In the preferred embodiment, the total breast area being examined is divided into 24 boxes as shown in FIG. 6. Therefore, the fuzzy logic output displayed to a user is a matrix of 24 boxes (corresponding to the 24 boxes of the examined area), each box being divided into three vertical portions wherein each of the three vertical portions represents a different palpation level: light, medium, or deep. As a means for providing the user with a quick visual analysis of the examination performance, in the preferred embodiment different colors are used to represent each palpation level (e.g., yellow=light palpation, brown=medium palpation and green=deep palpation), wherein a color is displayed if the user 1018 examined the corresponding area using the associated level of palpation. All of this information is combined and drawn as the graphic feedback. FIG. 23 shows an example of an expert performance wherein the entire breast area (all 24 boxes) was covered with each of the three palpation levels. As a result, there are no white boxes in the corresponding matrix displayed to the user, wherein a white box indicates that the user 1018 missed that area and no level of displacement was received.

Figure 24:
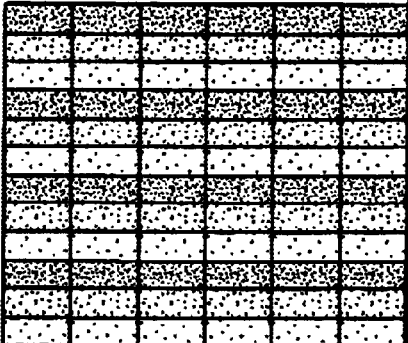
FIG. 24: An example GUI screen displaying an analysis of user performance.

In the preferred embodiment, the performance feedback to the user is a percentage of expert score, representing the portion of the total breast area that the user examined. This score was calculated by dividing the user's hits by the total number of hits possible (24 boxes×3 palpations per box=72 possible hits per examination). As a means for ranking the performance, the score is presented on a slider ranging from beginner to expert and as a text percentage. The personal information entered by the user is also given on the performance feedback. In addition, the user's risk score and respective risk category is presented as determined by the educational materials 1016 risk estimator software. Finally, a brief explanation of the examination results is given. FIG. 24 illustrates a sample feedback on user performance.

The preferred software for the presentation of graphic feedback 1014 software is disclosed below.

The use of the matrix to graphically display performance data 1030 to the user 1018 is for convenience purpose only. It would be readily apparent to one of ordinary skill in the relevant arts to design, develop, implement, and use a comparable means for displaying the performance data 1030. For example, a time varying strip chart type plot for each of the sensors 1002, a real-time playback of sensor 1002 displacements, a 3-D bar chart, or a 3-D hemispherical surface may be created wherein the surface over the corresponding sensor 1002 depressed with downward displacement values is colored according to the pressure exerted by the user 1018.

5. Educational Materials 1016

In order to make the IBM 100 of the present invention an effective training tool, the following educational materials 1016 were incorporated into the system: a training video, a tutorial and a breast cancer risk estimator. These materials were chosen and incorporated for convenience purpose only. It would be readily apparent to one of ordinary skill in the relevant art to incorporate different educational material 1016, e.g., access to reference material on breast cancer and related topics (via the Internet or other resources), and listing of health care professionals handling breast cancer issues.

To eliminate the need for a user to watch a training video on a TV/VCR unit, the IBM 100 of the preferred embodiment converted the VHS video to a mpeg digital movie stored on CD-ROM using well known methods. The converted CD video was then made accessible to the user via the user interface 1006 to the IBM 100 through a command button on the GUI Main Menu.

In the preferred embodiment, the training video is a ten minute interactive training sequence on different breast examination techniques. The video prompts users to practice examination steps on the breast model 102 and includes theory and practice on correct use of fingers during exam, correct palpation procedures and the discrimination of normal nodular tissue from abnormal lumps. The preferred embodiment also incorporates a tutorial to educate a user on breast cancer, breast examinations and IBM 100 operation. The tutorial was developed using Microsoft PowerPoint. There are three sections in the tutorial: information on breast cancer and detection methods; breast examination pattern, techniques and procedures, and a section on how to operate the IBM 100. In the preferred embodiment, the tutorial consists of a plurality of sequential slides, and provides four command buttons: Next, Previous, Exit, and Home, to help the user move through the tutorial slides. The Next button moves the user forward one screen. The Previous button moves the user back one screen. The Exit button leaves the tutorial and returns the user to the Main Menu. The Home button returns the user to the tutorial's first screen.

The first tutorial section displays information on the prevalence of breast cancer and different methods used for detection of the disease. Descriptions of the three stages of breast cancer and respective survival rates are presented. Next, the tutorial covers the three primary methods for the detection of breast cancer mammography, CBE and BSE. Each method is discussed, and screening recommendations are given. To encourage the use of BSE, several slides are devoted to stressing the importance of BSE. Finally, risk factors for developing breast cancer are presented.

The second tutorial section covers breast examination techniques and patterns. This section is provided for two reasons: to supplement the training video and to eliminate the separate handout on examination patterns. This section first covers how to use the fingers during an examination. Next, a palpation is defined, and the three palpation levels (light, medium, and deep) are described in detail. Then, breast examination patterns are discussed, and the vertical strip pattern is presented as the preferred pattern. Finally, a written step-by-step explanation of a complete breast examination procedure is given.

The third tutorial section covers how to operate the IBM 100. First, a brief overview of the IBM 100 is given. Then, the tutorial explains each available option. Next, the user is taken through operation of the system. The screens, which the user will encounter during use, are presented and explained. Finally, the performance feedback, which the user will receive after use of the IBM 100, is described.

Also in the preferred embodiment, the educational materials 1016 also include a breast cancer risk estimator. Several factors increase the risk of developing breast cancer. The highest risk factor for developing breast cancer is just being a woman. A personal history and/or a maternal history of breast cancer further increase the risk of developing the disease. In addition, risk increases with age. Other risk factors include: childbearing history, menstrual history and body type. These factors are used in the risk estimator component of the educational materials 1016 available through the IBM 100.

The risk estimator is part of the IBM 100 to help make the user aware of the significance of breast cancer. The information for the risk estimator component is publically available, e.g., from a chart on a Health EdCo tri-fold display titled "Caring for your breasts." The risk estimator involves scoring answers to questions based on the above factors. Based on this score, the user is ranked into one of four lifetime risk of developing breast cancer categories: lowest risk, medium risk, high risk or highest risk. The user enters personal information by clicking the appropriate response to a series of six multiple choice questions: (1) Choose your age group (under 30, 30–40, 41–50, 51–60, or over 60); (2) Choose appropriate family history concerning breast cancer (none, 1 aunt or grandmother, mother or sister, or mother and sister); (3) Choose your history concerning breast cancer (no breast cancer, or previous breast cancer); (4) Choose appropriate childbearing option (first baby before age 30, first baby after age 30, or no children); (5) Choose your menstrual history category (began menstruating 15 or over, began menstruating 12–14, or began menstruating 11 or under); and (6) Choose appropriate body type (slender, average, or overweight).

After answering the six questions, the risk estimator stores the risk data in a Microsoft Excel worksheet for later processing and display. The worksheet is first created, and the text headings are entered into the worksheet. As the user answers the questions, the response is entered adjacent to its respective heading. This information is presented to the user as part of the feedback. This worksheet is also used to hold sensor displacement data associated a test by the user on the breast model 102.

The tutorial of the educational materials 1016 is described herein for convenience purpose only. It would be readily apparent for one of ordinary skill in the relevant arts to design and develop a risk estimator or develop a tutorial having a different structure and containing different breast cancer material. Furthermore, it would be readily apparent for one of ordinary skill in the relevant art to design, develop and implement a tutorial for the present invention as described herein. The preferred software for the educational materials 1016 is contained in Exhibit A, attached hereto and incorporated in its entirety by reference.

5. System Operation

A session begins with a Welcome screen. This screen welcomes the user to the IBM 100 and gives the objectives of the IBM 100. When ready, the user clicks a "Click Here to Begin" button which takes the user to a Main Menu screen. The Main Menu screen presents the user with all options available along with a brief explanation of each option. In the preferred embodiment, the following options are available:

a. Training Command 1034

The user 1018 is presented with the option of viewing an instruction video wherein the video screen opens and the training video described above begins to play, or viewing a tutorial on the IBM 100. The tutorial option begins the tutorial described above by displaying a Tutorial Welcome screen. When the video or tutorial ends, the user is returned to the Main Menu screen.

b. Exam Command 1024

The user 1018 is first presented with the risk estimator described above. Following the last, or sixth, question, a Collect Data screen prompts the user 1018 to begin performing an examination on the breast model 102. Once the user 1018 is finished with the examination, he/she clicks a "Finished with Exam" button. The user 1018 is then notified via the Evaluating Performance screen to wait while data is processed. The Feedback screen (FIG. 24) is presented after the data is processed. The user 1018 then has the option to print the results for later reference or end the current session.

c. End Session Command

If the end session option is chosen, the program returns to the Welcome screen for the next session to begin.

C. Exemplary Computer System

Figure 25:
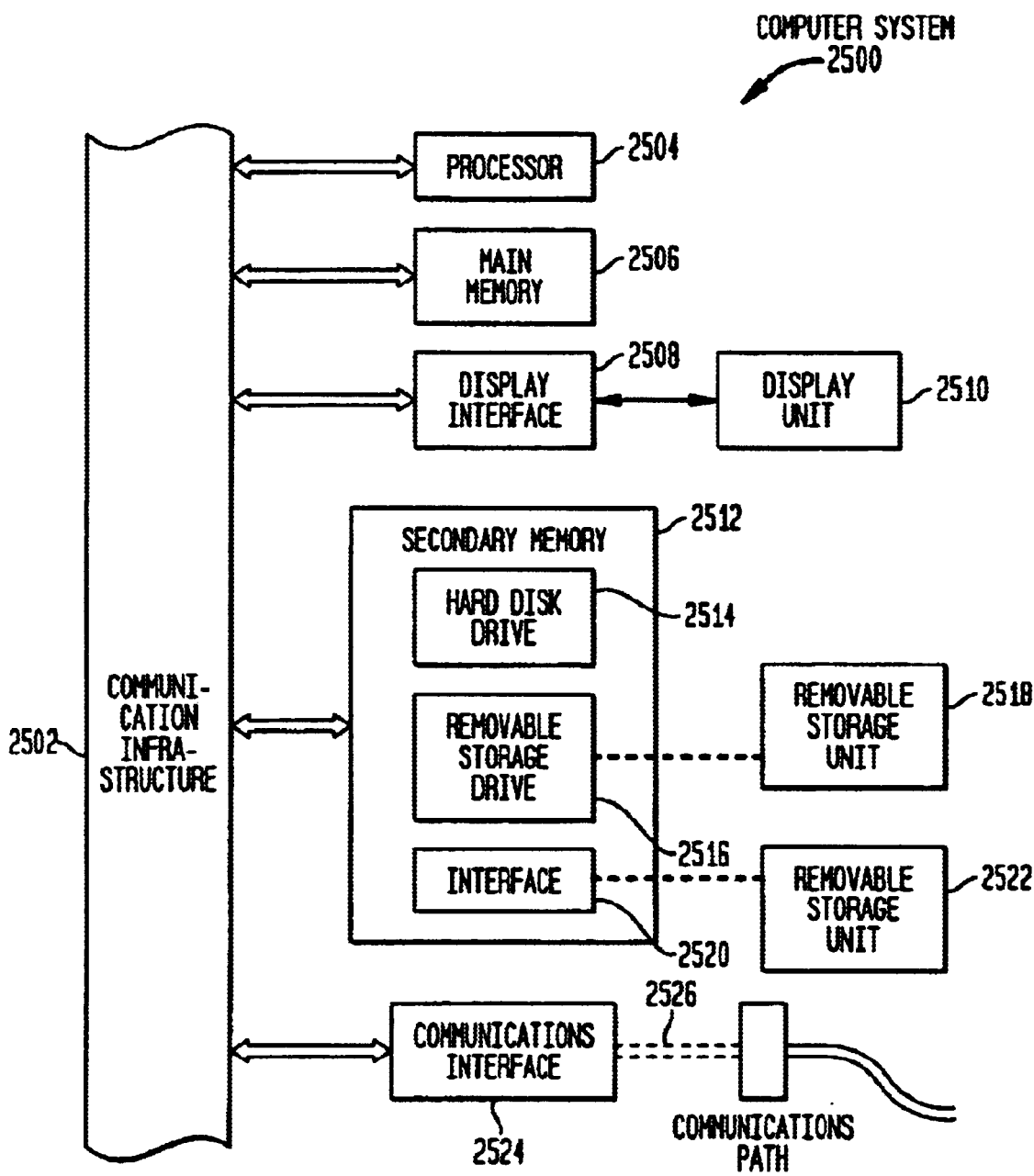
FIG. 25: An exemplary computer system.

FIG. 25 is a block diagram showing a computer system 2500 which can be used with an instrumented breast model (IBM) 100 of the present invention, as shown as components 108, 110 on FIG. 1. The computer system 2500 includes one or more processors, such as a processor 2504. The processor 2504 is connected to a communication infrastructure 2502, e.g., a communications bus, cross-over bar, or network. Various software embodiments are described in terms of this exemplary computer system 2500. After reading this description, it will become apparent to a person of ordinary skill in the relevant art(s) how to implement the present invention using other computer systems and/or computer architectures.

The computer system 2500 includes a display interface 2508 that forwards graphics, text, and other data from the communications infrastructure 2502 (or from a frame buffer not shown) for display on the display unit 2510, e.g., a computer screen or monitor on which a graphical user interface, including a window environment, may be displayed. The display interface 2508 can also include one or more input peripherals, including, for example, a keyboard, a mouse, a light pen, a pressure-sensitive screen, etc., which provide a user with the capability of entering such input to the computer system 2500.

The computer system 2500 also includes a main memory 2506, preferably random access memory (RAM), and may also include a secondary memory 2512. The secondary memory 2512 may include, for example, a hard disk drive 2514 and/or a removable storage drive 2516, representing a floppy disk drive, a magnetic tape drive, an optical disk, a compact disk drive, etc. which is read by and written to by a removable storage unit 2518. The removable storage unit 2518, also called a program storage device or a computer program product, represents a floppy disk, magnetic tape, optical disk, compact disk, etc. As will be appreciated, the removable storage unit 2518 includes a computer usable storage medium having stored therein computer software and/or data. The removable storage drive 2516 reads from and/or writes to a removable storage unit 2518 in a well known manner.

In alternative embodiments, secondary memory 2512 may also include other similar means for allowing computer programs or other instructions to be loaded into the computer system 2500. Such means may include, for example, an interface 2520 and a removable storage unit 2522. Examples of an interface 2520 may include a program cartridge and cartridge interface (such as that found in video game devices), a removable memory chip (such as EPROM, or PROM) and associated socket, and other removable storage units 2522 and interfaces 2520 which allow software and data to be transferred from the removable storage unit 2522 to the computer system 2500.

The computer system 2500 may also include a communications interface 2524. Communications interface 2524 allows software and data to be transferred between the computer system 2500 and external devices. Examples of communications interface 2524 may include a modem, a network interface (such as an Ethernet card), a communications port, a PCMCIA slot and card, etc. Software and data transferred via communications interface 2524 are in the form of signals 2526 which may be electronic, electromagnetic, optical, wireless or other signals capable of being received by communications interface 2524. These signals 2526 are provided to communications interface 2524 via a communications path (i.e., channel) 2528. This channel 2528 carries signals 2526 and may be implemented using wire or cable, fiber optics, a phone line, a cellular phone link, an RF link and other communications channels 2528.

In this document, the term "computer program medium" and "computer usable medium" are used to generally refer to media such as removable storage unit 2518, 2522, a hard disk installed in hard disk drive 2514, and signals 2526. These "computer program products" are means for providing software to a computer system 2500. Portions of the present invention are directed to such computer program products. It would be readily apparent for one of ordinary skill in the relevant art to design and implement the described software for an IBM 100 of the present invention.

Computer programs (also called computer control logic) are stored in main memory 2506 and/or secondary memory 2512. Computer programs may also be received via communications interface 2524. Such computer programs, when executed, enable the computer system 2500 to perform the features of the present invention as discussed herein. In particular, the computer programs, when executed, enable the processor 2504 to perform the features of the present invention. Accordingly, such computer programs represent controllers of the computer system 2500.

In an embodiment where portions of the invention are implemented using software, the software may be stored in a computer program product and loaded into computer system 2500 using removable storage drive 2516, a hard disk drive 2514, interface 2520, or communications interface 2524. The software, when executed by the processor 2504, causes the processor 2504 to perform the functions of the invention as described herein.

In another embodiment, the invention is implemented primarily in hardware using, for example, a hardware state machine, such as application specific integrated circuits (ASICS). Implementation of the hardware state machine so as to perform the functions described herein will be apparent to persons skilled in the relevant arts.

In yet another embodiment, the invention is implemented using a combination of hardware and software.

The preferred computer system 2500 is a personal computer having a single processor and executing a windows operating system. The personal computer is used for convenience purpose only, the present invention also can be developed on any appropriate computer system, e.g., a sun workstation or mainframe computer. The present invention is described in terms of a computer system 2500 having a single processor 2504 for convenience purposes only. It would be readily apparent, however, to one skilled in the relevant arts to use a computer system 2500 having multiple processors 2504, thereby executing the present invention in parallel. The preferred embodiment of the present invention is implemented in software, and more specifically, is written in the programming language Visual Basic and Mathwork's Matlab software, and uses Microsoft Excel Worksheet. The preferred embodiment is described in these terms for convenience purpose only. Other comparable computer systems 2500, programming languages and spreadsheet applications could alternatively be used.

The preferred software is disclosed below.

C. Test Results

The instrumented breast model (IBM) of the present invention was tested using a participant sample consisting of forty-one (41) women: thirty-two (32) women were in the range of 20–24 years (78%), with a mean age of twenty-three (23) years, five (5) women were in the range of 25–29 years of age (12%), two (2) women were in the range of 30–34 years (5%), one (1) woman was in the range of 35–39 years (2.4%), and one (1) woman was in the range of 40–44 years (2.4%). The majority of participants (68%) indicated that they had no previous training in breast palpation, while 31% noted previous experience. No participant had a prior history of breast disease or breast surgery.

The mastery criteria for each of the performance behaviors included total time of examinations (2–3 minutes per breast), use of three fingers for each palpation, use of the flats of the fingers for each palpation, use of three varying levels of pressure at each palpation site, and presence of the vertical strip pattern of search. Instrumented determinations of the depth of palpation and duration of the examination was chronicled by the IBM.

Following a pretest in which participants were instructed to perform a breast examination representative of their current level of expertise, participants underwent a structured training protocol which included the following: viewing of a video tape on effective breast palpation; individual palpation instruction and practice; and reviewing a written description and graphic representation of the vertical strip pattern of search. Next, participants performed a post-test and palpated the IBM, using the vertical strip pattern they had just learned. All training and post-testing was completed during a 50-minute session.

Next, the participants read a description of the vertical strip pattern of search and answered questions regarding starting and ending points of the pattern and the general progression of the pattern through the breast tissue. Following this standardized training sequence, participants replicated the vertical strip pattern on an instrumented breast model of the present invention.

In addition to the group of forty one participants, the study included an expert group comprising three (3) women's health care clinicians. These experts performed two tests on the IBM of the present invention: their usual palpation sequence and pattern (pretest), as well as the vertical strip pattern of search (post-test). No training intervention was used for this group.

For the study participants, the total time for breast examinations increased significantly from 90 seconds in the pretest examination to 187 seconds in the post-test. Post-training observational findings noted compliance with the palpation instruction (three circles per palpation) for 90.48% of the participants. The number of fingers used for each palpation ranged from two to six during the pretest but reached 100% compliance for the use of three fingers at the post-test evaluation. The use of the flat pads of the fingers reached 100% compliance at the post-test.

The computer records of the depth of palpation and duration of examination were examined for both the participant and expert groups. Examination of these data sets revealed that the participant pretest trials had greater amounts of variability than the expert pretest trials, with a moderate to large difference in effect size (0.68). The post-test trials for the participants in the vertical strip pattern noted similar amounts of displacement to the expert post-test trials. The expert data set (no training intervention) reflected similar means in both the pretests and the post-tests, suggesting that the experts produced similar amounts of displacement regardless of pattern. These data are shown in Table 4:

TABLE 4

Comparison of Total Pretest, and Total Vertical Strip Displacement By Group

| Group | Variable | Means | SD | t's | DF | Prob. |
|---|---|---|---|---|---|---|
| Part (n = 41) | Total Pretest | 6.881 | 2.696 | 1.154 | 42 | 0.255 |
| Exp (n = 3) | | 8.716 | 1.819 | | | |
| Part (n = 41) | Total Vertical Strip | 9.383 | 2.239 | 0.236 | 42 | 0.815 |
| Exp (n = 3) | | 9.067 | 2.276 | | | |

A comparison of pre-test displacement and post-test displacement was also undertaken. Paired t tests of total pre-test and total vertical strip noted significant differences (t=−6.635, 40 DF, 0=0.000). Similarly, a comparison of total pre-test with total concentric circle revealed significant differences (t=−6.766, 39 DF, p=0.000). These findings show that there was much improvement in the participants between pre-test and post-test. The findings are noted in Table 5.

TABLE 5

Comparison of Total Pre-Test, Total Vertical Strip and Total Concentric Circle Displacement

| Group | Variable | Means | Paired t | DF | Prob. |
|---|---|---|---|---|---|
| Part (n = 41) | Tot C Tot V | 10.090/9.383 | 1.758 | 39 | 0.087 |
| Part (n = 41) | Tot P Tot V | 6.881/9.383 | −6.635 | 40 | 0.000 |
| Part (n = 41) | Tot P Tot C | 6.881/10.090 | −6.766 | 39 | 0.000 |

Based on this analysis, it appears that training intervention significantly improves the performance measures of the participants in this study. The participant post-test measures noted improvements in breast examinations, and depth of displacement for all areas palpated. Following training, the duration of the examination approximately doubled, indicating that the training encouraged more diligence and thoroughness of search.

The post-test data sets for both the participants and the experts were not significantly different, suggesting that the training intervention changed participant performance to that similar to the experts. These findings support the potential utility of structured training protocols using an IBM of the present invention to improve learner performance.

Conclusion

While various embodiments of the present invention have been described, it should be understood that they have been presented by the way of example only, and not limitation. It will be understood by those skilled in the art that various changes in form and details may be made therein without departing from the spirit and scope of the invention. Thus, the breadth and scope of the present invention should not be limited by any of the above-described exemplary embodiments, but should be defined in accordance with the described terms and their equivalents.

Visual Basic Program Files

```
'Copyright 1998 West Virginia University
'age group screen
'This screen is the first of six multiple choice questions concerning
'the user. The answers each have an associated score. The cumulative
'sum is used to estimate the users risk for developing breast cancer.
'All information is stored in an Microsoft Excel Worksheet.
'----------------------------------------------------------------

Private Sub Form_Activate( )
initsetup 'Creates and sets up data file, an Excel worksheet
    (in the excelops module)
Me.Show 'Display screen
mainmenu.Hide 'Close mainmenu screen
End Sub
'----------------------------------------------------------------

Private Sub Nxt_Click( )
initscr 'Initialize risk score to zero (in the excelops module)
'Based on age group classification selected (option button),
'add respective score
'Put classification text into worksheet
'Show the next question
'Close current screen
'Clear the option button
If agegrp(0) Then
    addscore (10) 'Add value to risk score (in the excelops module)
    Putval "Under 30", 1, 2 'Fill in classification information (in excelops module)
    famlyhist.Show 'Show next question
    age group.Hide 'Close this screen
    agegrp(0).value=False 'Clear option button
Elseif agegrp(1) Then
    addscore (30)
    Putval "30 to 40", 1, 2
    famlyhist.Show
    agegroup.Hide
    agegrp(1).value=False
Elseif agegrp(2) Then
    addscore (75)
    Putval "41 to 50", 1, 2
    famlyhist.Show
    agegroup.Hide
    agegrp(2).value=False
Elseif agegrp(3) Then
    addscore (100)
    Putval "51 to 60", 1, 2
    famlyhist.Show
    agegroup.Hide
Elseif agegrp(4) Then
    addscore (125)
    Putval "Over 60", 1, 2
    famlyhist.Show
    agegroup.Hide
    agegrp(4).value=False
Elseif agegrp(5) Then
    Putval "N/A", 1, 2
    famlyhist.Show
    agegroup.Hide
    agegrp(5).value=False
Else
    'If user did not selection one option, then
    'do not proceed to next question, set focus on this screen
    Nxt.SetFocus
End If
End Sub
'bodytype screen
'This is the sixth question in the risk estimator
'----------------------------------------------------------------

Private Sub Nxt_Click( )
'Based on body type history classification selected (option button),
'add respective score
'Put classification text into worksheet
'Show the data collection screen
'Close current screen
'Clear the option button
If bdytyp(0) Then
    addscore (15)
    Putval "Slender", 6, 2
    GetData.Show
    bodytype.Hide
    bdytyp(0).value=False
Elseif bdytyp(1) Then
    addscore (25)
    Putval "Average", 6, 2
    GetData.Show
    bodytype.Hide
    bdytyp(1).value=False
Elseif bdytyp(2) Then
    addscore (50)
    Putval "Overweight", 6, 2
    GetData.Show
    bodytype.Hide
    bdytyp(2).value=False
Elseif bdytyp(3) Then
    Putval "N/A", 6, 2
    GetData.Show
    bodytype.Hide
    bdytyp(3).value=False
Else
    'If user did not selection one option, then
    'do not proceed to next question, set focus on this screen
    Nxt.SetFocus
End If
End Sub
'chldbear screen
'This is the fourth question in the risk estimator
'----------------------------------------------------------------

Private Sub Nxt_Click( )
'Based on childbearing classification selected (option button),
'add respective score
```

```
'Put classification text into worksheet
'Show the next question
'Close current screen
'Clear the option button
If childbear(0) Then
    addscore (0)
    Putval "First Baby Before Age 30", 4, 2
    menstrlhist.Show
    chldbear.Hide
    childbear(0).value=False
Elself childbear(1) Then
    addscore (25)
    Putval "First Baby After Age 30", 4, 2
    menstrlhist.Show
    chldbear.Hide
    childbear(1).value=False
Elself childbear(2) Then
    addscore (50)
    Putval "No Children", 4, 2
    menstrlhist.Show
    chldbear.Hide
    childbear(2).value=False
Elself childbear(3) Then
    Putval "N/A", 4, 2
    menstrlhist.Show
    chldbear.Hide
    childbear(3).value=False
Else
    'If user did not selection one option, then
    'do not proceed to next question, set focus on this screen
    Nxt.SetFocus
End If
End Sub
'famlyhist screen
'This is the second question in the risk estimator
'-----------------------------------------------------------

Private Sub Nxt_Click( )
'Based on family history classification selected (option button),
'add respective score
'Put classification text into worksheet
'Show the next question
'Close current screen
'Clear the option button
If famhist(0) Then
    addscore (0)
    Putval "None", 2, 2
    yourhist.Show
    famlyhist.Hide
    famhist(0).value=False
Elself famhist(1) Then
    addscore (50)
    Putval "1 Aunt or Grandmother", 2, 2
    yourhist.Show
    famlyhist.Hide
    famhist(1).value=False
Elself famhist(2) Then
    addscore (100)
    Putval "Mother or Sister", 2, 2
    yourhist.Show
    famlyhist.Hide
    famhist(2).value=False
Elself famhist(3) Then
    addscore (150)
    Putval "Mother and Sister", 2, 2
    yourhist.Show
    famlyhist.Hide
    famhist(3).value=False
Elself famhist(4) Then
    addscore (200)
    Putval "Mother and 2 Sisters", 2, 2
    yourhist.Show
    famlyhist.Hide
    famhist(4).value=False
Elself famhist(5) Then
    Putval "N/A", 2, 2
    yourhist.Show
    famlyhist.Hide
    famhist(5).value=False
Else
    'If user did not selection one option, then
    'do not proceed to next question, set focus on this screen
    Nxt.SetFocus
End If
End Sub
'GetData screen
'This screen begins the data collection.
'The user is prompted to begin, and clicks a button when finished
Dim cont As Boolean 'Flag used to determine when user has indicated "done"
'-----------------------------------------------------------

Private Sub Form_Load( )
Me.Show 'Show this screen
End Sub
'-----------------------------------------------------------

Private Sub Form_Activate( )
StartUp 'Call procedure to begin when form is activated
End Sub
'-----------------------------------------------------------

Private Sub StartUp( )
MousePointer=vbHourglass 'Change mouse icon to hourglass
Setup 'Call procedure to open & set up com port & calibrate sensors (in excelops modules)
'Set flag to continue with examination
cont=True
'Prompt user to begin exam on model
GetData.Text1.Text="Begin Exam on Model Now"
MousePointer=vbArrow 'Change mouse icon to arrow 'While user is not finished, continue to collect data
Do While cont
    CollectData 'Call procedure to read a data record (in excelops module)
Loop 'Temporary bypass of data collection if evaluating an existing data file
'Wait for user to click command button (used with Fuzzy Logic evaluation)
'Do While cont
'start=Timer 'Set start time.
'pausetime=1 'Set duration to 0.1 second
'Do While Timer<start+pausetime
'DoEvents 'Yield to other processes.
'Loop
'Loop
MousePointer=vbArrow 'Arrow mouse icon
clsprt
```

```
wait.Show 'Show wait screen
End Sub
'----------------------------------------------------------------

Private Sub ExamDone_Click( )
cont=False 'Clear flag when user indicates finished
GetData.Text1.Text="" 'Clear text
Me.Hide 'Close this screen
End Sub
'mainmenu screen
'This screen gives the options available to the user
'Each option is briefly described beside its command button
'----------------------------------------------------------------

Private Sub Form_Activate( )
DoEvents
Welcome.Hide 'Close Welcome screen
End Sub
'----------------------------------------------------------------

Private Sub intro_Click( )
'If user selects video option, then open the video screen
video.Show
End Sub
'----------------------------------------------------------------

Private Sub tut_Click( )
'If user selects tutorial option,then begin the tutorial
'Declare objects for using Microsoft PowerPoint
Dim active_app As PowerPoint.Application
Dim active_pres As PowerPoint.Presentation
Dim active_sswin As PowerPoint.SlideShowWindow 'Create a PowerPoint application
Set active_app=CreateObject("Powerpoint.application")
active_app.Visible=msoTrue 'Make the application visible 'Open the developed PowerPoint tutorial file
Set active_pres=active_app.Presentations.Open
    ("c:\breast\kiosk\tutorial.ppt")
'Continue with presentation, unil user exits
active_pres.SlideShowSettings.LoopUntilStopped=
    msoTrue
'Begin and display the PowerPoint slideshow
Set active_sswin=active_pres.SlideShowSettings.Run
active_pres.SlideShowWindow.Activate 'Continue until user exits
While (active_sswin.Active=msoTrue)
Wend 'Shut down PowerPoint when finished
active_pres.Close
active_app.quit
Set active_app=Nothing
End Sub
'----------------------------------------------------------------

Private Sub exam_Click( )
'If user selects exam option, then begin risk estimator
Me.Hide 'Close mainmenu screen
age group.Show 'Open first risk estimator question
End Sub
'----------------------------------------------------------------

Private Sub exit_Click( )
End 'End program when exit option is selected
End Sub
'menstrlhist screen
'This is the fifth question in the risk estimator
'----------------------------------------------------------------

Private Sub Nxt_Click( )
'Based on menstrual history classification selected (option
    button),
'add respective score
'Put classification text into worksheet
'Show the next question
'Close current screen
'Clear the option button
If menshist(0) Then
    addscore (15)
    Putval "Began Menstruating 15 or Over", 5, 2
    bodytype.Show
    menstrlhist.Hide
    menshist(0).value=False
ElseIf menshist(1) Then
    addscore (25)
    Putval "Began Menstruating 12 to 14", 5, 2
    bodytype.Show
    menstrlhist.Hide
    menshist(1).value=False
ElseIf menshist(2) Then
    addscore (50)
    Putval "Began Menstruating 11 or Under", 5, 2
    bodytype.Show
    menstrlhist.Hide
    menshist(2).value=False
ElseIf menshist(3) Then
    Putval "N/A", 5, 2
    bodytype.Show
    menstrlhist.Hide
    menshist(3).value=False
Else
    'If user did not selection one option, then
    'do not proceed to next question, set focus on this screen
    Nxt.SetFocus
End If
End Sub
'pattern screen
'This screen presents feedback to to the user, including the
    following:
'graphic presentation of performance, % of expert grade,
    personal
'information entered, risk score and category and explana-
    tion of results
'----------------------------------------------------------------

Sub Form_Paint( )
'Clear and redraw graphic if necessary
Cls
draw_pattern pattern
End Sub
'----------------------------------------------------------------

Private Sub Form_Load( )
Me.Show 'Show this form
End Sub
'----------------------------------------------------------------

Private Sub Form_Activate( )
Dim scr As Single 'Variable for % of expert grade wait.Hide 'Close wait screen
```

```
'Fill in text box information
pattern.user="Your Examination Performance"
pattern.expert="Expert Examination Performance"
pattern.time="Total Exam Time:"
'Call function to retrieve total elapsed exam time (in evalu-
    ation module)
pattern.seconds.Text=rettime
pattern.sec="Seconds"
pattern.Text4(0)="Age Group:"
pattern.Text4(1)="Family History:"
pattern.Text4(2)="Your History:"
pattern.Text4(3)="Childbearing:"
pattern.Text4(4)="Menstrual History:"
pattern.Text4(5)="Body Type:"
pattern.Text5="Your Personal Information"
pattern.scrtxt="Your Estimated Risk Score:"
'Call function to retrieve cumulative risk score (in excelops
    module)
score=retscore
pattern.scr.Text=score 'Display score on feedback
'Place user is appropriate risk category based on score
'Display appropriate category
If (score=0) Then
    pattern.riskcat.Text="N/A"
Elself (score<200) Then
    pattern.riskcat.Text="Lowest Risk Category"
Elself (score<301) Then
    pattern.riskcat.Text="Medium Risk Category"
Elself (score<401) Then
    pattern.riskcat.Text="High Risk Category"
Else
    pattern.riskcat.Text="Highest Risk Category"
End If 'Dispaly personal information entered by user
'Call function to retrieve information (in excelops module)
pattern.age.Text=rettxt(1)
pattern.famhist.Text=rettxt(2)
pattern.yourhist.Text=rettxt(3)
pattern.childbear.Text=rettxt(4)
pattern.menstrlhist.Text=rettxt(5)
pattern.bodytype.Text=rettxt(6)

'Fill in explanation of results section
pattern.explain="Explanation of Results"+vbCrLf+
    vbCrLf_
+"The picture above left represents the breast area."+
    vbCrLf_
+"Each rectangle represents a palpation level."+vbCrLf_
+"The picture shows the area that you covered during the
    examination."+vbCrLf_
+"The picture below shows an expert examination with total
    breast area covered."+vbCrLf_
+"White indicates no palpation detectable at that location."+
    vbCrLf_
+"Yellow indicates a light palpation detected at that
    location."+vbCrLf_
+"Brown indicates a medium palpation detected at that
    location."+vbCrLf_
+"Green indicates a deep palpation detected at that
    location."+vbCrLf+vbCrLf_
+"The optimal total exam time is 120 to 180 seconds (2-3
    minutes)."+vbCrLf_
+"Better performance is associated with longer exam
    times."+vbCrLf+vbCrLf_
+"The information given above is a summary of risk data
    which you input."+vbCrLf_
+"The risk score and risk category are only an estimation of
    your lifetime"_
+"risk of developing breast cancer based on the information
    which you gave."

'Call procedure to display graphic feedback on the pattern
    form
draw_pattern pattern
'Call procedure to display palpation level legend
drawkey pattern 'Calculate and display (on slider and in text) percentage of
    expert score
'Call function to retrieve hits (in gridsetup module)/by total
    hits possible
scre=retrghtcnt/48
pattern.Percent.Text=Format(Str(scre), "0.00%") 'Display in
    text format
Slider1.value=100-scre*100 'Display on slider
End Sub
'-----------------------------------------------------------------------

Sub draw_pattern(obj As Object)
'Call procedure in gridsetup module with given object (form
    or printer)
'This draws the graphic feedback on the given object
define obj
End Sub
'-----------------------------------------------------------------------

Public Sub drawkey(obj As Object)
'Display text of legend
pattern.key="KEY"
pattern.light="Light Palpation"
pattern.med="Medium Palpation"
pattern.deep="Deep Palpation"

'Setup fillstyle, color and draw box at appropriate location on
    given object (form or printer)
obj.FillStyle=vbFSSolid
obj.ForeColor=&H80000008
'Draw box for light
obj.FillColor=QBColor(14)
obj.Line (pattern.light.Left-0.35, pattern.light.top)-
    (pattern.light.Left-0.15, pattern.light.top+0.25), , B
'Draw box for medium
obj.FillColor=QBColor(6)
obj.Line (pattern.medLeft-0.35, pattern.med.top)-
    (pattern.med.Left-0.15, pattern.med.top+0.25), , B
'Draw box for deep
obj.FillColor=QBColor(2)
obj.Line (pattern.deep.Left-0.35, pattern.deep.top)-
    (pattern.deep.Left-0.15, pattern.deep.top+0.25), , B
obj.FillColor=QBColor(0)
End Sub
'-----------------------------------------------------------------------

Private Sub printcmd_Click( )
'If user chooses to print, print the feedback

'Setup printer
Printer.ScaleMode=vbInches
Printer.Orientation=vbPRORLandscape
Printer.ColorMode=vbPRCMColor
Printer.Font.Size=12
Printer.Font=pattern.Font
```

```
DoEvents
'Call procedure to setup printer to print to fill page
SetPrintScale pattern 'Call procedure to draw graphic on the printer
draw_pattern Printer
'Call procedure to draw palpation level legend on the printer
drawkey Printer 'Send all text to printer
Printer.CurrentX=pattern.user.Left
Printer.CurrentY=pattern.user.top
Printer.Print ("Your Examination Perfromance")

Printer.CurrentX=pattern.time.Left
Printer.CurrentY=pattern.time.top
Printer.Print ("Total Exam Time:"+Str(rettime)+"Seconds")
'Calculate and display (on slider and in text) percentage of
    expert score
'Call function to retrieve hits (in gridsetup module)/by total
    hits possible
Printer.CurrentX=pattern.expert.Left
Printer.CurrentY=pattern.expert.top
scre=retrghtcnt/48*100
Printer.Print ("Your Performance Score is:"+Str(scre)+"%")

Printer.CurrentX=pattern.light.Left
Printer.CurrentY=pattern.light.top
Printer.Print ("Light Palpation")

Printer.CurrentX=pattern.med.Left
Printer.CurrentY=pattern.med.top
Printer.Print ("Medium Palpation")

Printer.CurrentX=pattern.deep.Left
Printer.CurrentY=pattern.deep.top
Printer.Print ("Deep Palpation")

Printer.CurrentX=pattern.Text4(0).Left
Printer.CurrentY=pattern.Text4(0).top
Printer.Print ("Age Group:"+rettxt(1))

Printer.CurrentX=pattern.Text4(1).Left
Printer.CurrentY=pattern.Text4(1).top
Printer.Print ("Family History:"+rettxt(2))

Printer.CurrentX=pattern.Text4(2).Left
Printer.CurrentY=pattern.Text4(2).top
Printer.Print ("Your History:"+rettxt(3))

Printer.CurrentX=pattern.Text4(3).Left
Printer.CurrentY=pattern.Text4(3).top
Printer.Print ("Childbearing:"+rettxt(4))

Printer.CurrentX=pattern.Text4(4).Left
Printer.CurrentY=pattern.Text4(4).top
Printer.Print ("Menstrual History:"+rettxt(5))

Printer.CurrentY=pattern.Text4(5).top
Printer.Print ("Body Type:"+rettxt(6))

Printer.CurrentX=pattern.Text5.Left
Printer.CurrentY=pattern.Text5.top
Printer.Print ("Your Personal Information")

If ((retscore)=0) Then
    Printer.CurrentX=pattern.scrtxt.Left
        Printer.CurrentY=pattern.scrtxt.top
        Printer.Print ("Your Estimated Risk Score:"+Str
            (retscore)+"N/A")
    ElseIf ((retscore)<200) Then
        Printer.CurrentX=pattern.scrtxt.Left
        Printer.CurrentY=pattern.scrtxt.top
        Printer.Print ("Your Estimated Risk Score:"+Str
            (retscore)+"Lowest Risk Category")
    ElseIf ((retscore)<301) Then
        Printer.CurrentX=pattern.scrtxt.Left
        Printer.CurrentY=pattern.scrtxt.top
        Printer.Print ("Your Estimated Risk Score:"+Str
            (retscore)+"Medium Risk Category")
    ElseIf ((retscore)<401) Then
        Printer.CurrentX=pattern.scrtxt.Left
        Printer.CurrentY=pattern.scrtxt.top
        Printer.Print ("Your Estimated Risk Score:"+Str
            (retscore)+"High Risk Category")
    Else
        Printer.CurrentX=pattern.scrtxt.Left
        Printer.CurrentY=pattern.scrtxt.top
        Printer.Print ("Your Estimated Risk Score:"+Str
            (retscore)+"Highest Risk Category")
    End If Printer.CurrentX=pattern.explain.Left
Printer.CurrentY=pattern.explain.top
Printer.Print ("Explanation of Results")

Printer.CurrentX=pattern.explain.Left
Printer.Print (" ")

Printer.CurrentX=pattern.explain.Left
Printer.Print ("The picture above left represents the breast
    area.")

Printer.CurrentX=pattern.explain.Left
Printer.Print ("Each rectangle represents a palpation level.")

Printer.CurrentX=pattern.explain.Left
Printer.Print ("The picture shows the area that you covered
    during the examination.")

Printer.CurrentX=pattern.explain.Left
Printer.Print ("White indicates no palpation detectable at
    that location.")

Printer.CurrentX=pattern.explain.Left
Printer.Print ("Yellow indicates a light palpation detected at
    that location.")

Printer.CurrentX=pattern.explain.Left
Printer.Print ("Brown indicates a medium palpation detected
    at that location.")

Printer.CurrentX=pattern.explain.Left
Printer.Print ("Green indicates a deep palpation detected at
    that location.")

Printer.CurrentX=pattern.explain.Left
Printer.Print ("An expert examination would result in zero
    white rectangles.")

Printer.CurrentX=pattern.explain.Left
Printer.Print (" ")

Printer.CurrentX=pattern.explain.Left
```

Printer.Print ("The optimal total exam time is 120 to 180 seconds (2–3 minutes).")

Printer.CurrentX=pattern.explain.Left
Printer.Print ("Better performance is associated with longer exam times.")

Printer.CurrentX=pattern.explain.Left
Printer.Print (" ")

Printer.CurrentX=pattern.explain.Left
Printer.Print ("The information given above is a summary of risk data which you input.")

Printer.CurrentX=pattern.explain.Left
Printer.Print ("The risk score and risk category are only an estimation of your lifetime")

Printer.CurrentX=pattern.explain.Left
Printer.Print ("risk of developing breast cancer based on the information which you gave.")

'Send all information to the printer
Printer.EndDoc
End Sub
'-----------------------------------------------------------

Sub SetPrintScale(obj As Form)
'Setup printer to print to fill page
'Taken from Visual Basics Graphic Programming, Rod Stephens, Page 112
Dim pwid, phgt As Single
Dim xmid, ymid As Single
Dim owid, ohgt As Single
Dim s As Single 'Get the object's dimensions in twips
owid=obj.ScaleX(obj.ScaleWidth, obj.ScaleMode, vbTwips)
ohgt=obj.ScaleY(obj.ScaleHeight, obj.ScaleMode, vbTwips)

'Get printer's dimensions in twips
pwid Printer.ScaleX(Printer.ScaleWidth, Printer.ScaleMode, vbTwips)
phgt=Printer.ScaleY(Printer.ScaleHeight, Printer.ScaleMode, vbTwips)

'Compare the object and printer aspect ratios
If ohgt/owid>phgt/pwid Then
    'The object is relatively tall and thin
    'Use the printer's whole height
    s=phgt/ohgt 'Calculate scale factor
Else
    'The object is relative short and wide
    'Use the printer's whole width
    s=pwid/owid 'Calculate scale factor
End If
'Convert the printer's dimensions into scaled object coordinates
pwid=obj.ScaleX(pwid, vbTwips, obj.ScaleMode)/s
phgt=obj.ScaleY(phgt, vbTwips, obj.ScaleMode)/s 'See where center should be
xmid=obj.ScaleLeft+obj.ScaleWidth/2
ymid=obj.ScaleTop+obj.ScaleHeight/2

'Pass the coordinates of the upper left and lower right corners into the Scale method
Printer.Scale (xmid−pwid/2, ymid−phgt/2)−(xmid+pwid/2, ymid+phgt/2)
End Sub
'-----------------------------------------------------------

Private Sub quit_Click( )
'If user chooses to end session, shutdown all applications and return to welcome screen
'Call procedure to close collected data file (in excelops module)
ShutDown
Welcome.Show 'Show Welcome screen
pattern.Hide 'Close this screen
End Sub
'video screen
'This screen begins the training video using Microsoft MediaPlayer
'-----------------------------------------------------------

Private Sub Form_Load( )
'Open training video file
MediaPlayer1.filename="e:\breast_exam.mpg"
'Set volume
MediaPlayer1.Volume=0
End Sub
'-----------------------------------------------------------

Private Sub Form_Activate( )
video.Show 'Show this screen
mainmenu.Hide 'Hide main menu screen
MediaPlayer1.Play 'Begin to play the video
End Sub
'-----------------------------------------------------------

Private Sub MediaPlayer1_EndOfStream(ByVal Result As Long)
'When video is finished, close this screen and open main-menu screen
video.Hide
mainmenu.Show
End Sub
'-----------------------------------------------------------

Private Sub MediaPlayer1_PlayStateChange(ByVal OldState As Long, ByVal NewState As Long)
'If video is stopped, then close this screen and open main-menu screen
If (NewState=0) Then
    video.Hide
    mainmenu.Show
End If
End Sub
'wait screen
'This screen simply prompts user to wait while performance is evaluated
'This begins the evaluation process
Option Base 1
'-----------------------------------------------------------

Private Sub Form_Activate( )
GetData.Hide 'Close data collection screen start=Timer 'Set start time.
pausetime=0.1 'Set duration to 0.1 second
Do While Timer<start+pausetime

```
DoEvents 'Yield to other processes.
Loop
Init 'Call procedure to initialize palpation rectangles (in
    gridsetup module)
data_eval 'Call procedure to evaluate performance
cnthits 'Call procedure to count the number of trainee hits (in
    gridsetup module)
pattern.Show 'Show pattern screen
End Sub
'-----------------------------------------------------------------------

Private Sub Form_Load( )
Me.Show 'Show this screen
End Sub
Public Sub data_eval( )
'This procedure processes user data file in order to determine
'finger position and palpation level performed for each data
    record
'The program uses two fuzzy logic engines to meet the above
    objective.

Dim Sx(6) As Single
Dim P( ) As Variant
Dim Sy(8) As Single
Dim boxtbl(6, 4) As Integer
Dim sprt(10002) As Double
Dim colsX As Integer
Dim colsY As Integer
Dim sensup As Integer
Dim r As Integer
Dim c As Integer
Dim vl As Variant
Dim Q As Integer
Dim bx As Integer
Dim lvl As Integer
Dim tmp( ) As Double
ProgressBar1.value=0

'Finger Position Fuzzy Engine

'Input Fuzzy Membeship Function is a Large Fuzzy Set
'The greater the LVDT displacement, the larger the fuzzy
    grade and vice versa
'Consequently, the actual displacement reading becomes the
    fuzzy grade 'Setup Output Fuzzy Membership Functions based on grid
    developed
'x-coordinate
colsX=0
For v=0 To 8.125 Step 1.625
    Sx(colsX+1)=v 'Support Vector covers width of sensor
layout
    colsX=colsX+1
Next v 'Grade Vectors for Triangles for columns 1, 2 and 3
ReDim P(3, 3)
r=1
temp=Array(0, 1.625, 3.25)
For c=1 To 3 Step 1
    P(r, c)=temp(c)
Next c r=2
temp=Array(1.625, 3.25, 4.875)
For c=1 To 3 Step 1
    P(r, c)=temp(c)
Next c r=3
temp=Array(3.25, 4.875, 6.5)
For c=1 To 3 Step 1
    P(r, c)=temp(c)
Next c Gx=triangle(Sx, colsX, P, r)

'y-coordinate
colsY=0
For v=0 To 8.75 Step 1.25 'Support Vector covers height of
    sensor layout
    Sy(colsY+1)=v 'Support Vector covers width of sensor
layout
    colsY=colsY+1
Next v 'Grade Vectors for Triangles for rows 1 to 5
ReDim P(5, 3)
r=1
temp=Array(0, 1.25, 2.5)
For c=1 To 3 Step 1
    P(r, c)=temp(c)
Next c r=2
temp=Array(1.25, 2.5, 3.75)
For c=1 To 3 Step 1
    P(r, c)=temp(c)
Next c r=3
temp=Array(2.5, 3.75, 5)
For c=1 To 3 Step 1
    P(r, c)=temp(c)
Next c r=4
temp=Array(3.75, 5, 6.25)
For c=1 To 3 Step 1
    P(r, c)=temp(c)
Next c r=5
temp=Array(5, 6.25, 7.5)
For c=1 To 3 Step 1
    P(r, c) temp(c)
Next c Gy=triangle(Sy, colsY, P, r)

'xpos and ypos give the trainees finger position on the breast
    model
'This position is assigned to a box which is used for the user
    feedback (see grid)
'Setup table of box locations
boxtbl(1, 1)=15
boxtbl(1, 2)=8
boxtbl(1, 3)=7
boxtbl(1, 4)=0
boxtbl(2, 1)=14
boxtbl(2, 2)=9
boxtbl(2, 3)=6
boxtbl(2, 4)=1
boxtbl(3, 1)=13
```

```
boxtbl(3, 2)=10
boxtbl(3, 3)=5
boxtbl(3, 4)=2
boxtbl(4, 1)=12
boxtbl(4, 2)=11
boxtbl(4, 3)=4
boxtbl(4, 4)=3
'Palpation Level Fuzzy Engine 'Setup Input Fuzzy Membership Functions for palpation
    levels (none, light, medium and deep) for each lvdt
'Then, plot each function
sensup=0
For v=-0.0001 To 1 Step 0.0001 'Support vector from 0 to
    maximum LVDT displacement
    sprt(sensup+1)=v
    sensup=sensup+1
Next v ReDim P(4, 4)
r=1
temp=Array(-0.0001, 0, 0.003, 0.0035)
For c=1 To 4 Step 1
    P(r, c) temp(c)
Next c r=2
temp=Array(0.0009, 0.0031, 0.0092, 0.0561)
For c=1 To 4 Step 1
    P(r, c)=temp(c)
Next c r=3
temp=Array(0.005, 0.0052, 0.0167, 0.1402)
For c=1 To 4 Step 1
    P(r, c) temp(c)
Next c r=4
temp=Array(0.0081, 0.0316, 0.95, 0.99)
For c=1 To 4 Step 1
    P(r, c)=temp(c)
Next c lvdt1=trapez(sprt, sensup, P, r)

r=1
temp=Array(-0.0001, 0, 0.0166, 0.017)
For c=1 To 4 Step 1
    P(r, c) temp(c)
Next c r=2
temp=Array(0.0009, 0.0168, 0.0444, 0.1329)
For c=1 To 4 Step 1
    P(r, c)=temp(c)
Next c r=3
temp=Array(0.0268, 0.027, 0.0735, 0.2624)
For c=1 To 4Step 1
    P(r, c)=temp(c)
Next c r=4
temp=Array(0.0419, 0.117, 0.95, 0.99)
For c=1 To 4 Step 1
    P(r, c)=temp(c)
Next c lvdt2=trapez(sprt, sensup, P, r)

r=1
temp=Array(-0.0001, 0, 0.0051, 0.0055)
For c=1 To 4 Step 1
    P(r, c) temp(c)
Next c r=2
temp=Array(0.0009, 0.0053, 0.0201, 0.1474)
For c=1 To 4 Step 1
    P(r, c)=temp(c)
Next c r=3
temp=Array(0.0075, 0.0077, 0.0331, 0.2524)
For c=1 To 4 Step 1
    P(r, c)=temp(c)
Next c r=4
temp=Array(0.0098, 0.0315, 0.95, 0.99)
For c=1 To 4 Step 1
    P(r, c)=temp(c)
Next c lvdt3=trapez(sprt, sensup, P, r)

r=1
temp=Array(-0.0001, 0, 0.0018, 0.0022)
For c=1 To 4 Step 1
    P(r, c)=temp(c)
Next c r=2
temp=Array(0.0009, 0.002, 0.0042, 0.013)
For c=1 To 4 Step 1
    P(r, c)=temp(c)
Next c r=3
temp=Array(0.0048, 0.005, 0.0105, 0.0469)
For c=1 To 4 Step 1
    P(r, c)=temp(c)
Next c r=4
temp=Array(0.0103, 0.0231, 0.95, 0.99)
For c=1 To 4 Step 1
    P(r, c) temp(c)
Next c lvdt4=trapez(sprt, sensup, P, r)

r=1
temp=Array(-0.0001, 0, 0.0039, 0.0043)
For c=1 To 4 Step 1
    P(r, c)=temp(c)
Next c r=2
temp=Array(0.0009, 0.0041, 0.0111, 0.0383)
For c=1 To 4Step 1
    P(r, c)=temp(c)
```

```
Next c r=3
temp=Array(0.0128, 0.013, 0.034, 0.1145)
For c=1 To 4 Step 1
    P(r, c)=temp(c)
Next c r=4
temp=Array(0.0126, 0.0351, 0.95, 0.99)
For c 1 To 4 Step 1
    P(r, c)=temp(c)
Next c lvdt5=trapez(sprt, sensup, P, r)

r=1
temp=Array(-0.0001, 0, 0.0174, 0.0177)
For c=1 To 4 Step 1
    P(r, c)=temp(c)
Next c r=2
temp=Array(0.0009, 0.0175, 0.0544, 0.1488)
For c=1 To 4 Step 1
    P(r, c)=temp(c)
Next c r=3
temp=Array(0.0119, 0.0121, 0.0511, 0.2701)
For c=1 To 4 Step 1
    P(r, c)=temp(c)
Next c r=4
temp=Array(0.0176, 0.0748, 0.95, 0.99)
For c=1 To 4 Step 1
    P(r, c)=temp(c)
Next c lvdt6=trapez(sprt, sensup, P, r)

r=1
temp=Array(-0.0001, 0, 0.0299, 0.0302)
For c=1 To 4 Step 1
    P(r, c)=temp(c)
Next c r=2
temp=Array(0.0009, 0.0301, 0.0774, 0.2085)
For c=1 To 4 Step 1
    P(r, c) temp(c)
Next c r=3
temp=Array(0.0452, 0.0454, 0.1419, 0.5796)
For c=1 To 4 Step 1
    P(r, c)=temp(c)
Next c r=4
temp=Array(0.1237, 0.2887, 0.95, 0.99)
For c=1 To 4 Step 1
    P(r, c)=temp(c)
Next c lvdt7=trapez(sprt, sensup, P, r)

r=1
temp=Array(-0.0001, 0, 0.0079, 0.0083)
For c=1 To 4 Step 1
    P(r, c)=temp(c)
Next c r=2
temp=Array(0.0009, 0.0081, 0.035, 0.199)
For c=1 To 4 Step 1
    P(r, c)=temp(c)
Next c r=3
temp=Array(0.0449, 0.0451, 0.1148, 0.3181)
For c=1 To 4 Step 1
    P(r, c)=temp(c)
Next c r=4
temp=Array(0.034, 0.1165, 0.95, 0.99)
For c=1 To 4 Step 1
    P(r, c)=temp(c)
Next c lvdt8=trapez(sprt, sensup, P, r)

'The ouput functions are simply no palpation, light palpation,
'medium palpation or deep palpation
'The fuzzy rules are very basic:
'If none, then no palpation
'If light, then light palpation
'If medium, then medium palpation
'If deep, then deep palpation
Dim Sen(8) As Integer
For v=1 To 8 Step 1
    Sen(v)=v 'Setup vector for eight sensors
Next v Dim Slvl(4) As Integer
For v=1 To 4 Step 1
    Slvl(v)=v 'Setup vector for each palpation level
Next v row=NoRecs 'Determine number of records in data file (in excelops module)
For r=10 To row Step 1 'Evaluate each data record
If (r Mod 100=0) Then
    'Due to interface error, Excel file must be closed and reopened periodically
    clsfile
    reopnsht
    Me.Show
End If 'To help smooth results, take average value of three adjacent data records
avgdata=avgd(r)
'To determine X position, the following fuzzy rules apply:
'If LVDT1 or LVDT2 or LVDT3, then column 1
'If LVDT4 or LVDT5, then column 2
'If LVDT6 or LVDT7 or LVDT8, then column 3
'Evaluate system using if-then product rule evaluation,using maximum of result
'and centroid defuzzification
ReDim tmp(3, 3)
```

```
tmp(1, 1)=avgdata(1)
tmp(2, 1)=avgdata(2)
tmp(3, 1)=avgdata(3)
tmp(1, 2)=avgdata(4)
tmp(2, 2)=avgdata(5)
tmp(3, 2)=0
tmp(1, 3)=avgdata(6)
tmp(2, 3)=avgdata(7)
tmp(3, 3)=avgdata(8)
vl=max(tmp, 3, 3)

xpos=fuzzy(vl, Sx, Gx, 3, colsX)

'To determine Y position, the following rules apply:
'If LVDT1 or LVDT6, then row 5
'If LVDT4, then row 4
'If LVDT2 or LVDT7, then row 3
'If LVDT5, then row 2
'IF LVDT3 or LVDT8, then row 1
'Evaluate system using if-then product rule evaluation,using
    maximum of result
'and centroid defuzzification ReDim tmp(2, 5)
tmp(1, 1)=avgdata(3)
tmp(2, 1)=avgdata(8)
tmp(1, 2)=avgdata(5)
tmp(2, 2)=0
tmp(1, 3)=avgdata(2)
tmp(2, 3)=avgdata(7)
tmp(1, 4)=avgdata(4)
tmp(2, 4)=0
tmp(1, 5)=avgdata(1)
tmp(2, 5)=avgdata(6)
vl=max(tmp, 2, 5)

ypos=fuzzy(vl, Sy, Gy, 5, colsY)

'Assign coordinate pair to correct box for feedback purposes
'Assign xpos and ypos to box table position
If (xpos<=2.4375) Then
    v=1
ElseIf (xpos<=3.25) Then
    v=2
ElseIf (xpos<=4.0625) Then
    v=3
Else
    v=4
End If If (ypos<=2.5) Then
    H=1
ElseIf (ypos<=3.75) Then
    H=2
ElseIf (ypos<=5) Then
    H=3
Else
    H=4
End If
'Crisp output from finger position fuzzy engine
bx=boxtbl(H, v)
'-----------------------------------------------------------------

'The sensor with the highest displacement and two neighbors
'were chosen for higrade defizzification
'The three were chosen as corners to triangles so that the
    entire
'area was covered Sensor=higrade(Sen, avgdata, 1, 8) 'Determine which sensor
    had highest displacement 'If sensor is 1, then two neighbors are 2 and 4
'If sensor is 2, then two neighbors are 4 and 5
'If sensor is 3, then two neighbors are 2 and 5
'If sensor is 4, then two neighbors are 1 and 6
'If sensor is 5, then two neighbors are 3 and 8
'If sensor is 6, then two neighbors are 4 and 7
'If sensor is 7, then two neighbors are 4 and 5
'If sensor is 8, then two neighbors are 5 and 7

'Determine grade for each palpation level of 3 sensors found
    above
'Perform maximum grade defuzzification to determine pal-
    pation level
Dim lvlgrd(3, 4)
If (Sensor=1) Then
    lvlgrd1=fuzzifr(sprt, lvdt1, 4, avgdata(1))
    lvlgrd2=fuzzifr(sprt, lvdt2, 4, avgdata(2))
    lvlgrd3=fuzzifr(sprt, lvdt4, 4, avgdata(4))
    For Q=1 To 4
        lvlgrd(1, Q)=lvlgrd1(Q)
        lvlgrd(2, Q)=lvlgrd2(Q)
        lvlgrd(3, Q)=lvlgrd3(Q)
    Next Q
    higrds=max(lvlgrd, 3, 4)
    'higrds=Array(0, 0, 0, 0)
ElseIf (Sensor=2) Then
    lvlgrd1=fuzzifr(sprt, lvdt2, 4, avgdata(2))
    lvlgrd2=fuzzifr(sprt, lvdt4, 4, avgdata(4))
    lvlgrd3=fuzzifr(sprt, lvdt5, 4, avgdata(5))
    For Q=1 To 4
        lvlgrd(1, Q)=lvlgrd1(Q)
        lvlgrd(2, Q)=lvlgrd2(Q)
        lvlgrd(3, Q)=lvlgrd3(Q)
    Next Q
    higrds=max(lvlgrd, 3, 4)
ElseIf (Sensor=3) Then
    lvlgrd1=fuzzifr(sprt, lvdt3, 4, avgdata(3))
    lvlgrd2=fuzzifr(sprt, lvdt2, 4, avgdata(2))
    lvlgrd3=fuzzifr(sprt, lvdt5, 4, avgdata(5))
    For Q=1 To 4
        lvlgrd(1, Q)=lvlgrd1(Q)
        lvlgrd(2, Q)=lvlgrd2(Q)
        lvlgrd(3, Q)=lvlgrd3(Q)
    Next Q
    higrds=max(lvlgrd, 3, 4)
ElseIf (Sensor=4) Then
    lvlgrd1=fuzzifr(sprt, lvdt4, 4, avgdata(4))
    lvlgrd2=fuzzifr(sprt, lvdt1, 4, avgdata(4))
    lvlgrd3=fuzzifr(sprt, lvdt6, 4, avgdata(6))
    For Q=1 To 4
        lvlgrd(1, Q)=lvlgrd1(Q)
        lvlgrd(2, Q)=lvlgrd2(Q)
        lvlgrd(3, Q)=lvlgrd3(Q)
    Next Q
    higrds=max(lvlgrd, 3, 4)
ElseIf (Sensor=5) Then
    lvlgrd1=fuzzifr(sprt, lvdt5, 4, avgdata(5))
    lvlgrd2=fuzzifr(sprt, lvdt3, 4, avgdata(3))
    lvlgrd3=fuzzifr(sprt, lvdt8, 4, avgdata(8))
    For Q=1 To 4
```

```
    lvlgrd(1, Q)=lvlgrd1(Q)
    lvlgrd(2, Q)=lvlgrd2(Q)
    lvlgrd(3, Q)=lvlgrd3(Q)
    Next Q
    higrds=max(lvlgrd, 3, 4)
ElseIf (Sensor=6) Then
    lvlgrd1=fuzzifr(sprt, lvdt6, 4, avgdata(6))
    lvlgrd2=fuzzifr(sprt, lvdt4, 4, avgdata(4))
    lvlgrd3=fuzzifr(sprt, lvdt7, 4, avgdata(7))
    For Q=1 To 4
    lvlgrd(1, Q)=lvlgrd1(Q)
    lvlgrd(2, Q)=lvlgrd2(Q)
    lvlgrd(3, Q)=lvlgrd3(Q)
    Next Q
    higrds=max(lvlgrd, 3, 4)
ElseIf (Sensor=7) Then
    lvlgrd1=fuzzifr(sprt, lvdt7, 4, avgdata(7))
    lvlgrd2=fuzzifr(sprt, lvdt4, 4, avgdata(4))
    lvlgrd3=fuzzifr(sprt, lvdt5, 4, avgdata(5))
    For Q=1 To 4
    lvlgrd(1, Q)=lvlgrd1(Q)
    lvlgrd(2, Q)=lvlgrd2(Q)
    lvlgrd(3, Q)=lvlgrd3(Q)
    Next Q
    higrds=max(lvlgrd, 3, 4)
Else
    lvlgrd1=fuzzifr(sprt, lvdt8, 4, avgdata(8))
    lvlgrd2=fuzzifr(sprt, lvdt5, 4, avgdata(5))
    lvlgrd3=fuzzifr(sprt, lvdt7, 4, avgdata(7))
    For Q=1 To 4
    lvlgrd(1, Q)=lvlgrd1(Q)
    lvlgrd(2, Q)=lvlgrd2(Q)
    lvlgrd(3, Q)=lvlgrd3(Q)
    Next Q
    higrds=max(lvlgrd, 3, 4)
End If
'Determine palpation level (at least 75% membership)
If (higrds(4)>=0.75) Then
    lvl=4
ElseIf (higrds(3)>=0.75) Then
    lvl=3
ElseIf (higrds(2)>=0.75) Then
    lvl=2
Else
    lvl=1
End If 'Store palpation information into worksheet
    Putres bx, r, 12
    Putres lvl, r, 13
    evaldata (r) 'Call procedure to process data (in excelops
module)
    DoEvents
    prcnt=r/row
    ProgressBar1.value=prcnt*100
    wait.Text4=Format(Str(prcnt), "0%")
Next r
End Sub 'Welcome Screen
'This screen welcomes the user to the system and
'gives the system objectives
'------------------------------------------------------------

Private Sub Form_Activate( )
Begin.SetFocus 'Highlight the begin command button
End Sub
'------------------------------------------------------------

Private Sub Begin_Click( )
Me.Hide 'Close welcome screen
mainmenu.Show 'Open main menu screen
End Sub 'yourhist screen
'This is the third question in the risk estimator
'------------------------------------------------------------

Private Sub Nxt_Click( )
'Based on user's history classification selected (option
    button),
'add respective score
'Put classification text into worksheet
'Show the next question
'Close current screen
'Clear the option button
If yrhist(0) Then
    addscore (0)
    Putval "No Breast Cancer", 3, 2
    chldbear.Show
    yourhist.Hide
    yrhist(0).value=False
ElseIf yrhist(1) Then
    addscore (300)
    Putval "Previous Breast Cancer", 3, 2
    chldbear.Show
    yourhist.Hide
    yrhist(1).value=False
ElseIf yrhist(2) Then
    Putval "N/A", 3, 2
    chldbear.Show
    yourhist.Hide
    yrhist(2).value=False
Else
    'If user did not selection one option, then
    'do not proceed to next question, set focus on this screen
    Nxt.SetFocus
End If
End Sub
'gridsetup module
'This module initializes all palpation rectangles for the
    graphic feedback 'Variable to hold the number of hits user had
Dim rghtcnt As Integer
'Variables for height and width of palpation rectangles
Dim hght As Single
Dim wdth As Single 'Data type created for a palpation rectangle
Type Palp_Box
    value As Integer 'Flag for hit or miss
    x1 As Single 'x-coordinate of one corner
    y1 As Single 'y-coordinate of one corner
    x2 As Single 'x-coordinate of opposite corner
    y2 As Single 'y-coordinate of opposite corner
    color As Integer 'Color to indicate a hit
End Type 'Array to hold colors for hits
Dim colors(3) As Integer
'Variables for palpation rectangles (24 boxes, each w/3
    palpation levels possible
```

```
Dim boxes(16, 3) As Palp_Box
Dim gridbox(16) As Palp_Box
'------------------------------------------------------------------

Sub Init( )
Dim r As Integer
Dim c As Integer
'Setup palpation rectangle colors
colors(0)=14  'Indicates light yellow in QBColor function
colors(1)=6  'Indicates yellow in QBColor function (close to
    brown)
colors(2)=2  'Indicates green in QBColor function rghtcnt=0  'Set hits to zero 'Downsize actual box size to fit on feedback form wdth=0.8125/2.5
hght=1.25/2.5

'Clear all value flags for each palpation rectangle
'Set appropriate color using above color array
For r=0 To 16
    For c=0 To 2
    boxes(r, c).value=0
    boxes(r, c).color=colors(c)
    Next c
Next r 'Set up, grid boxes
'Setup locations of each palpation rectangle. Each is ⅓ of
    grid box
a=1
For r=0 To 3
    gridbox(r).x1=5*wdth
    gridbox(r).x2=6*wdth
    gridbox(r).y1=a*hght
    gridbox(r).y2=(a+1)*hght boxes(r, 0).x1=5*wdth
    boxes(r, 1).x1=5*wdth+wdth/3
    boxes(r, 2).x1=5*wdth+2*wdth/3
    boxes(r, 0).x2=5*wdth+wdth/3
    boxes(r, 1).x2=5*wdth+2*wdth/3
    boxes(r, 2).x2=6*wdth boxes(r, 0).y1=a*hght
    boxes(r, 1).y1=a*hght
    boxes(r, 2).y1=a*hght
    a=a+1
    boxes(r, 0).y2=a*hght
    boxes(r, 1).y2=a*hght
    boxes(r, 2).y2=a*hght
Next r a=5
For r=4 To 7
    gridbox(r).x1=4*wdth
    gridbox(r).x2=5*wdth
    gridbox(r).y1=a*hght
    gridbox(r).y2=(a-1)*hght boxes(r, 0).x1=4*wdth
    boxes(r, 1).x1=4*wdth+wdth/3
    boxes(r, 2).x1=4*wdth+2*wdth/3
    boxes(r, 0).x2=4*wdth+wdth/3
    boxes(r, 1).x2=4*wdth+2*wdth/3
    boxes(r, 2).x2=5*wdth boxes(r, 0).y1=a*hght
    boxes(r, 1).y1=a*hght
    boxes(r, 2).y1=a*hght
    a=a-1
    boxes(r, 0).y2=a*hght
    boxes(r, 0).y2=a*hght
    boxes(r, 2).y2=a*hght
Next r a=1
For r=8 To 11
    gridbox(r).x1=3*wdth
    gridbox(r).x2=4*wdth
    gridbox(r).y1=a*hght
    gridbox(r).y2=(a+1)*hght boxes(r, 0).x1=3*wdth
    boxes(r, 1).x1=3*wdth+wdth/3
    boxes(r, 2).x1=3*wdth+2*wdth/3
    boxes(r, 0).x2=3*wdth+wdth/3
    boxes(r, 1).x2=3*wdth+2*wdth/3
    boxes(r, 2).x2=4*wdth boxes(r, 0).y1=a*hght
    boxes(r, 1).y1=a*hght
    boxes(r, 2).y1=a*hght
    a=a+1
    boxes(r, 0).y2=a*hght
    boxes(r, 1).y2=a*hght
    boxes(r, 2).y2=a*hght
Next r a=5
For r=12 To 15
    gridbox(r).x1=2*wdth
    gridbox(r).x2=3*wdth
    gridbox(r).y1=a*hght
    gridbox(r).y2=(a-1)*hght boxes(r, 0).x1=2*wdth
    boxes(r, 1).x1=2*wdth+wdth/3
    boxes(r, 2).x1=2*wdth+2*wdth/3
    boxes(r, 0).x2=2*wdth+wdth/3
    boxes(r, 1).x2=2*wdth+2*wdth/3
    boxes(r, 2).x2=3*wdth boxes(r, 0).y1=a*hght
    boxes(r, 1).y1=a*hght
    boxes(r, 2).y1=a*hght
    a=a-1
    boxes(r, 0).y2=a*hght
    boxes(r, 1).y2=a*hght
    boxes(r, 2).y2=a*hght
Next r
End Sub
'------------------------------------------------------------------

Sub set_val(r As Integer, c As Integer)
'Set appropriate flag (-1 because data file references 1-24,
    referenced here 0-23)
boxes(r, c).value=1
End Sub
'------------------------------------------------------------------
```

```
Sub define(canvas As Object)
'Declare loop control variables
Dim r As Integer
Dim c As Integer 'Draw each palpation rectangle with appropriate color to
   indicate palpation level
For r=0 To 15
   For c=0 To 2
      If (boxes(r, c).value) Then
         'There was a palpation
         canvas.FillStyle=vbFSSolid
         canvas.FillColor=QBColor(boxes(r, c).color) 'Set
            appropriate fill color
      Else
         canvas.FillColor=QBColor(15)
      End If
      'Draw the rectangle on the given object (form or
         printer)
      canvas.Line (boxes(r, c).x1, boxes(r, c).y1)-(boxes(r,
         c).x2, boxes(r, c).y2), canvas.FillColor, B
   Next c
Next r 'Draw grid boxes
For r=0 To 15
   canvas.FillStyle=vbFSTransparent
   canvas.DrawWidth=3
   canvas.Line (gridbox(r).x1, gridbox(r).y1)-(gridbox(r)
.x2, gridbox(r).y2), QBColor(0), B
Next r End Sub
'----------------------------------------------------------------

Public Function retrghtcnt( )
'Function to return the number of hits (correct palpations)
retrghtcnt=rghtcnt
End Function
'----------------------------------------------------------------

Public Sub cnthits( )
   For r=0 To 15
      For c=0 To 2
         If (boxes(r, c).value) Then
            'There was a palpation
            rghtcnt=rghtcnt+1 'Increment hits count
         End If
      Next c
   Next r End Sub 'excelops module
'This module controls all operations concerning the data file Option Explicit
'Declare objects to use Microsoft Excel
Dim My_App As Excel.Application
Dim My_Book As Excel.Workbook
Dim My_Data As Excel.Worksheet 'Variable to hold cumulative risk score
Dim riskscore As Integer
'Variables to keep track of elapsed exam time
Dim CurrentTime, StartTime
'Variables to control delay loops
Dim pausetime, start
'Variable to hold data sent for DAQ modules
Dim In_Buf As String
'Array to hold sensor calibaration data
Dim Offset(8) As Double
'Variable for number of data records
Dim row As Integer
'Loop counter variable
Dim i As Integer
'----------------------------------------------------------------

Public Sub reopnsht( )
'Reopens the Excel Worksheet data file for further process-
   ing
Set My_App=CreateObject("Excel.Application")
My_App.Visible=True
Set My_Book=My_App.Workbooks.Open
   ("c:\temp\data.xls")
Set My_Data=My_Book.ActiveSheet
End Sub
'----------------------------------------------------------------

Public Sub clsfile( )
My_Book.Save
Set My_Data=Nothing
My_Book.Close
Set My_Book=Nothing
My_App.quit
Set My_App=Nothing
End Sub
'----------------------------------------------------------------

Public Sub initsetup( )
Dim c As Integer 'Loop counter for columns in worksheet
'Create an Excel Worksheet to hold the data
Set My_App=CreateObject("Excel.Application")
My_App.Visible=True 'Evaluate an existing data file
'Set My_Book=My_App.Workbooks.Open
   ("a:\81%xprtdata.xls")

'Collect new data
Set My_Book=My_App.Workbooks.Add

Set My_Data=My_Book.ActiveSheet
'Save current data file
My_Book.SaveAs filename:="c:\temp\data.xls"
'Setup risk category headings in the worksheet
My_Data.Cells(1, 1)="Age"
My_Data.Cells(2, 1)="Fam Hist"
My_Data.Cells(3, 1)="Yr Hist"
My_Data.Cells(4, 1)="Child Br"
My_Data.Cells(5, 1)="Mens Hist"
My_Data.Cells(6, 1)="Body Type"
'Setup data categories in the worksheet
'Each data record (row) consists of the following:
elapsed exam time (s), 8 sensor readings (inches), sensor
   wimax, max value
My_Data.Cells(8, 1)="Elap. Time"
My_Data.Cells(8, 2)="LVDT #1"
My_Data.Cells(8, 3)="LVDT #2"
My_Data.Cells(8, 4)="LVDT #3"
My_Data.Cells(8, 5)="LVDT #4"
My_Data.Cells(8, 6)="LVDT #5"
My_Data.Cells(8, 7)="LVDT #6"
My_Data.Cells(8; 8)="LVDT #7"
```

```
My_Data.Cells(8, 9)="LVDT #8"
My_Data.Cells(8, 10)="Max LVDT #"
My_Data.Cells(8, 11)="Max Value"
My_Data.Cells(9, 1)="Seconds"
My_Data.Cells(8, 12)="Position"
My_Data.Cells(8, 13)="Palpation"
My_Data.Cells(9, 12)="Box #"
My_Data.Cells(9, 13)="Level"

For c=2 To 9
    My_Data.Cells(9, c)="Inches"
Next c

My_Data.Cells(9, 11)="Inches"
End Sub
'----------------------------------------------------------------

Public Sub initscr( )
riskscore=0 'Initialize risk score to zero
End Sub
'----------------------------------------------------------------

Public Sub addscore(scr As Integer)
riskscore=riskscore+scr 'Add new score to existing score
End Sub
'----------------------------------------------------------------

Public Sub Putval(txt As String, r As Integer, c As Integer)
My_Data.Cells(r, c)=txt 'Put classification text in worksheet
End Sub
'----------------------------------------------------------------

Public Sub Setup( )
'Set up com port for getting data from modules
GetData.MSComm1.CommPort=1 'Set to com1
GetData.MSComm1.Settings="9600,N,8,1"'9600 baud, no
    parity, 8 data bits, 1 stop bit
GetData.MSComm1.InputLen=0 'Tells control to read all
    characters when Input is used
GetData.MSComm1.PortOpen=True 'Open com port
GetData.MSComm1.InputLen=58

'Calibrate to determine offset voltage
'Loop through a couple readings before reading offset
'This allows readings to stabilize after a power up
For i=1 To 3
    'Send command to read channel 0 of module at 01H
(LVDT1)
    GetData.MSComm1.Output="#010"+Chr$(13)
    Do
    Loop Until GetData.MSComm1.InBufferCount>8
    In_Buf=GetData.MSComm1.Input 'Read data into buffer 'Short delay before reading next channel
    start=Timer 'Set start time.
    pausetime=0.15 'Set duration to 0.15 second
    Do While Timer<start+pausetime
    DoEvents 'Yield to other processes.
    Loop 'Send command to read channel 1 of module at 01H
(LVDT2)
    GetData.MSComm1.Output="#011"+Chr$(13)
    Do
    Loop Until GetData.MSComm1.InBufferCount>8
    In_Buf=GetData.MSComm1.Input 'Read data into buffer start=Timer 'Set start time.
    pausetime=0.15 'Set duration to 0.15 second
    Do While Timer<start+pausetime
    DoEvents 'Yield to other processes.
    Loop 'Send command to read channel 2 of module at 01H
(LVDT3)
    GetData.MSComm1.Output="#012"+Chr$(13)
    Do
    Loop Until GetData.MSComm1.InBufferCount>8
    In_Buf=GetData.MSComm1.Input 'Read data into buffer start=Timer 'Set start time.
    pausetime=0.15'Set duration to 0.15 second
    Do While Timer<start+pausetime
    DoEvents 'Yield to other processes.
    Loop 'Send command to read channel 3 of module at 01H
(LVDT4)
    GetData.MSComm1.Output="#013"+Chr$(13)
    Do
    Loop Until GetData.MSComm1.InBufferCount>8
    In_Buf=GetData.MSComm1.Input 'Read data into buffer start=Timer 'Set start time.
    pausetime=0.15 'Set duration to 0.15 second
    Do While Timer<start+pausetime
    DoEvents 'Yield to other processes.
    Loop 'Send command to read channel 4 of module at 01H
(LVDT5)
    GetData.MSComm1.Output="#014"+Chr$(13)
    Do
    Loop Until GetData.MSComm1.InBufferCount>8
    In_Buf GetData.MSComm1.Input 'Read data into buffer start=Timer 'Set start time.
    pausetime=0.15 'Set duration to 0.15 second
    Do While Timer<start+pausetime
    DoEvents 'Yield to other processes.
    Loop 'Send command to read channel 5 of module at 01H
(LVDT6)
    GetData.MSComm1.Output="#015"+Chr$(13)
    Do
    Loop Until GetData.MSComm1.InBufferCount>8
    In_Buf=GetData.MSComm1.Input 'Read data into buffer start=Timer 'Set start time.
    pausetime=0.15 'Set duration to 0.15 second
    Do While Timer<start+pausetime
    DoEvents 'Yield to other processes.
    Loop 'Send command to read channel 6 of module at 01H
(LVDT7)
    GetData.MSComm1.Output="#016"+Chr$(13)
    Do
    Loop Until GetData.MSComm1.InBufferCount>8
    In_Buf=GetData.MSComm1.Input 'Read data into buffer start=Timer 'Set start time.
```

```
pausetime=0.15 'Set duration to 0.15 second
Do While Timer<start+pausetime
DoEvents 'Yield to other processes.
Loop 'Send command to read channel 7 of module at 01H
(LVDT8)
    GetData.MSComm1.Output="#017"+Chr$(13)
    Do
    Loop Until GetData.MSComm1.InBufferCount>8
    In_Buf=GetData.MSComm1.Input 'Read data into buffer start=Timer 'Set start time.
    pausetime=0.15 'Set duration to 0.15 second
    Do While Timer<start+pausetime
    DoEvents 'Yield to other processes.
    Loop
Next i 'Read module data and save as offset data
GetData.MSComm1.Output="#010"+Chr$(13) 'Read
    LVDT1
Do
Loop Until GetData.MSComm1.InBufferCount>8
In_Buf=GetData.MSComm1.Input 'Read data into buffer
Offset(0)=(val(Mid(In_Buf, 2, 7)))/(0.8519*12.8) 'Get
    value and convert to inches GetData.MSComm1.Output="#011"+Chr$(13) 'Read
    LVDT2
Do
Loop Until GetData.MSComm1.InBufferCount>8
In_Buf=GetData.MSComm1.Input 'Read data into buffer
Offset(1)=(val(Mid(In_Buf, 2, 7)))/(0.8519*12.8)

GetData.MSComm1.Output="#012"+Chr$(13) 'LVDT3
Do
Loop Until GetData.MSComm1.InBufferCount>8
In_Buf GetData.MSComm1.Input 'Read data into buffer
Offset(2)=(val(Mid(In_Buf, 2, 7))) (0.8519*12.8)

GetData.MSComm1.Output="#013"+Chr$(13) 'LVDT4
Do
Loop Until GetData.MSComm1.InBufferCount>8
In_Buf=GetData.MSComm1.Input 'Read data into buffer
Offset(3)=(val(Mid(In_Buf, 2, 7))) (0.8519*12.8)

GetData.MSComm1.Output="#014"+Chr$(13) 'LVDT5
Do
Loop Until GetData.MSComm1.InBufferCount>8
In_Buf=GetData.MSComm1.Input 'Read data into buffer
Offset(4)=(val(Mid(In_Buf, 2, 7)))/(0.8519*12.8)

GetData.MSComm1.Output="#015"+Chr$(13) 'LVDT6
Do
Loop Until GetData.MSComm1.InBufferCount>8
In_Buf=GetData.MSComm1.Input 'Read data into buffer
Offset(5)=(val(Mid(In_Buf, 2, 7)))/(0.8519*12.8)

GetData.MSComm1.Output="#016"+Chr$(13) 'LVDT7
Do
Loop Until GetData.MSComm1.InBufferCount>8
In_Buf=GetData.MSComm1.Input 'Read data into buffer
Offset(6)=(val(Mid(In_Buf, 2, 7)))/(0.8519*12.8)

GetData.MSComm1.Output="#017"+Chr$(13) 'LVDT8
Do
Loop Until GetData.MSComm1.InBufferCount>8
In_Buf=GetData.MSComm1.Input 'Read data into buffer
Offset(7)=(val(Mid(In_Buf, 2, 7)))/(0.8519*12.8)

row=10 'Start data records at end of text information
StartTime=Timer 'Set exam start time.

End Sub
'-----------------------------------------------------------------

Public Sub CollectData( )
'Begin collecting exam data
CurrentTime=Timer 'Read current time
My_Data.Cells(row, 1)=CurrentTime-StartTime 'Calculate
    and store elapsed time GetData.MSComm1.Output="#010"+Chr$(13) 'Read
    LVDT1
Do
Loop Until GetData.MSComm1.InBufferCount>8
In_Buf=GetData.MSComm1.Input 'Read data into buffer
'Calculate displacement in inches and subtract calibrated
    offset, store in worksheet
My_Data.Cells(row, 2)=(val(Mid(In_Buf, 2, 7)))
    (0.8519*12.8)-Offset(0)

GetData.MSComm1.Output="#011"+Chr$(13) 'Read
    LVDT2
Do
Loop Until GetData.MSComm1.InBufferCount>8
In_Buf=GetData.MSComm1.Input 'Read data into buffer
My_Data.Cells(row, 3)=(val(Mid(In_Buf, 2, 7)))/
    (0.8519*12.8)-Offset(1) 'LVDT #2

GetData.MSComm1.Output="#012"+Chr$(13) 'Read
    LVDT3
Do
Loop Until GetData.MSComm1.InBufferCount>8
In_Buf=GetData.MSComm1.Input 'Read data into buffer
My_Data.Cells(row, 4)=(val(Mid(In_Buf, 2, 7)))/
(0.8519*12.8)-Offset(2) 'LVDT #3

GetData.MSComm1.Output="#013"+Chr$(13) 'Read
    LVDT4
Do
Loop Until GetData.MSComm1.InBufferCount>8
In_Buf=GetData.MSComm1.Input 'Read data into buffer
My_Data.Cells(row, 5)=(val(Mid(In_Buf, 2, 7)))/
    (0.8519*12.8)-Offset(3) 'LVDT #4

GetData.MSComm1.Output="#014"+Chr$(13) 'Read
    LVDT5
Do
Loop Until GetData.MSComm1.InBufferCount>8
In_Buf=GetData.MSComm1.Input 'Read data into buffer
My_Data.Cells(row, 6)=(val(Mid(In_Buf, 2, 7)))/
(0.8519*12.8)-Offset(4) 'LVDT #5

GetData.MSComm1.Output="#015"+Chr$(13) 'Read
    LVDT6
Do
Loop Until GetData.MSComm1.InBufferCount>8
In_Buf=GetData.MSComm1.Input 'Read data into buffer
My_Data.Cells(row, 7)=(val(Mid(In_Buf, 2, 7)))/
    (0.8519*12.8)-Offset(5) 'LVDT #6

GetData.MSComm1.Output="#016"+Chr$(13) 'Read
    LVDT7
```

```
Do
Loop Until GetData.MSComm1.InBufferCount>8
In_Buf=GetData.MSComm1.Input 'Read data into buffer
    My_Data.Cells(row, 8)=(val(Mid(In_Buf, 2, 7)))/
(0.8519*12.8)-Offset(6) 'LVDT #7

GetData.MSComm1.Output="#017"+Chr$(13) 'Read
    LVDT8
Do
Loop Until GetData.MSComm1.InBufferCount>8
In_Buf=GetData.MSComm1.Input 'Read data into buffer
    My_Data.Cells(row, 9)=(val(Mid(In_Buf, 2, 7)))/
(0.8519*12.8)-Offset(7) 'LVDT #8
start=Timer 'Set start time.

'Pause to catch "Exam Finished" Signal
pausetime=0.1 'Set duration to 0.1 second
Do While Timer<start+pausetime
    DoEvents 'Yield to other processes.
Loop row=row+1 'Goto next data record
End Sub
'------------------------------------------------------------

Public Function retscore( )
'Function to return cumulative risk score
retscore=riskscore
End Function
'------------------------------------------------------------

Public Function rettxt(r As Integer)
'Function to return risk category and personal information
    text
rettxt=My_Data.Cells(r, 2)
End Function
'------------------------------------------------------------

Public Function NoRecs( ) As Integer
'Hard code number of records for existing "81%xprt-
    data.xls" file
'NoRecs=1310

NoRecs=row-1
End Function
'------------------------------------------------------------

Public Function rettime( ) As Single
rettime=My_Data.Cells(NoRecs, 1)
End Function
'------------------------------------------------------------

Public Sub Palp(rw As Integer)
'Loop control variable
Dim i As Integer
'Sensor with maximum value
Dim Sensor As Integer
'Maximum sensor displacement per time instant
Dim maximum As Double
'Current displacement value
Dim disp As Single 'Initialize values
Sensor=0
maximum=0
For i=2 To 9
    'Clear all negative values
    If (My_Data.Cells(rw, i).Value2<0) Then
    My_Data.Cells(rw, i).Value2=0
    'Set current displacement value
    disp=My_Data.Cells(rw, i).Value2

'Comapre current displacement to maximum displacement
    If (disp>maximum) Then
        'Current is larger, so reset maximum
        maximum=disp
        'Set which sensor has the current maximum
        Sensor=i-1
    End If
Next i
'Input sensor with maximum and maximum for this time
    instant into worksheet
My_Data.Cells(rw, 10).Value2=Sensor
My_Data.Cells(rw, 11).Value2=maximum
End Sub
'------------------------------------------------------------

Public Sub Putres(vl As Integer, rw As Integer, cm As
    Integer)
My_Data.Cells(rw, cm).Value2=vl 'Put value in worksheet
End Sub
'------------------------------------------------------------

Public Sub evaldata(rw As Integer)
'Procedure to set appropriate flag for a given palpation
Dim a As Integer
If (My_Data.Cells(rw, 13)=2) Then
    'Light Palpation
    'Call procedure to set flag (in gridsetup module)
    set_val My_Data.Cells(rw, 12), 0
ElseIf (My_Data.Cells(rw, 13)=3) Then
    'Medium Palpation
    set_val My_Data.Cells(rw, 12), 1
ElseIf (My_Data.Cells(rw, 13)=4) Then
    'Deep Palpation
    set_val My_Data.Cells(rw, 12), 2
Else
    a=1
End If
End Sub
'------------------------------------------------------------

Public Sub ShutDown( )
'Variable to hold filename
Dim name As String name=Now 'Retrieve date and time of PC 'Convert date/time separators to underscores (_)
While InStr(name, "/")
    Mid(name, InStr(name, "/"), 1)="_"
Wend While InStr(name, ":")
    Mid(name, InStr(name, ":"), 1)="_"
Wend While InStr(name," ")
    Mid(name, InStr(name, " "), 1)="_"
Wend 'Save data file as name setup above
```

```
My_Book.SaveAs filename:="c:\breast\datarec\"+name+
    ".xls"
'Close Excel Workbook
'Close Excel Application
Set My_Data=Nothing
My_Book.Close
Set My_Book=Nothing
My_App.quit
Set My_App=Nothing
End Sub
'------------------------------------------------------------

Public Sub clsprt( )
'Close the com port
GetData.MSComm1.PortOpen=False 'Close com port
End Sub
'------------------------------------------------------------

Public Function avgd(r As Integer) As Variant
Dim c As Integer
Dim tmp(8) As Variant
Palp (r)
Palp (r+1)
For c=2 To 9 Step 1
    If (r=10) Then
    'If on the first time, take avg. of current and two next.
    Palp (r+2)
    tmp(c-1)=(My_Data.Cells(r, c)+My_Data.Cells(r+1,
        c)+My_Data.Cells(r+2, c))/3
    ElseIf (r=row) Then
    'If on the last time, tave avg. of current and two previous.
    tmp(c-1)=(My_Data.Cells(r, c)+My_Data.Cells(r-1,
        c)+My_Data.Cells(r+1, c))/3
    Else
    tmp(c-1)=(My_Data.Cells(r, c)+My_Data.Cells(r-1,
        c)+My_Data.Cells(r+1, c))/3
    End If
Next c
avgd=tmp
End Function 'fuzy Module
'Module to peform all fuzzy logic operations
Option Base 1
'------------------------------------------------------------

Public Function trapez(s As Variant, cs As Integer, P As
    Variant, rp As Integer) As Variant
'Function to create Grade Vector to represent a trapezoid for
    a given Support Vector
Dim i As Integer
ReDim G(rp, cs) As Variant
'S is the support vector
'P is vector of corner points [W X Y Z]
'P can be an array of points where each row
'vector represents a different trapezoid
'P has 4 columns and rp rows 'W and Z are the end points, grade is 0
'X and Y are mid points, grade is 1 between them
'Support vector has cs columns
ReDim G(rp, cs)
For a=1 To rp Step 1
    'Fill in leading zeros
    i=1
    While (s(i)<=P(a, 1))
        G(a, i)=0
        i=i+1
    Wend 'If W and X are the same, go striaght up to one
    If (P(a, 1)=P(a, 2)) Then
        G(a, i)=1
        i=i+1
    'Else, calculate the line up from W to X
    Else
    'Calculate slope of line up
    mu=(1-0)/(P(a, 2)-P(a, 1))
    'Calculate intercept of line up
    bu=0-mu*P(a, 1)
    'Create line up
    'G(a,i)=m*S(i)+b
    While (s(i)>P(a, 1) And s(i)<=P(a, 2))
        G(a, i)=mu*s(i)+bu
        i=i+1
    Wend
    End If 'Fill in 1's across top
    While (s(i)>P(a, 2) And s(i)<=P(a, 3))
        G(a, i)=1
        i=i+1
    Wend 'If Y and Z are the same, go striaght down to zero
    If (P(a, 3)=P(a, 4)) Then
        G(a, i)=0
        i=i+1
    'Else, calculate the line down from Y to Z
    Else
    'Calculate slope of line down
    md=(1-0)/(P(a, 3)-P(a, 4))
    'Calculate intercept of line down
    bd=0-md*P(a, 4)
    'Create line down
    'G(a,i)=m*S(i)+b
    While (s(i)>P(a, 3) And s(i)<=P(a, 4))
        G(a, i)=md*s(i)+bd
        i=i+1
    Wend
    End If 'Fill in trailing zeros
    For j=i To cs Step 1
        G(a, j)=0
    Next j
Next a
trapez=G
End Function
'------------------------------------------------------------

Public Function triangle(s As Variant, cs As Integer, P As
    Variant, rp As Integer) As Variant
'Function to create Grade Vector to represent a triangle
'P is vector of corner points [X Y Z]
'P can be a matrix of points where each
'row represents a different triangle
'Size or P is rp rows and 3 columns
'S is support vector
```

```
'Size of S is 1 row and cs columns
ReDim G(rp, cs)
For a=1 To rp Step 1
  'Fill in leading zeros
  i=1
  While (s(i)<P(a, 1))
  G(a, i)=0
  i=i+1
  Wend 'If X and Y are the same, go striaght up to one
  If (P(a, 1)=P(a, 2)) Then
  G(a,i)=1
  i=i+1
  'Else, calculate the line up from X to Y
  Else
  'Calculate slope of line up
  mu=(1-0)/(P(a, 2)-P(a, 1))
  'Calculate intercept of line up
  bu=0-mu*P(a, 1)
  'Create line up
  'G(a,i)=m*S(i)+b
  While (s(i)<=P(a, 2))
    G(a, i)=mu*s(i)+bu
    i=i+1
  Wend
  End If 'If Y and Z are the same, go striaght down to zero
  If (P(a, 2)=P(a, 3)) Then
  G(a, i)=0
  i=i+1
  'Else, calculate the line down from Y to Z
  Else
  'Calculate slope of line down
  md=(1-0)/(P(a, 2)-P(a, 3))
  'Calculate intercept of line down
  bd=0-md*P(a, 3)
  'Create line down
  'G(a,i)=m*S(i)+b
  While (s(i)<=P(a, 3))
    G(a, i)=md*s(i)+bd
    i=i+1
  Wend
  End If 'Fill in trailing zeros
  For j=i To cs Step 1
  G(a, j)=0
  Next j
Next a
triangle=G
End Function
'------------------------------------------------------------

Public Function iftprod(top As Variant, YG As Variant, rYG
  As Integer, cYG As Integer) As Variant
'Function to evaluate fuzzy if-then rule using Product opera-
  tion
'The Product operation scales down the output function at
  the
'input membership grade level corresponding to the crisp
  input value
'fuzzify must be called externally to get value for top
'top is the fuzzified grade value for crisp input
'top can be vector of values (one for each input grade
  function
'Size of consequence (output) Grade Vector is rYG rows and
  cYG columns
'The vector top should have one column for each
'row in YG and only one row
ReDim G(rYG, cYG)
For a=1 To rYG Step 1
  For c=1 To cYG Step 1
  'Scale consequence (output) grade by top
  G(a, c)=top(a)*YG(a, c)
  Next c
Next a
iftprod=G
End Function
'------------------------------------------------------------

Public Function fuzzifr(s As Variant, G As Variant, rG As
  Integer, X As Variant) As Variant
'Function to determine Grade of a given support value (crisp
  input)
'G can be array of grade functions
'X is crisp input value
'Grade vector has rG rows
ReDim out(rG)
For a=1 To rG Step 1
  i=1
  'Determine what the value is close to in the vector
  While (s(i)<X)
  i=i+1
  Wend 'If the crisp value is in the support vector, return its grade
  If (s(i)=X) Then
  out(a)=G(a, i)
  'else, calculate a grade based on the two points
  'that the value falls between in the vector
  Else
  'This is the lower point in the vector
  x1=s(i-1)
  y1=G(a, i-1)
  'This is the higher point in the vector
  x2=s(i)
  y2=G(a, i)
  'Calculate slope between these points
  '(Slope is rise over run or Grade/Support)
  M=(y2-y1)/(x2-x1)
  'Determine the "run" of the value from
  'the lower vector point
  rn=X-x1
  'Calculate the corresponding "rise" from
  'the lower vector point
  rs=M*rn
  'Compute the grade by adding the calculated
  '"rise" to the lower vector point value
  out(a)=y1+rs
  End If
Next a
fuzzifr=out
End Function
'------------------------------------------------------------
```

```
Public Function fzfr4dfz(s As Variant, G As Variant, X As
    Double) As Variant
'G can be array of grade functions
'X is crisp input value
'Grade vector has 1 row
i=1
'Determine what the value is close to in the vector
While (s(i)<X)
    i=i+1
Wend 'If the crisp value is in the support vector, return its grade
If (s(i)=X) Then
    out=G(i)
'else, calculate a grade based on the two points
'that the value falls between in the vector
Else
    'This is the lower point in the vector
    x1=s(i-1)
    y1=G(i-1)
    'This is the higher point in the vector
    x2=s(i)
    y2=G(i)
    'Calculate slope between these points
    '(Slope is rise over run or Grade/Support)
    M=(y2-y1)/(x2-x1)
    'Determine the "run" of the value from
    'the lower vector point
    rn=X-x1
    'Calculate the corresponding "rise" from
    'the lower vector point
    rs=M*rn
    'Compute the grade by adding the calculated
    '"rise" to the lower vector point value
    out=y1+rs
End If
fzfr4dfz=out
End Function
'------------------------------------------------------------------

Public Function fuzzy(fuzval As Variant, OUTS As Variant,
    OUTG As Variant, rG As Integer, cG As Integer) As
Variant
'Function to evalute if-then rules, combine fired rules and
    defuzzify result
'Performs if then product and max evaluation
'fuzval is vector of fuzzifed grade value for each
'input grade function for the given crisp input value
'OUTS is the output support vector
'Size of output grade function is rG by cG 'Manipulate each output grade function by fuzzy value
'if-then prod
'Evaluate rule for each input grade function
Dim val As Variant
YG=iftprod(fuzval, OUTG, rG, cG)

'max option
maxG=max(YG, rG, cG)

'Defuzzify manipulated ouput grade function
val=defuzzy(OUTS, maxG, cG)
fuzzy=val
End Function
'------------------------------------------------------------------

Public Function max(matrx As Variant, rm As Integer, cm As
    Integer) As Variant
'Function to determine the maximum value per column of a
    matrix
If (rm=1) Then
    mxm=0
    For c=1 To cm Step 1
        If (matrx(c)>mxm) Then
            mxm=matrx(c)
        End If
    Next c
    max=mxm
Else
    ReDim maxm(cm) As Double
    For c=1 To cm Step 1
        maxm(c)=0
        For r=1 To rm Step 1
            If (matrx(r, c)>maxm(c)) Then
                maxm(c)=matrx(r, c)
            End If
        Next r
    Next c
    max=maxm
End If
End Function
'------------------------------------------------------------------

Public Function defuzzy(s As Variant, G As Variant, cG As
    Integer) As Double
'Function to determine centroid of a fuzzy set
Dim i As Double
num=0
denom=0
i=s(1)
Step=(s(2)-s(1))/10
While (i<s(cG))
    gr=fzfr4dfz(s, G, i)
    num=num+gr*i
    denom=denom+gr
    i=i+Step
Wend
If (denom=0) Then
    c=0
Else
    c=num/denom
End If defuzzy=c
End Function
'------------------------------------------------------------------

Public Function Higrade(s As Variant, g As Variant, r As
    Integer, c As Integer) As Double
'Function to perfrom maximum grade defuzzification
'Function returns support value associated with the highest
    grade
'Determine maximum grade in vector
M=max(G, r, c)
'Step through vector until first maximum is found
i=1
While (G(i)< >M)
    i=i+1
Wend
'Return corresponding support value
higrade=s(i)
End Function
```

What is claimed is:

1. An interactive instrumented breast model (100) for training a user (1018) to perform an effective breast examination, comprising:
   a breast model (102) having a base (206), a surface (202), and an inner core (204);
   a means for detecting whether user (1018) applies two or more levels of displacement at each of one or more points of contact on said surface (202) of said breast model (102), generating sensor output (1040);
   a computer program product for execution on a computer system (2500) in communication with said means for detecting two or more levels of displacement at each of said one or more points of contact on said surface (202) of said breast model (102), said computer program product comprising:
      a means for receiving said sensor output (1040),
      a means for converting said sensor output (1040) to reflect a level of displacement resulting from a level of pressure that the user (1018) applies to a point on said surface (202) of said breast model (102), thereby generating converted sensor data (1028),
      a means for evaluating said converted sensor data (1028) and generating performance data (1030), said performance data indicating whether user (1018) applies two or more levels of displacement for each of said one or more points of contact;
      a means for displaying said performance data (1030) as performance display output (1032) to the user (1018), wherein said performance display output (1032) simultaneously displays to the user (1018) each of said two or more levels of displacement for each of said one or more points of contact on said surface (202) of said breast model (102) and each of said two or more levels of displacement for each of said one or more points of contact on said surface (202) of said breast model.

2. The interactive instrumented breast model (100) according to claim 1, wherein said means for detecting two or more levels of displacement comprises:
   one or more sensors (1002) in communication with said inner core (204) of said breast model (102), such that when the user (1018) applies pressure to said surface (202) of said breast model (102), said one or more sensors (1002) detect said level of pressure applied by the user (1018) and generate a corresponding voltage (1006); and
   one or more data acquisition modules (1004), wherein each said data acquisition module (1004) receives said voltage (1006) output from one said sensor (1002) and generates said sensor output (1040).

3. The interactive instrumented breast model (100) according to claim 2, wherein said one or more sensors (1002) are linear voltage displacement transducers.

4. The interactive instrumented breast model (100) according to claim 2, wherein there are eight said sensors (1002).

5. The interactive instrumented breast model (100) according to claim 2, wherein said sensors (1002) are configured within said inner core (204) of said breast model (102) such that said voltage (1006) output from said sensors (1002) is maximized when a user (1018) employs a vertical strip pattern for the breast examination.

6. The interactive instrumented breast model (100) according to claim 1, wherein said means for analyzing said converted sensor data (1028) and generating performance data (1030) uses fuzzy logic.

7. The interactive instrumented breast model (100) according to claim 1, further comprising a means for educating the user (1018) on breast cancer.

8. The interactive instrumented breast model (100) according to claim 7, wherein said means for educating the user (1018) comprises a breast cancer risk estimator.

9. The interactive instrumented breast model (100) according to claim 1 further comprising a means for training the user (1018) on the operation of the instrumented breast model (100).

10. The interactive instrumented breast model (100) according to claim 9, wherein said means for training comprises a means for displaying a video and a means for displaying reference material.

11. The interactive instrumented breast model (100) according to claim 1, wherein said breast model (102) contains one or more lumps.

12. The interactive instrumented breast model (100) according to claim 1, further comprising an overlay for covering said breast model (102) and containing one or more lumps.

13. The interactive instrumented breast model (100) according to claim 1, wherein said converted sensor data (1028) comprises said levels of displacement of none, light, medium, and deep.

14. An interactive instrumented breast model (100), for training a user to perform an effective breast examination, comprising:
   a breast model (102) having a base (206), a surface (202), and an inner core (204);
   a means for detecting a level of displacement of the surface (202) of said breast model (102), generating sensor output (1040), wherein said means for detecting a level of displacement comprises one or more sensors (1002) in communication with said inner core (204) of said breast model (102), such that when the user (1018) applies a level of pressure to said surface (202) of said breast model (102), said one or more sensors (1002) detect said level of pressure applied by the user (1018) and generate a corresponding voltage (1006), and one or more data acquisition modules (1004), wherein each said data acquisition module (1004) receives said voltage (1006) output from one said sensor (1002) and generates said sensor output (1040); and
   a computer program product for execution on a computer system (2500) in communication with said means for detecting a level of displacement of said surface (202) of said breast model (102), said computer program product comprising:
      a means for receiving said sensor output (1040);
      a means for converting said sensor output (1040) to reflect a level of displacement resulting from said level of pressure that the user (1018) applies to said surface (202) of said breast model (102), thereby generating converted sensor data (1028),
      a means for evaluating said converted sensor data (1028) and generating performance data (1030), and
      a means for displaying said performance data (1030) as performance display output (1032) to the user (1018);
   wherein one or more channels (212) is drilled through said base (206) and said inner core (204) of said breast model (102), each said channel (212) having a terminating end (214) in proximity to said surface (202) of said breast model (102), and further comprising:
      one or more pieces of string (104), each said piece of string (104) having a first end and a second end, wherein said first end of each said string (104) is connected to one said sensor (1002); and a means for attaching said second end of each said piece of string (104) to said terminating end (214) of one said channel (212).

15. The interactive instrumented breast model (100) according to claim 14, wherein said means for attaching comprises one or more swatches of fabric (210) wherein each said piece of string (104) is pulled through one said swatch of fabric (210) and knotted on both sides of said swatch of fabric (210), thereby creating a top knot (208a) and a bottom knot (208b), and a means for adhering said swatch of fabric (210) to said terminating end (214) of one said channel (212).

16. The interactive instrumented breast model (100) according to claim 15, wherein said means for adhering is silicone adhesive.

17. The interactive instrumented breast model (100) according to claim 15, wherein said means for adhering is said swatch of fabric (210) embedded within said inner core (204) of said breast model (102).

18. The interactive instrumented breast model (100) according to claim 15, wherein said means for adhering is melting said inner core (204) at said termninating end (214) of said channel (212).

19. The interactive instrumented breast model (100) according to claim 14, wherein said one or more pieces of string (104) are about ten inches in length.

20. An interactive instrumented breast model (100) for training a user (1018) to perform an effective breast examination, comprising:

a breast model (102) having a base (206), a surface (202), and an inner core (204);

a means for detecting whether user (1018) applies two or more levels of displacement at each of one or more points of contact on said surface (202) of said breast model (102), generating sensor output (1040); and a means for simultaneously displaying to the user (1018) each of said two or more levels of displacement for each of said one or more points of contact on said surface (202) of said breast model (102).

21. The interactive instrumented breast model (100) according to claim 20, further comprising:

a computer program product for execution on a computer system (2500) in communication with said means for detecting said two or more levels of displacement at each of said one or more points of contact on said surface (202) of said breast model (102), said computer program product comprising:
   a means for receiving said sensor output (1040),
   a means for converting said sensor output (1040) to reflect a level of displacement resulting from a level of pressure that the user (1018) applies to a point on said surface (202) of said breast model (102), thereby generating converted sensor data (1028),
   a means for evaluating said converted sensor output (1028) and generating performance data (1030), and
   a means for displaying said performance data (1030) as performance display output (1032) to the user (1018).

22. The interactive instrumented breast model (100) according to claim 21, wherein said means for detecting said two or more levels of displacement comprises:

one or more sensors (1002) in communication with said inner core (204) of said breast model (102), such that when the user (1018) applies pressure to said surface (202) of said breast model (102), said one or more sensors 1002 detect said level of pressure applied by the user (1018) and generate a corresponding voltage (1006); and one or more data acquisition modules (1004), wherein each said data acquisition module (1004) receives said voltage (1006) output from one said sensor (1002) and generates said sensor output (1040).

23. The interactive instrumented breast model (100) according to claim 21, wherein said means for analyzing said converted sensor data (1028) and generating performance data (1030) uses fuzzy logic.

24. The interactive instrumented breast model (100) according to claim 22, wherein said one or more sensors (1002) are linear voltage displacement transducers.

25. The interactive instrumented breast model (100) according to claim 22, wherein there are eight said sensors (1002).

26. The interactive instrumented breast model (100) according to claim 22, wherein said sensors (1002) are positioned such that said voltage (1006) output from said sensors (1002) is maximized when a user (1018) employs a vertical strip pattern for the breast examination.

27. The interactive instrumented breast model (100) according to claim 20, wherein said two or more levels of displacement of said surface (202) of said breast model (102) comprises the levels of none, light, medium, and deep.

28. An interactive instrumented breast model (100), for training a user (1018) to perform an effective breast examination, comprising:

a breast model (102) having a base (206), a surface (202), and an inner core (204);

a means for detecting a level of displacement of the surface (202) of said breast model (102), generating sensor output (1040), wherein said means for detecting a level of displacement comprises one or more sensors (1002) in communication with said inner core (204) of said breast model (102), such that when the user (1018) applies a level of pressure to said surface (202) of said breast model (102), said one or more sensors 1002 detect said level of pressure applied by the user (1018) and generate a corresponding voltage (1006), and one or more data acquisition modules (1004), wherein each said data acquisition module (1004) receives said voltage (1006) output from one said sensor (1002) and generates said sensor output (1040); and a computer program product for execution on a computer system (2500) in communication with said means for detecting a level of displacement of said surface (202) of said breast model (102), said computer program product comprising:
   a means for receiving said sensor output (1040),
   a means for converting said sensor output (1040) to reflect a level of displacement resulting from said level of pressure that the user (1018) applies to said surface (202) of said breast model (102), thereby generating converted sensor data (1028),
   a means for evaluating said converted sensor output (1028) and generating performance data (1030), and
   a means for displaying said performance data (1030) as performance display output (1032) to the user (1018);

wherein one or more channels (212) is drilled through said base (206) and said inner core (204) of said breast model (102), each said channel (212) having a terminating end (214) in proximity to said surface (202) of said breast model (102), and further comprising:

one or more pieces of string (104), each said piece of string (104) having a first end and a second end, wherein said first end of each said string (104) is connected to one said sensor (1002); and a means for attaching said second end of each said piece of string (104) to one said terminating end (214) of one said channel (212).

29. The interactive instrumented breast model (100) according to claim 28, wherein said means for attaching comprises one or more swatches of fabric (210) wherein each said piece of string (104) is pulled through one said swatch of fabric (210) and knotted on both sides of said swatch of fabric (210), thereby creating a top knot (208*a*) and a bottom knot (208*b*), and a means for adhering said swatch of fabric (210) to said terminating end (214) of one said channel (212).

30. The interactive instrumented breast model (100) according to claim 29, wherein said means for adhering is said swatch of fabric (210) embedded within said inner core (204) of said breast model (102).

31. The interactive instrumented breast model (100) according to claim 29, wherein said means for adhering is melting said inner core (204) at said terminating end (214) of said channel (212).

32. The interactive instrumented breast model (100) according to claim 29, wherein said means for adhering is silicone adhesive.

33. The interactive instrumented breast model (100) according to claim 28, wherein said one or more pieces of string (104) are about ten inches in length.

34. A computer program product for use with a computer system (2500), comprising:

a computer readable medium having computer readable program code means embodied in said medium for analyzing and evaluating a breast examination performed by a user (1018) on an interactive instrumented breast model (100) having a breast model (102), wherein a surface (202) of said breast model (102) receiving an examination is an examined surface (202) of said breast model (102), said computer program product comprising:

receiving means for enabling a processor (2504) to receive sensor output (1040) from a data acquisition unit (106), said data acquisition unit (106) having one or more sensors (1002) in communication with an inner core (204) of said breast model (102) of said interactive instrumented breast model (100), such that when the user (1018) applies pressure to one or more points of contact on said surface (202) of said breast model (102), said one or more sensors (1002) detect whether user (1018) applies two or more levels of displacement at each of the one or more points of contact, wherein the displacement is converted into said sensor output (1040) by data acquisition modules (1004) in said data acquisition unit (106);

a means for converting said sensor output (1040) to reflect said two or more levels of displacement resulting from the pressure that the user (1018) applies to each of said one or more points of contact on said surface (202) of said breast model (102), thereby generating converted sensor data (1028);

a means for evaluating said converted sensor data (1028) and generating performance data (1030); said performance data indicating whether user (1018) applies two or more levels of displacement for each of said one or more points of contact;

a means for displaying said performance data (1030) as performance display output (1032) to the user (1018), wherein said performance display output (1032) simultaneously displays to the user (1018) each of said two or more levels of displacement for each of said one or more points of contact on said surface (202) of said breast model (102).

35. The computer program product according to claim 34, wherein said two or more levels of displacement of said surface (202) of said breast model (102) comprises the levels of none, light, medium, and deep.

36. The computer program product according to claim 34, further comprising:

a means for educating the user (1018) on breast cancer.

37. The computer program product according to claim 36, wherein said means for educating the user (1018) comprises a breast cancer risk estimator.

38. The computer program product according to claimed 34, further comprising a means for training the user (1018) on the operation of the instrumented breast model (100).

39. The computer program product according to claim 38, wherein said means for training comprises a means for displaying a video and a means for displaying reference material.

40. The computer program product according to claim 34, wherein said examined surface (202) of said breast model (102) is divided into a matrix (600) of boxes, and said means for evaluating said converted sensor data (1028) and generating said performance data (1030) comprises:

a means for determining finger position of the user (1018) in each box of said matrix (600) of said examined surface (202) of said breast model (102); and a means for determining said two or more levels of displacement for each finger position of the user (1018) in each box of said matrix (600) of said examined surface (202) of said breast model (102).

41. The computer program product according to claim 40, wherein said means for determining finger position uses fuzzy logic to generate an x and y coordinate for each set of sensor output (1040), wherein a set of sensor output (1040) represents a level of displacement of said sensors 1002 at a single time interval, and said sensor 1002 having the highest level of displacement within said set of sensor output (1040) represents the user's (1018) finger position.

42. The computer program product according to claim 40, wherein said means for determining said two or more levels of displacement for each finger position uses fuzzy logic having four fuzzy grades to represent said two or more levels of displacement: none, light, medium, and deep.

* * * * *